(12) United States Patent
Tanikella et al.

(10) Patent No.: US 12,296,434 B2
(45) Date of Patent: May 13, 2025

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Brahmanandam V. Tanikella, Northborough, MA (US); Charles J. Gasdaska, Shrewsbury, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 113 days.

(21) Appl. No.: 18/148,838

(22) Filed: Dec. 30, 2022

(65) Prior Publication Data
US 2023/0211471 A1 Jul. 6, 2023

Related U.S. Application Data

(60) Provisional application No. 63/266,281, filed on Dec. 30, 2021.

(51) Int. Cl.
*B24D 18/00* (2006.01)
*B33Y 10/00* (2015.01)
*B29C 64/165* (2017.01)

(52) U.S. Cl.
CPC .......... *B24D 18/0054* (2013.01); *B33Y 10/00* (2014.12); *B29C 64/165* (2017.08)

(58) Field of Classification Search
CPC .... B24D 18/0054; B33Y 10/00; B29C 64/165
(Continued)

(56) References Cited

U.S. PATENT DOCUMENTS

| 985,116 A | 2/1911 | Nichols |
|---|---|---|
| 2,242,877 A | 5/1941 | Albertson |

(Continued)

FOREIGN PATENT DOCUMENTS

| AU | 613584 B2 | 8/1991 |
|---|---|---|
| CN | 1147783 A | 4/1997 |

(Continued)

OTHER PUBLICATIONS

Cao, S., et al., "Investigation on urea-formaldehyde resin as an in-powder adhesivefor the fabrication of Al2O3/borosilicate-glass composite parts bythree dimensional printing (3DP)", Journal of Materials Processing Technology 217 (2015) pp. 241-252.

(Continued)

*Primary Examiner* — James E McDonough
(74) *Attorney, Agent, or Firm* — Abel Schillinger, LLP; Arpan Ghosh

(57) ABSTRACT

A method for forming an abrasive article via an additive manufacturing technique including forming a layer of powder material comprising a precursor bond material and abrasive particles, compacting at least a portion of the layer to form a compacted layer, binding at least a portion of the compacted layer, and repeating the steps of forming, compacting, and binding to form a green body abrasive article.

20 Claims, 22 Drawing Sheets

(58) Field of Classification Search
USPC .......................................................... 51/297
See application file for complete search history.

(56) References Cited

U.S. PATENT DOCUMENTS

| | | | |
|---|---|---|---|
| RE22,457 E | 3/1944 | Jeppson et al. |
| 2,367,404 A | 1/1945 | Kott |
| 3,023,551 A | 3/1962 | Osenberg |
| 3,123,948 A | 3/1964 | Kistler et al. |
| 3,144,739 A | 8/1964 | Brutvan et al. |
| 3,146,560 A | 9/1964 | Edward |
| 3,258,817 A | 7/1966 | Smiley |
| 3,477,180 A | 11/1969 | Robertson |
| 3,594,141 A | 7/1971 | Houston et al. |
| 3,609,925 A | 10/1971 | Comella-Riera |
| 3,650,714 A | 3/1972 | Farkas |
| 3,871,840 A | 3/1975 | Wilder et al. |
| 4,128,971 A | 12/1978 | Dunnington et al. |
| 4,164,098 A | 8/1979 | Akita |
| 4,211,294 A | 7/1980 | Multakh |
| 4,274,769 A | 6/1981 | Multakh |
| 4,314,827 A | 2/1982 | Leitheiser et al. |
| 4,369,046 A | 1/1983 | Bruschek et al. |
| 4,483,108 A | 11/1984 | Howard |
| 4,552,231 A | 11/1985 | Pay et al. |
| 4,574,003 A | 3/1986 | Gerk |
| 4,623,364 A | 11/1986 | Cottringer et al. |
| 4,661,126 A | 4/1987 | Ingami et al. |
| 4,744,802 A | 5/1988 | Schwabel |
| 4,770,671 A | 9/1988 | Monroe et al. |
| 4,881,951 A | 11/1989 | Wood et al. |
| 4,918,872 A | 4/1990 | Sato et al. |
| 4,923,512 A | 5/1990 | Timm et al. |
| 4,960,441 A | 10/1990 | Pellow et al. |
| 5,011,508 A | 4/1991 | Wald et al. |
| 5,067,969 A | 11/1991 | Matsuda |
| 5,090,968 A | 2/1992 | Pellow |
| 5,092,920 A | 3/1992 | Nakai et al. |
| 5,123,217 A | 6/1992 | Ishikawa et al. |
| 5,139,978 A | 8/1992 | Wood |
| 5,178,644 A | 1/1993 | Huzinec |
| 5,178,849 A | 1/1993 | Bauer |
| 5,201,916 A | 4/1993 | Berg et al. |
| 5,204,055 A | 4/1993 | Sachs et al. |
| 5,227,104 A | 7/1993 | Bauer |
| 5,252,264 A | 10/1993 | Forderhase et al. |
| 5,282,875 A | 2/1994 | Wood et al. |
| 5,354,155 A | 10/1994 | Adams |
| 5,366,523 A | 11/1994 | Rowenhorst et al. |
| 5,387,380 A | 2/1995 | Cima et al. |
| 5,429,647 A | 7/1995 | Larmie |
| 5,441,710 A | 8/1995 | Marois |
| 5,449,388 A | 9/1995 | Wiand |
| 5,490,882 A | 2/1996 | Sachs et al. |
| 5,498,269 A | 3/1996 | Larmie |
| 5,518,443 A | 5/1996 | Fisher |
| 5,547,479 A | 8/1996 | Conwell et al. |
| 5,551,963 A | 9/1996 | Larmie |
| 5,611,724 A | 3/1997 | DeGraaff |
| 5,618,762 A | 4/1997 | Shirakawa et al. |
| 5,660,621 A | 8/1997 | Bredt |
| 5,725,162 A | 3/1998 | Garg et al. |
| 5,766,277 A | 6/1998 | DeVoe et al. |
| 5,776,214 A | 7/1998 | Wood |
| 5,868,125 A | 2/1999 | Maoujoud |
| 5,874,050 A | 2/1999 | Matias |
| 5,891,206 A | 4/1999 | Ellingson |
| 5,900,207 A | 5/1999 | Danforth et al. |
| 5,942,015 A | 8/1999 | Culler et al. |
| 5,976,205 A | 11/1999 | Andrews et al. |
| 5,996,571 A | 12/1999 | Jedick |
| 6,086,648 A | 7/2000 | Rossetti et al. |
| 6,123,744 A | 9/2000 | Huzinec |
| 6,146,567 A | 11/2000 | Sachs et al. |
| 6,192,875 B1 | 2/2001 | Koroku et al. |
| 6,209,420 B1 | 4/2001 | Butcher et al. |
| 6,354,362 B1 | 3/2002 | Smith et al. |
| 6,376,590 B2 | 4/2002 | Kolb et al. |
| 6,403,002 B1 | 6/2002 | van der Geest |
| 6,413,286 B1 | 7/2002 | Swei et al. |
| 6,416,560 B1 | 7/2002 | Palmgren |
| 6,511,265 B1 | 1/2003 | Mirchandani et al. |
| 6,551,366 B1 | 4/2003 | D'Souza et al. |
| 6,593,391 B2 | 7/2003 | Teutsch et al. |
| 6,645,412 B2 | 11/2003 | Priedeman, Jr. |
| 6,749,496 B2 | 6/2004 | Mota et al. |
| 6,767,499 B1 | 7/2004 | Hory et al. |
| 6,814,926 B2 | 11/2004 | Geving et al. |
| 6,858,050 B2 | 2/2005 | Palmgren |
| 7,015,268 B2 | 3/2006 | Manwiller et al. |
| 7,125,490 B2 | 10/2006 | Clendenning et al. |
| 7,311,752 B2 | 12/2007 | Tepper et al. |
| 7,332,140 B2 | 2/2008 | Matias |
| 7,497,977 B2 | 3/2009 | Nielsen et al. |
| 7,524,345 B2 | 4/2009 | Nevoret et al. |
| 7,867,302 B2 | 1/2011 | Nevoret et al. |
| 7,875,091 B2 | 1/2011 | Nevorct et al. |
| 7,883,563 B2 | 2/2011 | Kawata et al. |
| 7,887,608 B2 | 2/2011 | Schwabel et al. |
| 7,946,907 B2 | 5/2011 | Heyen |
| 8,109,177 B2 | 2/2012 | Kembaiyan |
| 8,252,087 B2 | 8/2012 | Burba, III et al. |
| 8,308,830 B2 | 11/2012 | Egan et al. |
| 8,486,490 B2 | 7/2013 | Fuwa et al. |
| 8,568,205 B2 | 10/2013 | Gosamo et al. |
| 8,597,088 B2 | 12/2013 | Hoang et al. |
| 8,668,859 B2 | 3/2014 | Pettis |
| 8,715,381 B2 | 5/2014 | Ramanath et al. |
| 8,778,252 B2 | 7/2014 | Mackie et al. |
| 8,870,571 B2 | 10/2014 | Lowder et al. |
| 8,991,211 B1 | 3/2015 | Arlotti et al. |
| 9,144,237 B2 | 9/2015 | Sakurada et al. |
| 9,156,999 B2 | 10/2015 | Ng et al. |
| 9,388,898 B2 | 7/2016 | Tokumo |
| 9,421,666 B2 | 8/2016 | Krishnan et al. |
| 9,456,884 B2 | 10/2016 | Uckelmann et al. |
| 9,545,669 B2 | 1/2017 | Åklint et al. |
| 9,597,730 B2 | 3/2017 | Mironets et al. |
| 9,731,982 B2 | 8/2017 | Adams |
| 9,776,304 B2 | 10/2017 | Schulze |
| 9,783,718 B2 | 10/2017 | Stevenson et al. |
| 9,815,029 B2 | 11/2017 | Zhong et al. |
| 9,822,291 B2 | 11/2017 | Erickson |
| 10,016,852 B2 | 7/2018 | Broda |
| 10,052,742 B2 | 8/2018 | Fukazawa et al. |
| 10,144,114 B2 | 12/2018 | Schulze |
| 10,183,329 B2 | 1/2019 | Gunther |
| 10,188,975 B2 | 1/2019 | Fu et al. |
| 10,189,211 B2 | 1/2019 | Volk et al. |
| 10,272,493 B2 | 4/2019 | Krebs et al. |
| 10,328,372 B2 | 6/2019 | Mazumder et al. |
| 10,399,201 B2 | 9/2019 | Ganapathiappan et al. |
| 10,682,702 B2 | 6/2020 | Haro Gonzalez et al. |
| 10,723,041 B2 | 7/2020 | Wang |
| 10,882,160 B2 | 1/2021 | Redfield et al. |
| 10,888,973 B2 | 1/2021 | Franke et al. |
| 11,203,162 B2 | 12/2021 | Wighton et al. |
| 11,577,458 B2 | 2/2023 | Rifaut et al. |
| 2002/0095875 A1 | 7/2002 | D'Evelyn et al. |
| 2003/0150442 A1 | 8/2003 | Boland et al. |
| 2004/0226405 A1 | 11/2004 | Geving et al. |
| 2004/0244540 A1 | 12/2004 | Oldham et al. |
| 2004/0248770 A1 | 12/2004 | Grau et al. |
| 2005/0101237 A1 | 5/2005 | Vecchiarelli et al. |
| 2006/0059785 A1 | 3/2006 | Sung |
| 2006/0162967 A1 | 7/2006 | Brackin et al. |
| 2006/0185255 A1 | 8/2006 | Nevoret et al. |
| 2006/0185256 A1 | 8/2006 | Nevoret et al. |
| 2006/0185257 A1* | 8/2006 | Nevoret ............... B24D 11/001 51/307 |
| 2006/0208388 A1 | 9/2006 | Bredt et al. |
| 2006/0231293 A1 | 10/2006 | Ladi et al. |
| 2007/0020457 A1 | 1/2007 | Adefris |
| 2007/0241482 A1 | 10/2007 | Giller et al. |

(56) References Cited

U.S. PATENT DOCUMENTS

| | | |
|---|---|---|
| 2008/0085660 A1 | 4/2008 | Orlhac |
| 2008/0182017 A1 | 7/2008 | Singh et al. |
| 2008/0187769 A1 | 8/2008 | Huzinec et al. |
| 2010/0035530 A1 | 2/2010 | Gosamo et al. |
| 2010/0193254 A1 | 8/2010 | Lind et al. |
| 2010/0193255 A1 | 8/2010 | Stevens et al. |
| 2010/0255254 A1 | 10/2010 | Culler et al. |
| 2010/0320005 A1 | 12/2010 | Burhan et al. |
| 2011/0243675 A1 | 10/2011 | Fach |
| 2011/0293918 A1 | 12/2011 | Lucas et al. |
| 2012/0298425 A1 | 11/2012 | Cuillier De Maindreville et al. |
| 2013/0052453 A1 | 2/2013 | Filou et al. |
| 2013/0168071 A1 | 7/2013 | Hugelier et al. |
| 2013/0240479 A1 | 9/2013 | Moriya et al. |
| 2013/0277891 A1* | 10/2013 | Teulet .................. B29C 64/188 264/497 |
| 2013/0280994 A1 | 10/2013 | Kang |
| 2013/0283700 A1 | 10/2013 | Bajaj et al. |
| 2013/0316149 A1 | 11/2013 | Atkins et al. |
| 2014/0069023 A1 | 3/2014 | Hoang et al. |
| 2014/0163717 A1 | 6/2014 | Das et al. |
| 2014/0255198 A1 | 9/2014 | El-Wardany et al. |
| 2014/0262541 A1 | 9/2014 | Parsana et al. |
| 2015/0008046 A1 | 1/2015 | Cuillier De Maindreville et al. |
| 2015/0029071 A1 | 1/2015 | Hwang et al. |
| 2015/0069649 A1 | 3/2015 | Bai et al. |
| 2015/0089881 A1 | 4/2015 | Stevenson et al. |
| 2015/0126099 A1 | 5/2015 | Krishnan et al. |
| 2015/0183089 A1 | 7/2015 | Iyengar |
| 2015/0259986 A1 | 9/2015 | Stockey |
| 2015/0290771 A1 | 10/2015 | Li |
| 2015/0306664 A1 | 10/2015 | Aklint et al. |
| 2015/0330154 A1 | 11/2015 | Pearce et al. |
| 2015/0360289 A1 | 12/2015 | Liou et al. |
| 2015/0375368 A1 | 12/2015 | Gosamo |
| 2016/0010469 A1 | 1/2016 | Guo |
| 2016/0038866 A1 | 2/2016 | Gibson et al. |
| 2016/0159699 A1 | 6/2016 | Lazur |
| 2016/0184972 A1 | 6/2016 | Serebrennikov et al. |
| 2016/0221122 A1 | 8/2016 | D'Orlando et al. |
| 2016/0271757 A1 | 9/2016 | Kanyanta et al. |
| 2016/0289520 A1 | 10/2016 | Bujnowski et al. |
| 2016/0332236 A1 | 11/2016 | Stoyanov |
| 2017/0050241 A1 | 2/2017 | Thomas et al. |
| 2017/0057011 A1 | 3/2017 | Hyatt et al. |
| 2017/0066873 A1 | 3/2017 | Gardet |
| 2017/0072469 A1 | 3/2017 | Maderud et al. |
| 2017/0136540 A1 | 5/2017 | Dods |
| 2017/0144242 A1 | 5/2017 | McQueen et al. |
| 2017/0216915 A1 | 8/2017 | Holcomb et al. |
| 2017/0232512 A1 | 8/2017 | Joerger |
| 2017/0291372 A1 | 10/2017 | Milshtein et al. |
| 2017/0297106 A1 | 10/2017 | Myerberg et al. |
| 2017/0342303 A1 | 11/2017 | Stevenson et al. |
| 2018/0001548 A1 | 1/2018 | Dietrich et al. |
| 2018/0104793 A1 | 4/2018 | Franke et al. |
| 2018/0117793 A1 | 5/2018 | Wang |
| 2018/0126515 A1 | 5/2018 | Franke et al. |
| 2018/0133803 A1 | 5/2018 | Karuppoor |
| 2018/0178348 A1 | 6/2018 | Xiao et al. |
| 2018/0178351 A1 | 6/2018 | Lindvall et al. |
| 2018/0214988 A1 | 8/2018 | Alves |
| 2018/0237329 A1 | 8/2018 | Drewnowski et al. |
| 2018/0305266 A1 | 10/2018 | Gibson et al. |
| 2018/0333781 A1 | 11/2018 | Ederer et al. |
| 2019/0022826 A1 | 1/2019 | Franke et al. |
| 2019/0047214 A1 | 2/2019 | Franke et al. |
| 2019/0185351 A1 | 6/2019 | Huang et al. |
| 2019/0243339 A1 | 8/2019 | Katogi et al. |
| 2020/0001429 A1 | 1/2020 | Rapaka et al. |
| 2020/0070311 A1 | 3/2020 | Smithson et al. |
| 2020/0079028 A1* | 3/2020 | Miller .................... B22F 10/47 |
| 2020/0101534 A1* | 4/2020 | Gibson ................ B33Y 10/00 |
| 2020/0139507 A1 | 5/2020 | Yamamura et al. |
| 2020/0230695 A1 | 7/2020 | Protzmann et al. |
| 2020/0384694 A1 | 12/2020 | Ceriani |
| 2021/0001452 A1 | 1/2021 | Xiao et al. |
| 2021/0196436 A1 | 7/2021 | Raby et al. |
| 2021/0379836 A1 | 12/2021 | Fadurdo Orellana et al. |
| 2022/0203616 A1 | 6/2022 | Korten et al. |
| 2022/0282144 A1 | 9/2022 | Tanikella et al. |
| 2022/0332651 A1 | 10/2022 | Tanikella et al. |
| 2023/0111065 A1 | 4/2023 | Schumacher et al. |
| 2023/0211463 A1 | 7/2023 | Tanikella et al. |
| 2023/0211469 A1 | 7/2023 | Tanikella et al. |
| 2023/0211471 A1 | 7/2023 | Tanikella et al. |

FOREIGN PATENT DOCUMENTS

| | | |
|---|---|---|
| CN | 1212494 C | 7/2005 |
| CN | 1640596 A | 7/2005 |
| CN | 1962061 A | 5/2007 |
| CN | 102233269 B | 11/2011 |
| CN | 101804603 B | 5/2012 |
| CN | 102462996 A | 5/2012 |
| CN | 102658528 A | 9/2012 |
| CN | 102824789 A | 12/2012 |
| CN | 102936141 A | 2/2013 |
| CN | 202777185 U | 3/2013 |
| CN | 103264361 A | 8/2013 |
| CN | 103748309 A | 4/2014 |
| CN | 104014215 A | 9/2014 |
| CN | 104047547 A | 9/2014 |
| CN | 102873401 B | 11/2014 |
| CN | 203944262 U | 11/2014 |
| CN | 203980474 U | 12/2014 |
| CN | 203984693 U | 12/2014 |
| CN | 104259892 B | 1/2015 |
| CN | 104531065 B | 4/2015 |
| CN | 104566665 A | 4/2015 |
| CN | 104908166 A | 9/2015 |
| CN | 104924499 A | 9/2015 |
| CN | 104990154 A | 10/2015 |
| CN | 105563352 A | 5/2016 |
| CN | 105921793 A | 9/2016 |
| CN | 106280528 A | 1/2017 |
| CN | 106312843 A | 1/2017 |
| CN | 106425898 A | 2/2017 |
| CN | 106553137 A | 4/2017 |
| CN | 106674876 A | 5/2017 |
| CN | 104285281 B | 6/2017 |
| CN | 106926446 A | 7/2017 |
| CN | 106938335 A | 7/2017 |
| CN | 107150154 A | 9/2017 |
| CN | 107206570 A | 9/2017 |
| CN | 105562825 B | 10/2017 |
| CN | 107538359 A | 1/2018 |
| CN | 105649538 B | 2/2018 |
| CN | 105415216 B | 3/2018 |
| CN | 107825305 A | 3/2018 |
| CN | 107838820 A | 3/2018 |
| CN | 107866752 A | 4/2018 |
| CN | 107866753 A | 4/2018 |
| CN | 107900927 A | 4/2018 |
| CN | 107914216 A | 4/2018 |
| CN | 107921471 A | 4/2018 |
| CN | 108081158 A | 5/2018 |
| CN | 207415166 U | 5/2018 |
| CN | 108326764 A | 7/2018 |
| CN | 106493651 B | 10/2018 |
| CN | 108612482 A | 10/2018 |
| CN | 108620583 A | 10/2018 |
| CN | 108747868 A | 11/2018 |
| CN | 208132742 U | 11/2018 |
| CN | 208132743 U | 11/2018 |
| CN | 208132744 U | 11/2018 |
| CN | 109157296 A | 1/2019 |
| CN | 208543373 U | 2/2019 |
| CN | 109483418 A | 3/2019 |
| CN | 109534845 A | 3/2019 |
| CN | 110340817 A | 10/2019 |
| CN | 210452395 U | 5/2020 |
| CN | 109366374 B | 11/2020 |
| DE | 3937697 A1 | 5/1991 |

(56) References Cited

FOREIGN PATENT DOCUMENTS

| | | |
|---|---|---|
| DE | 19834559 A1 | 2/2000 |
| DE | 19909882 A1 | 9/2000 |
| DE | 102009006189 A1 | 7/2010 |
| DE | 102015115406 A1 | 3/2017 |
| DE | 102017221111 A1 | 6/2018 |
| DE | 102017113369 A1 | 12/2018 |
| DE | 202018104180 U1 | 12/2018 |
| DE | 10-2019-219859 A1 | 6/2021 |
| DE | 10-2019-219867 A1 | 6/2021 |
| EP | 0127339 B1 | 3/1988 |
| EP | 1066134 B1 | 5/2002 |
| EP | 1878486 A1 | 1/2008 |
| EP | 3053677 A1 | 8/2016 |
| EP | 1778601 B1 | 9/2017 |
| EP | 3281695 A1 | 2/2018 |
| EP | 2025454 B1 | 4/2018 |
| EP | 3009233 A1 | 12/2018 |
| EP | 3418002 A1 | 12/2018 |
| EP | 3307483 B1 | 6/2020 |
| GB | 2527938 A | 1/2016 |
| JP | H02237759 A | 9/1990 |
| JP | H04372366 A | 12/1992 |
| JP | H05046404 U | 6/1993 |
| JP | H0691536 A | 4/1994 |
| JP | H0811051 A | 1/1996 |
| JP | H09309108 A | 12/1997 |
| JP | 2982661 B2 | 11/1999 |
| JP | H11322408 A | 11/1999 |
| JP | 3086103 B2 | 9/2000 |
| JP | 2005199619 A | 7/2005 |
| JP | 2006187848 A | 7/2006 |
| JP | 2008119312 A | 5/2008 |
| JP | 2008-302454 A | 12/2008 |
| JP | 2010527888 A | 8/2010 |
| JP | 2014000155 A | 1/2014 |
| JP | 2014-221499 A | 11/2014 |
| JP | 2014529523 | 11/2014 |
| JP | 2016049579 A | 4/2016 |
| JP | 5996195 B2 | 9/2016 |
| JP | 2016172306 A | 9/2016 |
| JP | 6010834 B2 | 10/2016 |
| JP | 2017-154411 A | 9/2017 |
| JP | 6643643 B2 | 2/2020 |
| KR | 10-0578045 B1 | 5/2006 |
| KR | 10-1062801 B1 | 9/2011 |
| KR | 20150117723 A | 10/2015 |
| KR | 101760271 B1 | 7/2017 |
| KR | 10-2018-0129059 A | 12/2018 |
| KR | 10-2323009 B1 | 11/2021 |
| MX | 2011001443 A | 4/2011 |
| WO | 93-25336 A1 | 12/1993 |
| WO | 94-02562 A1 | 2/1994 |
| WO | 96-33638 A1 | 10/1996 |
| WO | 98-56566 A1 | 12/1998 |
| WO | 99-15293 A1 | 4/1999 |
| WO | 99-48646 A1 | 9/1999 |
| WO | 01-72502 A1 | 10/2001 |
| WO | 2003026714 A1 | 4/2003 |
| WO | 2003092748 A1 | 11/2003 |
| WO | 03-106148 A1 | 12/2003 |
| WO | 2004-110719 A2 | 12/2004 |
| WO | 2005075000 A1 | 8/2005 |
| WO | 2007026387 A2 | 3/2007 |
| WO | 2009009558 A1 | 1/2009 |
| WO | 2010016959 A2 | 2/2010 |
| WO | 2013-026972 A1 | 2/2013 |
| WO | 2014-140689 A1 | 9/2014 |
| WO | 2014137890 A1 | 9/2014 |
| WO | 2014-165390 A1 | 10/2014 |
| WO | 2014161816 A2 | 10/2014 |
| WO | 2015-069849 A1 | 5/2015 |
| WO | 2016022449 A1 | 2/2016 |
| WO | 2016032883 A1 | 3/2016 |
| WO | 2016-058091 A1 | 4/2016 |
| WO | 2016123505 A1 | 8/2016 |
| WO | 2016-192140 A1 | 12/2016 |
| WO | 2016-209696 A1 | 12/2016 |
| WO | 2016-210057 A1 | 12/2016 |
| WO | 2017-007999 A1 | 1/2017 |
| WO | 2017034951 A1 | 3/2017 |
| WO | 2017-137482 A1 | 8/2017 |
| WO | 2017127887 A1 | 8/2017 |
| WO | 2017-173009 A1 | 10/2017 |
| WO | 2017214179 A1 | 12/2017 |
| WO | 2018010730 A2 | 1/2018 |
| WO | 2018-080778 A1 | 5/2018 |
| WO | 2018118566 A1 | 6/2018 |
| WO | 2018160297 A1 | 9/2018 |
| WO | 2019210111 | 10/2019 |
| WO | 2019230214 A1 | 12/2019 |
| WO | 2020012501 A1 | 1/2020 |
| WO | 2020102025 A1 | 5/2020 |
| WO | 2020-128779 A2 | 6/2020 |
| WO | 2020220143 A1 | 11/2020 |
| WO | 2021-001730 A1 | 1/2021 |
| WO | 2021-009673 A1 | 1/2021 |
| WO | 2021-038438 A1 | 3/2021 |
| WO | 2021-038465 A1 | 3/2021 |
| WO | 2021076986 A1 | 4/2021 |
| WO | 2021-116859 A1 | 6/2021 |
| WO | 2021119290 A1 | 6/2021 |
| WO | 2021119319 A1 | 6/2021 |
| WO | 2021156730 A1 | 8/2021 |
| WO | 2021221918 A1 | 11/2021 |
| WO | 2022006201 A1 | 1/2022 |
| WO | 2022-107038 A1 | 5/2022 |
| WO | 2022090904 A1 | 5/2022 |
| WO | 2022187721 A1 | 9/2022 |
| WO | 2023130059 A1 | 7/2023 |
| WO | 2023130082 A1 | 7/2023 |
| WO | 2023130088 A1 | 7/2023 |

OTHER PUBLICATIONS

Melcher, R., et al., "Fabrication of Al2O3-based composites by indirect 3D-printing", Materials Letters 60 (2006) pp. 572-575.

Seleznev, Maxim, et al., "Novel Near-Net-Shape Tool-Less Method for Manufacturing Cast Metal Matrix Composites: Three-Dimensional Printing of Ceramic Preforms Combined with Investment Casting Technology", SAE Transactions, vol. 109, Section 5: Journal of Materials & Manufacturing (2000), pp. 235-242.

Winkel, Alexander, et al., "Sintering of 3D-Printed Glass/Hap Composites", Journal of the American Ceramic Society, vol. 95, No. 11, Nov. 2012, pp. 3387-3393.

Zhang, Wei, et al., "Three-Dimensional Printing of Complex-Shaped Alumina/Glass Composites", Advanced Engineering Materials 2009, 11, No. 12, pp. 1038-1043.

Spierings, Adriaan Bernardus, et al., "Processing of metal-diamond-composites using selective laser melting", Rapid Prototyping Journal, vol. 21, No. 2, 2015, pp. 130-136.

Zocca, Andrea, et al., "Additive Manufacturing of Ceramics: Issues, Potentialities, and Opportunities", Journal of the American Ceramic Society, Jul. 2015, vol. 98, No. 7, pp. 1983-2001.

Guo, Nannan, et al., "Additive Manufacturing: technology, applications and research needs," Front. Mech. Eng., 2013, 8(3), pp. 215-243.

Yin, Xiaowei, et al., "Three-Dimensional Printing of Nanolaminated Ti3AlC2 Toughened TiAl3-Al2O3 Composites," Journal of the American Ceramic Society, Jul. 2007, vol. 90, No. 7, pp. 2128-2134.

Bak, David, "Rapid prototyping or rapid production? 3D printing processes move industry towards the latter", Assembly Automation, 2003, vol. 23, No. 4, pp. 340-345.

3M Technology, "3D Printed Abrasives", YouTube Video, Uploaded Jun. 4, 2019, 1 page. <https://www.youtube.com/watch?v=TtYte11-BsM>.

"New Infographic: How It Works . . . Software-Driven 3D Post-Printing with AUTOMAT3D™", Jun. 20, 2018, 5 pages.

AmericaMakes, "Success Story: Hybrid Direct Manufacturing: Integrating Additive and Subtractive Methods—Improving Productivity by Integrating Automatic Finishing with Direct Metal Additive Manufacturing," 2017, 2 pages.

(56) References Cited

OTHER PUBLICATIONS

Kumbhar_N.N. et al., "Post Processing Methods used to Improve Surface Finish of Products which are Manufactured by Additive Manufacturing Technologies: A Review", J. Inst. Eng. India Ser. C (Aug. 2018) 99(4):481-487, 7 pages.
International Search Report from PCT Application No. PCT/US2019/029239 dated Sep. 11, 2019, 5 pages.
International Search Report from PCT Application No. PCT/US2020/056111 dated Feb. 10, 2021, 5 pages.
International Search Report from PCT Application No. PCT/US2020/064322 dated Mar. 16, 2021, 5 pages.
International Search Report for PCT/US2021/028910 dated Aug. 5, 2021, 4 pages.
International Search Report for PCT/US2022/019047 dated Jun. 17, 2022, 5 pages.
International Search Report for PCT/US2022/019046 dated Jun. 17, 2022, 4 pages.
Beyer, Dr. Peter, "Exploring the New Dimensions of 3D Abrasives Technology," The Meister Toolbox, Jul. 7, 2016, 2 pages.
Lewis, Jennifer A., et al., "Direct Ink Writing of Three-Dimensional Ceramic Structures," J. Am. Ceram. Soc., 89 [12] 3599-3609, 2006, 11 pages.
Cabala et al., "Silver nanoparticle surface functionalized alumina filters for disinfection of potable water," Material Today: Proceedings 2 (2015) 321-330.
Wehling et al. "Silver nanoparticle-doped zirconia capillaries for enhanced bacterial filtration." Material Science and Engineering C 48 (2015) 179-187.
Yang et al., "Development and Characterization of Porous Silver-Incorporated Hydroxyapatite Ceramic for Separation and Elimination of Microorganisms." Published online Wiley InterScience Aug. 29, 2006.
Li et al. "Removal and retention of viral aerosols by a novel alumina nanofiber filter." Aerosol Science 40 (2009) 65-71.
Tepper, et al., "Novel Nanofibre Filter Medium Attracts Waterborne Pathogens," Jul./Aug. 2002, www.filtsep.com, 4 pages.
Virus Absorbing Air Filter, 21.2, (1991), 521-523.
International Search Report for Application No. PCT/US2020/064282 dated Apr. 8, 2021, 3 pages.
International Search Report & Written Opinion for PCT/US2017/058808, mailed Feb. 19, 2018, 12 pages.
International Search Report for Application No. PCT/US2022/082650 dated May 4, 2023, 4 pages.
International Search Report for Application No. PCT/US2022/082641 dated May 2, 2023, 4 pages.
International Search Report for Application No. PCT/US2022/082606 dated May 9, 2023, 4 pages.
ExOne Binder Jetting Technology, "What is Binder Jetting?", <https://www.exone.com/en-US/case-studies/what-is-binder-jetting>, retrieved Oct. 3, 2019, 2 pages.
Abrasive Technology—Current Development and Applications I, Proceedings of the Third International Conference on Abrasive Technology (ABTEC '99), Brisbane, Australia, Nov. 1999, 556 pages (Abstract).
Beyer, Dr. Peter, "Exploring the New Dimensions of 3D Abrasives Technology," The Meister Toolbox, Jul. 7, 2016, 2 pages, <https://meister-abrasives-toolbox.com/2016/07/07/exploring-the-new-dimensions-of-3d-abrasives-technology/>.
Doremalen, et al., "Aerosol and Surface Stability of SARS-COV-2 as Compared with SARS-COV-1", The New England Journal of Medicine, 382;16, Apr. 16, 2020, 4 pages <https://www.nejm.org/doi/full/10.1056/NEJMc2004973>.
Ensoll Tools, "CBN Wire Loops or Diamond Wire Loops is Fit for Metal Cutting?", <http://www.ensolltools.com/en/news/new-88-81.html> Accessed May 12, 2022.
Chaplin, Brian P., "Critical Review of Electrochemical Advanced Oxidation Proceses for Water Treatment Applications," Department of Chemical Engineering, University of Illinois at Chicago, Environmental Science: Processes and Impacts, The Royal Society of Chemistry, 2013, 24 pages.
Morawska, Lidia, et al., "Airborne transmission of SARS-COV-2: The world should face the reality", International Laboratory for Air Quality and Health, Environment International 139 (2020) 105730.
Olsen, Sonja J., et al., "Transmission of the Severe Acute Respiratory Syndrome on Aircraft", The New England Journal of Medicine, 349:25, Dec. 18, 2003.
International Search Report and Written Opinion for PCT/US2022/082641, dated May 2, 2023, 10 pages.
Tian, Chenchen, et al., "Study on design and performance of metal-bonded diamond grinding wheels fabricated by selective laser melting (SLM)", Materials and Design 156 (2018), pp. 52-61 <https://doi.org/10.1016/j.matdes.2018.06.029>.
Tian, Chenchen, et al., "The effect of porosity on the mechanical property of metal-bonded diamond grinding wheel fabricated by selective laser melting (SLM)", Materials Science & Engineering A 743 (2019), pp. 697-706 <https://doi.org/10.1016/j.msea.2018.11.138>.
Tian, Chenchen, et al., "Porous structure design and fabrication of metal-bonded diamond grinding wheel based on selective laser melting (SLM)", The International Journal of Advanced Manufacturing Technology (2019) 100: 1451-1462 <https://doi.org/10.1007/s00170-018-2734-y>.
Tian, Chenchen, et al., "Study on formability, mechanical property and finite element modeling of 3D-printed composite for metal-bonded diamond grinding wheel application", Journal of Manufacturing Processes 54 (2020), pp. 38-47 <https://doi.org/10.1016/j.jmapro.2020.02.028>.
Qiu, Yanfei, et al., "Effect of additive particles on the performance of ultraviolet-cured resin-bond grinding wheels fabricated using additive manufacturing technology", The International Journal of Advanced Manufacturing Technology (2018) 97: 9873-3882 <https://doi.org/10.1007/s00170-018-2231-3>.
Yang, Zhibo, et al., "A study on diamond grinding wheels with regular grain distribution using additive manufacturing (AM) technology", Materials and Design 104 (2016) pp. 292-297 <http://dx.doi.org/10.1016/j.matdes.2016.04.104>.
Du, Zhi-jun, et al., "Selective laser sintering and grinding performance of resin bond diamond grinding wheels with arrayed internal cooling holes", Ceramics International 45 (2019) p. 20873-20881 <https://doi.org/10.1016/j.ceramint.2019.07.076>.
Search Results, Mar. 4, 2021, 14 pages.
3M, "3D Printed Superabrasives", 2024, 6 pages <https://www.3m.com/3M/en_US/metalworking-US/applications/grinding/precision-grinding/technology/superabrasives/precision-structured-wheels/>.
3M, "Precision Grinding and Microfinishing", 2024, 3 pages <https://www.3m.com/3M/en_US/metalworking-US/applications/grinding/precision-grinding/>.
3M, "Precision Grinding and Finishing Technology", 2024, 3 pages <https://www.3m.com/3M/en_US/metalworking-US/applications/grinding/precision-grinding/featured-technology/>.
Mishek, Danny, "Time and Money Saved with RP/RT Strategy", Apr. 1, 2007, 4 pages <https://www.moldmakingtechnology.com/articles/time-and-money-saved-with-rp-rt-strategy>.
Yang, Zhibo, et al., "Interface Microstructure and Formation Mechanism of Diamond Abrasives Laser Brazed with Ni—Cr Solder", Rare Metal Materials and Engineering, 45, 5, 1152-1156, 2016, Abstract Only.
Sears, James W., "Developing New Applications Based on Laser Additive Manufacturing of WC Cermets and WC Forming Alloys (Invited Paper)", Chinese Journal of Lasers, 36, 12, 3245-3250, 2009, Abstract Only.
Webster, J., et al., "Innovations in abrasive products for precision grinding", Cirp Annals-Manufacturing Technology, 53, 2, 597-617, 2004Conference: 54th General Assembly of CIRP, Krakow, Poland, Aug. 22-28, 2004, Abstract Only.
Maekawa, K., et al., "Fabrication of metal-bonded grinding/polishing tools by greentape laser sintering method", Precision Machining of Advanced Materials, 196, 133-140, 2001, Abstract Only.
Yang, Zhibo, et al., "3D Printing of Diamond Tools for Dental Ceramics Processing", Advanced Engineering Materials, 20, 3, 2018 Language: English, Abstract Only.

(56) References Cited

OTHER PUBLICATIONS

Peng, Ruitao, et al., "Performance of a pressurized internal-cooling slotted grinding wheel system", International Journal of Advanced Manufacturing Technology, 94, 5-8, 2239-2254, 2018, Abstract Only.

Stoyanov, Pantcho, et al., "Microstructural and mechanical characterization of Mo-containing Stellite alloys produced by three dimensional printing", Procedia CIRP 45 (2016) pp. 167-170.

Myers, Kyle, "Structure-Property Relationship of Binder Jetted Fused Silica Preforms to Manufacture Ceramic-Metallic Interpenetrating Phase Composites", Youngstown State University, May 2016, 252 pages.

Search Results, Apr. 19, 2019, 18 pages.

Search Results, May 2020, 11 pages.

Search Results, Nov. 2022, 7 pages.

Advanti Technology P L, "3D Metal Printer ExOne" May 1, 2014 <https://www.youtube.com/watch?v=Zq10BOV-ttw>.

Xu, Xipeng, et al., "The fabrication of grinding wheels with 3-dimensional controllable abrasives arrangement using stereolithography apparatus method", Huaqiao University, China, 2nd International Conference on 3D Printing Technology and Innovations, 2018, abstract only.

Lu, Jing, et al., "Protecting diamond abrasive from being corroded in the vitrified bond wheel manufactured by 3D printing", Institute of Manufacturing Engineering, Huaqiao University, Xiamen, P.R. China, 2nd International Conference on 3D Printing Technology and Innovations, 2018, abstract only.

Yang, Zhibo, Li Kaiqiang, Hu Junchen, Zhang Shiyu. Temperature field simulation of grinding wheel preparation by selective laser sintering of nickel-based binder[J]. Heat Treatment of Metals, 2018, 43(10): 210-216, abstract only.

Zhang, Shubo, et al., "The design and fabrication of porous sintered grinding wheel based on Selective Laser Melting technology", Journal of Physics: Conference Series, vol. 1074, 2018, 10 pages <DOI: 10.1088/1742-6596/1074/1/012157>.

Tanaka, T., et al., "New development of a grinding wheel with resin cured by ultraviolet light", Journal of Materials Processing Technology, vol. 113, Issues 1-3, Jun. 15, 2001, pp. 385-391, abstract only.

Tanaka, T., et al., "Development of Grinding Wheels by Stereolithography and Investigation of their Characteristics", Key Engineering Materials, Apr. 2003, 238-239:277-282, abstract only <DOI: 10.4028/www.scientific.net/KEM.238-239.277>.

Okushima, Kenichi, et al., "Development of resin-bonded grinding wheel by stereolithography", Journal of the Japan Society for Precision Engineering 69(10): 1459-1463, Oct. 2003, abstract only <DOI: 10.2493/jjspe.69.1459>.

Yamamoto, Daiki, et al., "ELID grinding wheel fabrication technology applying PELID and 3D printer" Journal of the Japan Society for Abrasive Technology, 2016, vol. 60, Issue 5, pp. 267-268, abstract only <DOI: https://doi.org/10.11420/jsat.60.267>.

Tsukada, Namiki, et al., "Construction of laminated grinding wheel production system using PELID". Jan. 2016, The Proceedings of the Conference on Information Intelligence and Precision Equipment IIP 2016:H-2-3, abstract only <DOI: 10.1299/jsmeiip.2016.H-2-3>.

Iinuma, Ryosuke et al., "Grinding wheel fabrication using twin nozzle PELID and its characteristics", Jan. 2017, The Proceedings of Ibaraki District Conference 2017.25:715, abstract only <DOI: 10.1299/jsmeibaraki.2017.25.715>.

Ohno, Ryouhei, et al., "Development of ELID grinding wheel using PELID and nano-diamond", 2016, 2 pages, English abstract.

Saito, Hiroki, et al., "Development of Resin ball grinding wheel using PELID", Jan. 2016, The Proceedings of Ibaraki District Conference 2016.24:709, abstract only <DOI: 10.1299/jsmeibaraki.2016.24.709>.

Yano, Toui, et al., "Development and evaluation of ELID grinding wheel using 3D printer and PELID". Jan. 2017, The Proceedings of Ibaraki District Conference 2017.25:714, Abstract only <DOI: 10.1299/jsmeibaraki.2017.25.714>.

Jimenez, Edgar Mendoza, et al., "Parametric analysis to quantify process input influence on the printed densities of binder jetted alumina ceramics," Additive Manufacturing 39 (2019) 100864, 9 pages.

Jimenez, Edgar Mendoza, et al., SI, "Parametric analysis to quantify process input influence on the printed densities of binder jetted alumina ceramics," Additive Manufacturing 39 (2019) 100864, 5 pages.

\* cited by examiner

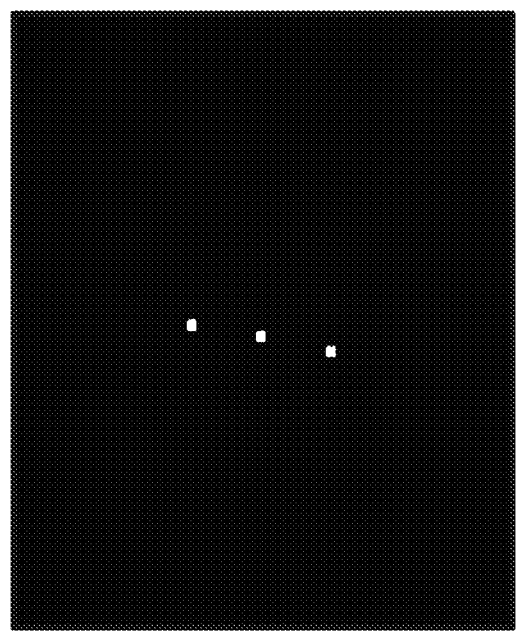
FIG. 4E
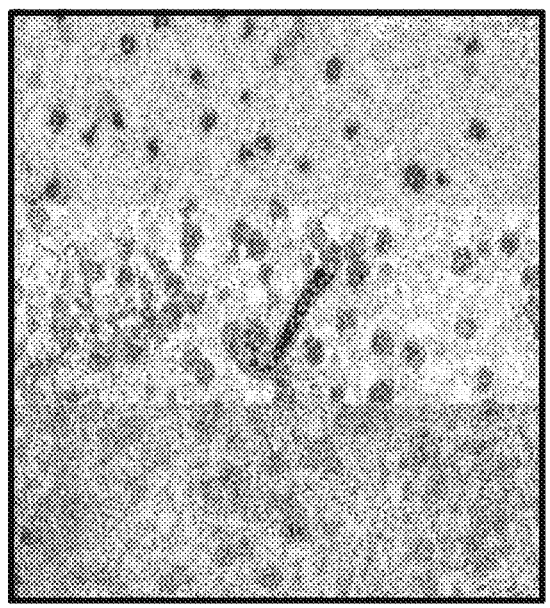 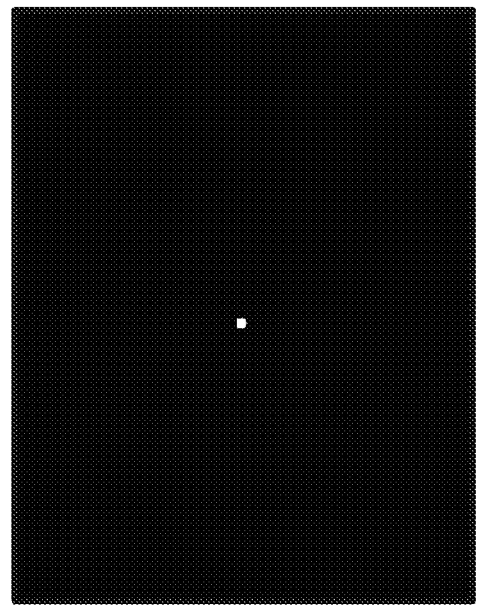
FIG. 5A                                FIG. 5B

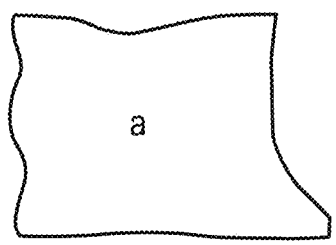 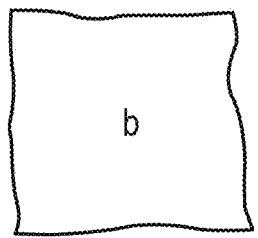 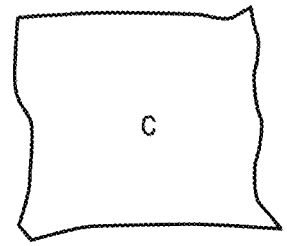
*FIG. 7B*
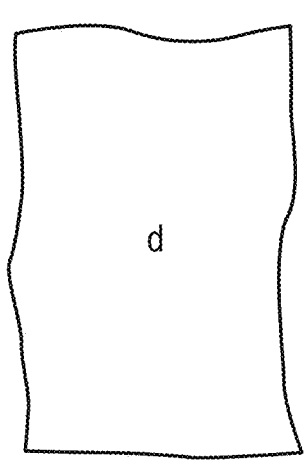 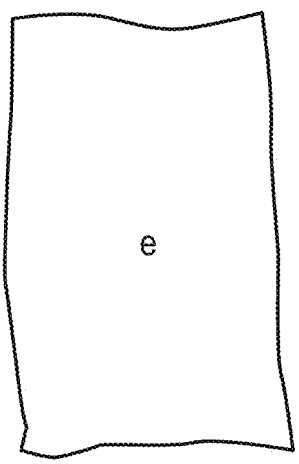 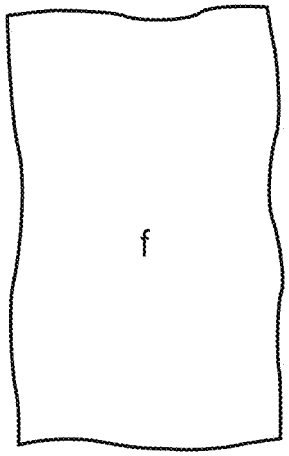
*FIG. 7C*
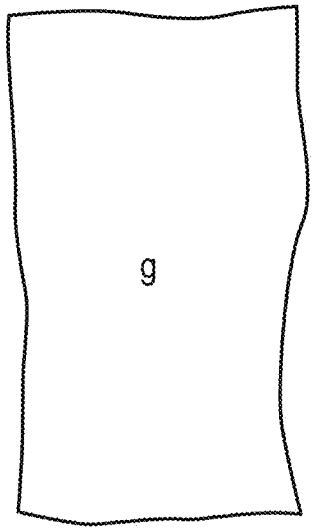 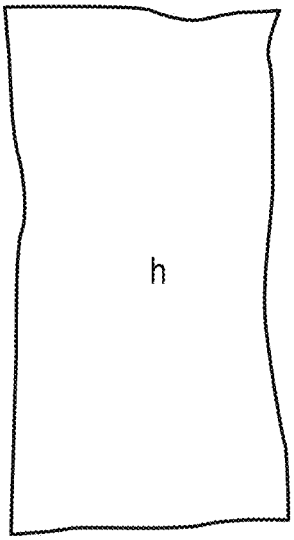 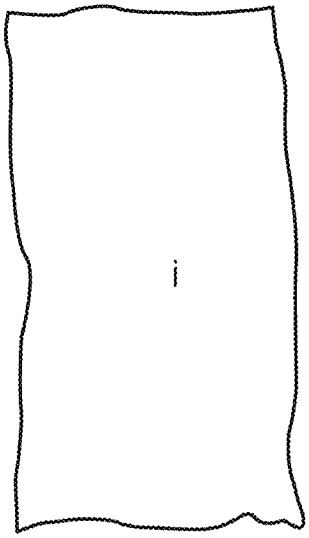
*FIG. 7D*

ABRASIVE ARTICLES AND METHODS FOR FORMING SAME

CROSS-REFERENCE TO RELATED APPLICATION(S)

This application claims priority under 35 U.S.C. § 119(e) to U.S. Provisional Patent Application No. 63/266,281, filed Dec. 30, 2021, by Brahmanandam V. TANIKELLA et al., entitled "ABRASIVE ARTICLES AND METHODS FOR FORMING SAME," which is assigned to the current assignee hereof and incorporated herein by reference in its entirety for all purposes.

FIELD OF THE DISCLOSURE

The present disclosure relates to forming abrasive articles and aspects of one or more green bodies and/or finally-formed abrasive articles.

BACKGROUND

Abrasive articles are used in material removal operations, such as cutting, grinding, or shaping various materials. Abrasive articles or green bodies of abrasive articles can be formed via additive manufacturing. There is a need to develop improved abrasive articles.

BRIEF DESCRIPTION OF THE DRAWINGS

Embodiments are illustrated by way of example and are not limited in the accompanying figures.

FIGS. 4A-E include cross-sectional images of abrasive articles according to an embodiment.

FIGS. 5A and 5B include images from a bonded abrasive formed through conventional processing techniques of hot pressing.

FIGS. 7B-D include cross-sectional images of the abrasive article of FIG. 7A.

DESCRIPTION

Figure 1A:
FIGS. 1A-E include illustrations of a process of forming an abrasive article according to an embodiment.

The present disclosure may be better understood, and its numerous features and advantages made apparent to those skilled in the art by referencing the accompanying drawings.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to methods for forming abrasive articles and the features of the resulting abrasive articles. While prior disclosures have provided some limited examples of forming abrasive articles via additive manufacturing, such abrasive articles are limited in their size, quantity, and quality. In fact, Applicants of the present disclosure have conducted notable empirical studies and have found that the knowledge necessary to create high quality abrasive articles according to conventional additive manufacturing techniques is noted, specifically in the context of dry powder layering and binding techniques. To-date, disclosures in the prior art are limited to micro-abrasive bodies. This is because formation of large-scale, high-quality abrasive articles via dry powder layering and binding techniques is not easily scalable. Numerous hurdles limit the advance of the technology, including but not limited to, the capability of creating dense parts, dimensional stability during and after forming, and the empirical studies needed to fully understand and appreciate the complexities of the process variables. Such process variables include, but is not limited to, composition of the powder material, flowability of the powder material, a force applied by a compaction object to the layer or a plurality of layers of powder, a traverse speed of a compaction object, average thickness of the layer prior to compaction, a particle size distribution of the powder, number of previously formed layers underlying the layer of powder, the number of compacted layers underlying the layer of powder, the density of any layers underlying the layer of powder, the amount of binder in any layers underlying the layer of powder, the relative dimensions of the layer relative to one or more layers underlying the layer, an average thickness of the layer prior to compaction, a printhead deposition resolution, saturation limits of the binder, composition of the binder material, and others.

In one aspect, the additive manufacturing techniques of the embodiments herein may be part of a binder jetting manufacturing process.

FIG. 1A includes an illustration of a portion of the process including forming one or more layers of powder material that can include abrasive particles, and may include a mixture of abrasive particles and precursor bond material. The layer of powder can have an average thickness (t). The layer of powder material can be dispensed as described in embodiments herein.

In an embodiment, the layer of powder material can have an average thickness (t) that may facilitate improved manufacturing and/or performance of the abrasive article. In an embodiment, the layer of powder material can have an average thickness (t) of at least 1 micron, such as at least 5 microns or at least 10 microns or at least 15 microns or at least 20 microns or at least 25 microns. In still another embodiment, the layer of powder material can have an average thickness (t) of not greater than 500 microns, such as not greater than 400 microns or not greater than 300 microns or not greater than 200 microns or not greater than 100 microns or not greater than 90 microns or not greater than 80 microns or not greater than 70 microns or not greater than 60 microns or not greater than 50 microns or not greater than 40 microns or not greater than 30 microns or not greater than 20 microns. The average thickness (t) of the layer of powder material may be a value between any of the minimum and maximum values noted above, including for example, but not limited to, within a range of at least 1 microns to not greater than 500 microns or within a range of at least 10 microns to not greater than 300 microns or within a range of at least 25 micron to not greater than 100 microns.

In a particular embodiment, forming one or more layers of powder material can include depositing the powder material from a container via agitation of the powder material in the container, which then flows through a screen in the container, and wherein the powder material drops from the container via gravity into a build box or a previously deposited layer of powder material. In still other embodiments, the method of agitation and the screen size can be selected based upon the particle size distribution of the powder.

In one aspect, the powder material may include a precursor bond material that may facilitate improved manufacturing and/or performance of the abrasive article. For example, in one embodiment, the bond material may include one of an organic material, an inorganic material, a metal, a metal alloy, a ceramic, an oxide, a carbide, a nitride, a boride, an amorphous material, a crystalline material, or any combination thereof. In a particular embodiment, the precursor bond material may be converted chemically or undergo a phase change during processing from a precursor bond material to a bond material of a finally-formed abrasive article. In still another embodiment, the precursor bond material does not necessarily undergo any physical or chemical changes during processing and is present as a bond material in the finally-formed abrasive article.

In one aspect, the powder material may include abrasive particles that may facilitate improved manufacturing and/or performance of the abrasive article. For example, in one embodiment, the abrasive particles can include an oxide, a carbide, a nitride, a boride, a superabrasive, or any combination thereof. In an embodiment, the abrasive particles can include diamond, silica, cubic boron nitride, silicon carbide, boron carbide, alumina, silicon nitride, tungsten carbide, zirconia, or any combination thereof.

In an embodiment, the abrasive particles may include a particle size distribution having an average particle size (D50a) that may facilitate improved manufacturing and/or performance of the abrasive article. As used herein, the D50 value signifies the size value in the distribution, up to and including which, 50% of the total counts of the abrasive particles defining the distribution are 'contained'. For example, in a non-limiting example, if the D50 is 25 microns, 50% of the abrasive particles have a size of 25 microns or smaller. It will be appreciated, the D50 value may also be referred to as the median value of a sample. In one embodiment the average particle size (D50a) of the abrasive particles may be at least 0.025 microns, such as at least 0.05 or at least 0.1 microns or at least at least 0.3 microns or at least 0.4 microns or at least 0.5 microns or at least 0.8 microns or at least 1 micron or at least 1.5 microns or at least 2 microns or at least 3 microns or at least 5 microns or at least 10 microns or at least 50 microns or at least 100 microns or at least 200 microns or at least 300 microns. In still another non-limiting embodiment, the average particle size (D50a) of the abrasive particles may be not greater than 500 microns, such as not greater than 400 microns or not greater than 300 microns or not greater than 200 microns or not greater than 100 microns or not greater than 50 microns or not greater than 10 microns or not greater than 5 microns or not greater than 4 microns or not greater than 3 microns or not greater than 3 micron or not greater than 1 microns. The average particle size (D50a) of the abrasive particles may be a value between any of the minimum and maximum values noted above, including for example, but not limited to, within a range of at least 0.25 microns to not greater than 500 microns or within a range of at least 0.5 microns to not greater than 300 microns or within a range of at least 1 micron to not greater than 10 microns.

In still other embodiments, the abrasive particles include abrasive particles having a Mohs hardness of at least 6 such as at least 7 or at least 8 or at least 9. In still another embodiment, the abrasive particles include abrasive particles having a Mohs hardness of not greater than 30, such as not greater than 25 or not greater than 20 or not greater than 15 or not greater than 10. It will be appreciated the Mohs hardness of the abrasive particles may be a value between any of the minimum and maximum values noted above, including for example, but not limited to, within a range of at least 6 to not greater than 30 or at least 8 and not greater than 20.

Figure 1B:
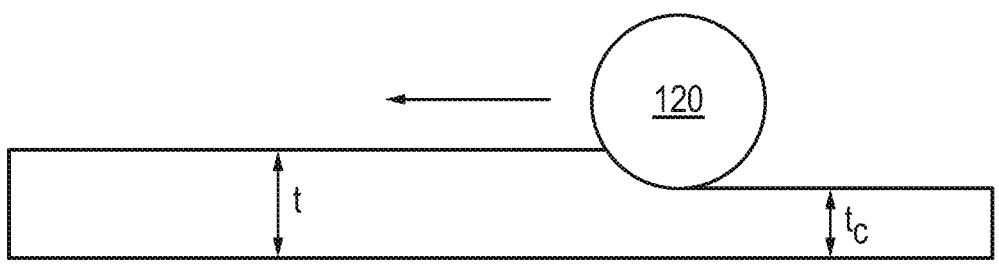

FIG. 1B includes an illustration of a process of compacting at least a portion of the layer with a compaction object (120). The compaction object 120 can traverse the layer and compact the layer to form a compacted layer having an average thickness (tc). The compacted layer thickness (tc) can be less than the layer thickness (t) prior to compaction as described according to embodiments herein. As will be appreciated, in some instances, multiple layers of powder material may be formed and compaction can be completed on more than one layer of powder material simultaneously. In some optional embodiments, a smoothing roller may traverse the surface of the layer of powder, but smoothing rollers do not apply sufficient force to cause compaction, rather they scrape the surface of the layer to remove and smooth any large undulations. In still another embodiment, the smoothing roller is configured to contact the upper surface of the layer sufficiently to spread the powder material and smooth the upper surface after forming the layer.

In an embodiment, the compacted layer may include an average compacted layer thickness that may facilitate improved manufacturing and/or performance of the abrasive article. In one embodiment, the average compacted layer thickness may be at least 0.1 microns such as at least 0.5 microns or at least 0.8 microns or at least 1 micron or at least 2 microns or at least 3 microns or at least 4 microns or at least 5 microns or at least 6 microns or at least 7 microns or at least 8 microns or at least 9 microns or at least 10 microns or at least 11 microns or at least 12 microns or at least 13 microns or at least 14 microns or at least 15 microns or at least 16 microns or at least 17 microns or at least 18 microns or at least 19 microns or at least 20 microns or at least 21 microns or at least 22 microns or at least 23 microns or at least 24 microns or at least 25 microns or at least 26 microns or at least 27 microns or at least 28 microns or at least 29 microns or at least 30 microns or at least 31 microns or at least 32 microns or at least 33 microns or at least 34 microns or at least 35 microns or at least 36 microns or at least 37 microns or at least 38 microns or at least 39 microns or at least 40 microns or at least 41 microns or at least 42 microns or at least 43 microns or at least 44 microns or at least 45 microns or at least 46 microns or at least 47 microns or at least 48 microns or at least 49 microns or at least 50 microns or at least 51 microns or at least 52 microns or at least 53 microns or at least 54 microns or at least 55 microns or at least 56 microns or at least 57 microns or at least 58 microns or at least 59 microns or at least 60 microns or at least 65 microns or at least 70 microns or at least 75 microns or at least 80 microns or at least 85 microns or at least 90 microns or at least 95 microns or at least 100 microns or at least 110 microns or at least 120 microns or at least 130 microns or at least 140 microns or at least 150 microns or at least 160 microns or at least 170 microns or at least 180 microns or at least 190 microns or at least 200 microns or at least 210 microns or at least 220 microns or at least 230 microns or at least 240 microns or at least 250 microns. In still another non-limiting embodiment, the average compacted layer thickness may be not greater than 400 microns such as not greater than 300 microns or not greater than 200 microns or not greater than 100 microns or not greater than 90 microns or not greater than 80 microns or not greater than 70 microns or not greater than 60 microns or not greater than 50 microns or not greater than 40 microns or not greater than 30 microns or not greater than 20 microns or not greater than 15 microns or not greater than 10 microns or not greater than 8 microns or not greater than 5 microns or not greater than 3 microns or not greater than 1 micron or not greater than 0.8 microns. The average compacted layer thickness may be a value between any of the minimum and maximum values noted above, including for example, but not limited to, within a range of at least 0.1 microns to not greater than 400 microns or within a range of at least 1 micron to not greater than 200 microns or within a range of at least 5 microns to not greater than 90 microns.

In an embodiment, compacting may include increasing the density of the compacted layer by at least 2% as compared to the layer prior to compacting such as at least 3% or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% or at least 100% or at least 102% or at least 105% or at least 108% or at least 110% or at least 115% or at least 120% or at least 125% or at least 130% or at least 140% or at least 150%. In still another non-limiting embodiment, compacting may include increasing the density of the compacted layer by not greater than 2000% as compared to the layer prior to compacting such as not greater than 1500% or not greater than 1000% or not greater than 900% or not greater than 800% or not greater than 700% or not greater than 600% or not greater than 500%. Compacting may include increasing the density of the compacted layer by any of the minimum and maximum percentages noted above as compared to the layer prior to compacting, including for example, but not limited to, within a range of at least 2% to not greater than 2000% or within a range of at least 13% to not greater than 1000%.

In an embodiment, compacting may include compacting the layer of powder material by at least 1% to not greater than 95% of the original layer thickness of the layer, such as compaction of at least 2% of the original layer thickness of the layer prior to compaction or at least 3% or at least 4% or at least 5% or at least 6% or at least 7% or at least 8% or at least 9% or at least 10% or at least 11% or at least 12% or at least 13% or at least 14% or at least 15% or at least 16% or at least 17% or at least 18% or at least 19% or at least 20% or at least 21% or at least 22% or at least 23% or at least 24% or at least 25% or at least 26% or at least 27% or at least 28% or at least 29% or at least 30% or at least 31% or at least 32% or at least 33% or at least 34% or at least 35% or at least 36% or at least 37% or at least 38% or at least 39% or at least 40% or at least 41% or at least 42% or at least 43% or at least 44% or at least 45% or at least 46% or at least 47% or at least 48% or at least 49% or at least 50% or at least 51% or at least 52% or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94%. In still another non-limiting embodiment, compacting may include compacting the layer of powder material by at least 1% to not greater than 95% of the original layer thickness of the layer, such as compaction of not greater than 94% of the original layer thickness of the layer prior to compaction or not greater than 93% or not greater than 92% or not greater than 91% or not greater than 90% or not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2%. Compacting may include compacting the layer of powder material by any of the minimum and maximum percentages noted above.

Figure 1C:
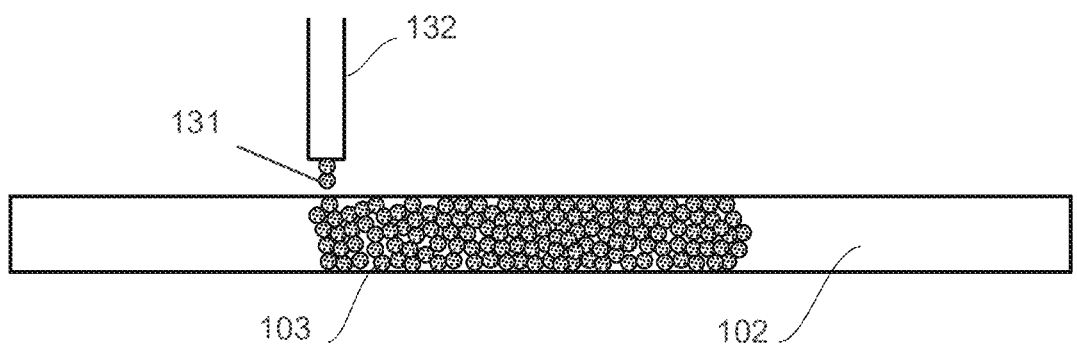

FIG. 1C includes binding at least a portion of the compacted layer of powder material with a binder material. In an embodiment, binding at least a portion of the compacted layer may include the use of a printhead 132 wherein the printhead deposition resolution impacts the amount of binder material 131 selectively deposited. As further depicted, the layer may include a region 102 including loose or unbound powder material without binder material and a region 103 including a region of powder material and binder.

In an embodiment, the binder material may include a liquid vehicle and a polymer material wherein the polymer material can be dissolved in the liquid vehicle. In a particular embodiment, the liquid vehicle may include one or more organic solvents, water, or a combination thereof. In still another embodiment, the organic solvents may include at least one of alcohols (e.g., butanol, ethylene glycol monomethyl ether), ketones, ethers, or any combination thereof. In still another embodiment, the alcohol may include as methyl alcohol, ethyl alcohol, n-propyl alcohol, isopropyl alcohol, n-butyl alcohol, sec-butyl alcohol, t-butyl alcohol, and isobutyl alcohol; ketones or ketoalcohols such as acetone, methyl ethyl ketone, and diacetone alcohol; esters such as ethyl acetate and ethyl lactate; polyhydric alcohols such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, trimethylolpropane ethoxylate; lower alkyl ethers such as ethylene glycol methyl or ethyl ether, diethylene glycol ethyl ether, triethylene glycol methyl or ethyl ether, ethylene glycol n-butyl ether, diethylene glycol n-butyl ether, diethylene glycol methyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol phenyl ether, and dipropylene glycol dimethyl ether; nitrogen-containing compounds such as 2-pyrrolidinone and N-methyl-2-pyrrolidinone; sulfur-containing compounds such as dimethyl sulfoxide, tetramethylene sulfone, and thioglycol; and combinations of any of the foregoing. In still another embodiment, the polymer may include at least one of polyvinyl pyrrolidones, polyvinyl caprolactams, polyvinyl alcohols, polyacrylamides, poly(2-ethyl-2-oxazoline) (PEOX), polyvinyl butyrate, copolymers of methyl vinyl ether, and maleic anhydride, certain copolymers of acrylic acid and/or hydroxyethyl acrylate, methyl cellulose, natural polymers (e.g., dextrin, guar gum, xanthan gum). In an embodiment, the binder material may include one or more free-radically polymerizable or otherwise radiation-curable materials, including at least one of acrylic monomers and/or oligomers and/or epoxy resins, a photoinitiator, and/or photocatalysts for curing the free-radically polymerizable or otherwise radiation-curable materials. In a particular embodiment, the organic solvents may have a flash point above 100° C. In an aspect, the one or more organic solvents may be configured to control drying speed of the liquid vehicle, to control surface tension of the liquid vehicle, or to allow dissolution of an ingredient (e.g., of a surfactant).

The amount of binder material is sufficient to bind the powder material. The regions that do not include binder material can be loose or unbound powder, which may be removed and captured after processing is completed and used as recycled powder. Notably, at the edges of the region between the bound powder material and unbound powder material, the binder material may exist in some of the loose powder. Accordingly, the recycled powder may include some content of organic material, such as binder material that was included in the captured loose or unbound powder material, particularly at the regions bordering the bound and unbound powder. Methods may be used to treat the loose powder material including organic material to remove a certain content of organic material prior to recycling the powder material and using in one or more subsequent additive manufacturing processes to form abrasive articles.

Figure 1D:
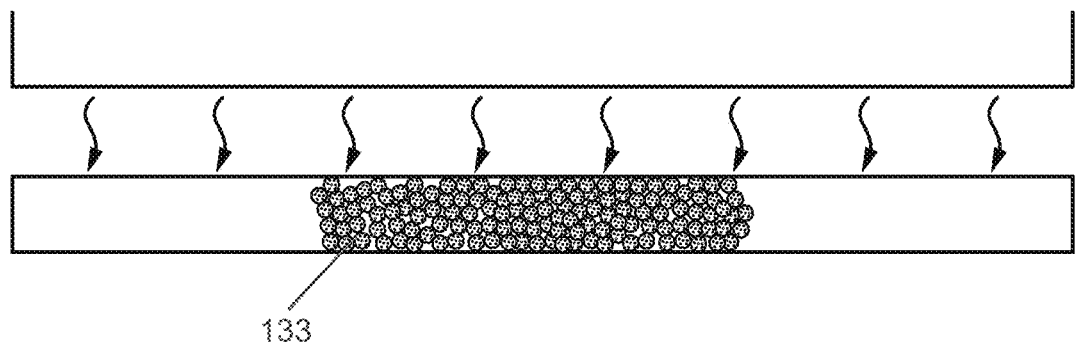

FIG. 1D includes a process for binding the powder material by treating the layer to convert the binder from a liquid material to a solid material to bind the powder material. The process can include curing of at least a portion of the binder material. In a particular embodiment, binding may include evaporation, thermal curing, chemical curing, radiation curing, or any combination thereof.

In an embodiment, forming the green body abrasive article may be conducted at a forming rate that may facilitate improved manufacturing and/or performance of the abrasive article. In an embodiment, forming the green body abrasive article may be conducted at a forming rate of at least 120 cc/hr such as at least 130 cc/hr or at least 150 cc/hr or at least 180 cc/hr or at least 200 cc/hr or at least 300 cc/hr or at least 400 cc/hr or at least 500 cc/hr or at least 600 cc/hr or at least 700 cc/hr or at least 800 cc/hr or at least 900 cc/hr or at least 1000 cc/hr or at least 1200 cc/hr or at least 1400 cc/hr or at least 1600 cc/hr or at least 1800 cc/hr or at least 2000 cc/hr or at least 2200 cc/hr or at least 2400 cc/hr or at least 2600 cc/hr or at least 2800 cc/hr or at least 3000 cc/hr. In still another embodiment, the forming rate may be not greater than 7000 cc/hr such a not greater than 6000 cc/hr or not greater than 5000 cc/hr or not greater than 4000 cc/hr. It will be appreciated the forming rate may be between any of the minimum and maximum values noted above, including for example, but not limited to, within a range of at least 120 cc/hr to not greater than 7000 cc/hr such as within a range of at least 200 cc/hr to not greater than 5000 cc/hr or at least 800 cc/hr to not greater than 3000 cc/hr.

Figure 1E:
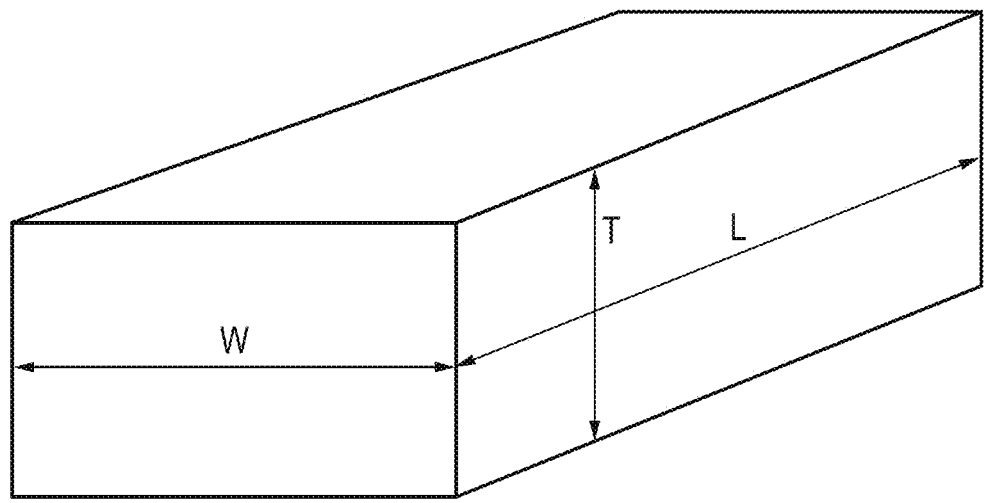

FIG. 1E is an illustration of an abrasive article, which may represent a green body or finally-formed abrasive article. It will be appreciated that the abrasive articles of the embodiments herein can have any three-dimensional shape and FIG. 1E is illustrative of only one possible shape. The length (L) defines the longest dimension of the body and the width (W) defines a dimension of the body substantially perpendicular to the length and may be a value less than the length and greater than the thickness (T). The thickness (T) of the body may extend in a direction perpendicular to a plane defined by the length and width. The dimensions of any body of embodiments herein may have a relationship of length, width, and thickness defined as L≥W≥T. In those instances, wherein the body is in the form of a cylinder with the axial axis being the longest, the length is the longest dimension in the axial direction, the width can be a first diameter of an end surface, and the thickness can be another diameter. In the case of an abrasive article in the form of a disk, wherein the diameter is the greatest dimension, the diameter defines the length of the body, the width defines a diameter perpendicular to the length (and may be the same as the length, and the thickness defines the dimension of the body in an axial direction perpendicular to the plane of the circular end surface. It will be appreciated reference to a length may be reference to a diameter of a circular shape or surface or reference to a primary axis of an elliptical shape or surface. It will also be appreciated reference to a width may be reference to a diameter of a circular shape or surface that is substantially perpendicular to a diameter defining the length or reference to a lateral (secondary) axis of an elliptical shape or surface that extends substantially perpendicular to the primary axis.

In an embodiment, the green body may include a content of abrasive particles that may facilitate improved manufacturing and/or performance of the abrasive article. In an embodiment, the green body may include at least 1 vol % abrasive particles for a total volume of the green body such as at least 2 vol % or at least 3 vol % or at least 4 vol % or at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % or at least 60 vol % or at least 61 vol % or at least 62 vol % or at least 63 vol % or at least 64 vol % or at least 65 vol % or at least 66 vol % or at least 67 vol % or at least 68 vol % or at least 69 vol % or at least 70 vol % or at least 71 vol % or at least 72 vol % or at least 73 vol % or at least 74 vol % or at least 75 vol % or at least 76 vol % or at least 77 vol % or at least 78 vol % or at least 79 vol % or at least 80 vol %. In still other embodiment, the green body may include not greater than 90 vol % abrasive particles for a total volume of the green body such as not greater than 85 vol % or not greater than 80 vol % or not greater than 75 vol % or not greater than 70 vol % or not greater than 69 vol % or not greater than 68 vol % or not greater than 67 vol % or not greater than 66 vol % or not greater than 65 vol % or not greater than 64 vol % or not greater than 63 vol % or not greater than 62 vol % or not greater than 61 vol % or not greater than 60 vol % or not greater than 59 vol % or not greater than 58 vol % or not greater than 57 vol % or not greater than 56 vol % or not greater than 55 vol % or not greater than 54 vol % or not greater than 53 vol % or not greater than 52 vol % or not greater than 51 vol % or not greater than 50 vol % or not greater than 49 vol % or not greater than 48 vol % or not greater than 47 vol % or not greater than 46 vol % or not greater than 45 vol % or not greater than 44 vol % or not greater than 43 vol % or not greater than 42 vol % or not greater than 41 vol % or not greater than 40 vol % or not greater than 39 vol % or not greater than 38 vol % or not greater than 37 vol % or not greater than 36 vol % or not greater than 35 vol % or not greater than 34 vol % or not greater than 33 vol % or not greater than 32 vol % or not greater than 31 vol % or not greater than 30 vol % or not greater than 29 vol % or not greater than 28 vol % or not greater than 27 vol % or not greater than 26 vol % or not greater than 25 vol % or not greater than 24 vol % or not greater than 23 vol % or not greater than 22 vol % or not greater than 21 vol % or not greater than 20 vol % or not greater than 19 vol % or not greater than 18 vol % or not greater than 17 vol % or not greater than 16 vol % or not greater than 15 vol % or not greater than 14 vol % or not greater than 13 vol % or not greater than 12 vol % or not greater than 11 vol % or not greater than 10 vol % or not greater than 9 vol % or not greater than 8 vol % or not greater than 7 vol % or not greater than 6 vol % or not greater than 5 vol %. It will be appreciated the green body may include a percentage of abrasive particles for a total volume of the green body between any of the minimum and maximum values noted above, including for example, but not limited to, within a range of at least 1 vol % to not greater than 99 vol % abrasive particles for a total volume of the green body such as at least 2 vol % to not greater than 80 vol % or at least 10 vol % to not greater than 75 vol %.

In an embodiment, the green body may include a content of precursor bond material that may facilitate improved manufacturing and/or performance of the abrasive article. In an embodiment, the green body may include at least 1 vol % precursor bond material for a total volume of the green body such as at least 2 vol % or at least 3 vol % or at least 4 vol % or at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % or at least 60 vol % or at least 61 vol % or at least 62 vol % or at least 63 vol % or at least 64 vol % or at least 65 vol % or at least 66 vol % or at least 67 vol % or at least 68 vol % or at least 69 vol % or at least 70 vol % or at least 71 vol % or at least 72 vol % or at least 73 vol % or at least 74 vol % or at least 75 vol % or at least 76 vol % or at least 77 vol % or at least 78 vol % or at least 79 vol % or at least 80 vol %. In still other embodiment, the green body may include not greater than 90 vol % precursor bond material for a total volume of the green body such as not greater than 85 vol % or not greater than 80 vol % or not greater than 75 vol % or not greater than 70 vol % or not greater than 69 vol % or not greater than 68 vol % or not greater than 67 vol % or not greater than 66 vol % or not greater than 65 vol % or not greater than 64 vol % or not greater than 63 vol % or not greater than 62 vol % or not greater than 61 vol % or not greater than 60 vol % or not greater than 59 vol % or not greater than 58 vol % or not greater than 57 vol % or not greater than 56 vol % or not greater than 55 vol % or not greater than 54 vol % or not greater than 53 vol % or not greater than 52 vol % or not greater than 51 vol % or not greater than 50 vol % or not greater than 49 vol % or not greater than 48 vol % or not greater than 47 vol % or not greater than 46 vol % or not greater than 45 vol % or not greater than 44 vol % or not greater than 43 vol % or not greater than 42 vol % or not greater than 41 vol % or not greater than 40 vol % or not greater than 39 vol % or not greater than 38 vol % or not greater than 37 vol % or not greater than 36 vol % or not greater than 35 vol % or not greater than 34 vol % or not greater than 33 vol % or not greater than 32 vol % or not greater than 31 vol % or not greater than 30 vol % or not greater than 29 vol % or not greater than 28 vol % or not greater than 27 vol % or not greater than 26 vol % or not greater than 25 vol % or not greater than 24 vol % or not greater than 23 vol % or not greater than 22 vol % or not greater than 21 vol % or not greater than 20 vol % or not greater than 19 vol % or not greater than 18 vol % or not greater than 17 vol % or not greater than 16 vol % or not greater than 15 vol % or not greater than 14 vol % or not greater than 13 vol % or not greater than 12 vol % or not greater than 11 vol % or not greater than 10 vol % or not greater than 9 vol % or not greater than 8 vol % or not greater than 7 vol % or not greater than 6 vol % or not greater than 5 vol %. It will be appreciated the green body may include a percentage of precursor bond material for a total volume of the green body between any of the minimum and maximum values noted above, including for example, but not limited to, within a range of at least 1 vol % to not greater than 99 vol % precursor bond material for a total volume of the green body such as at least 2 vol % to not greater than 80 vol % or at least 10 vol % to not greater than 75 vol %.

Figure 2A:
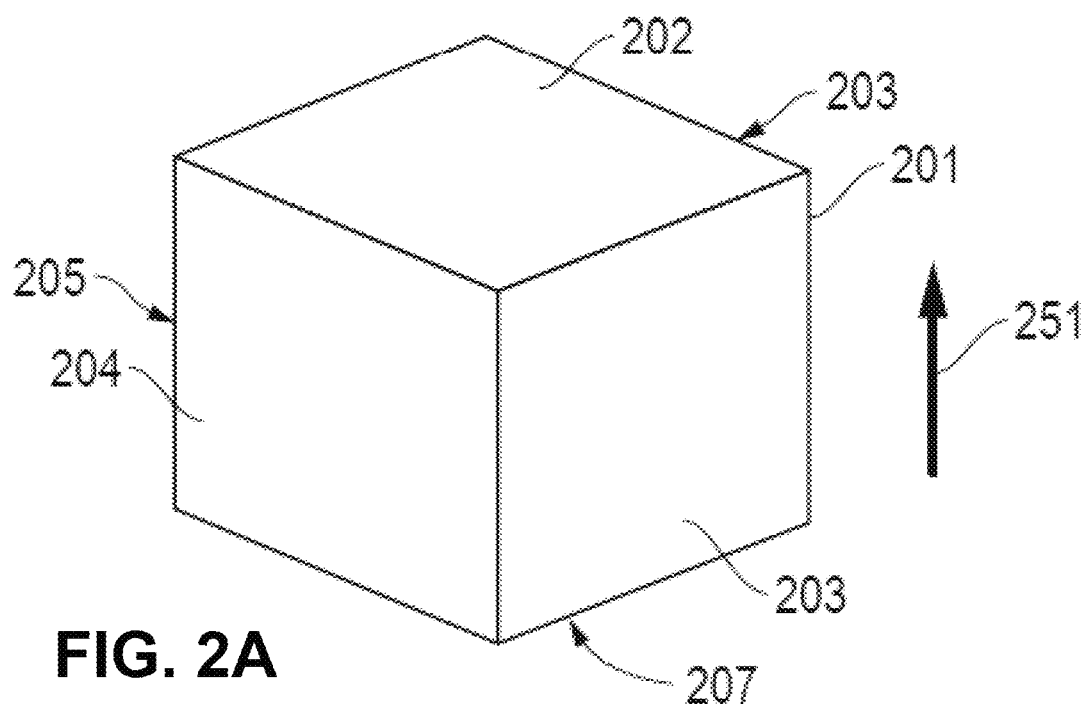
FIGS. 2A and 2B include perspective view illustrations of abrasive articles according to an embodiment.
Figure 2B:
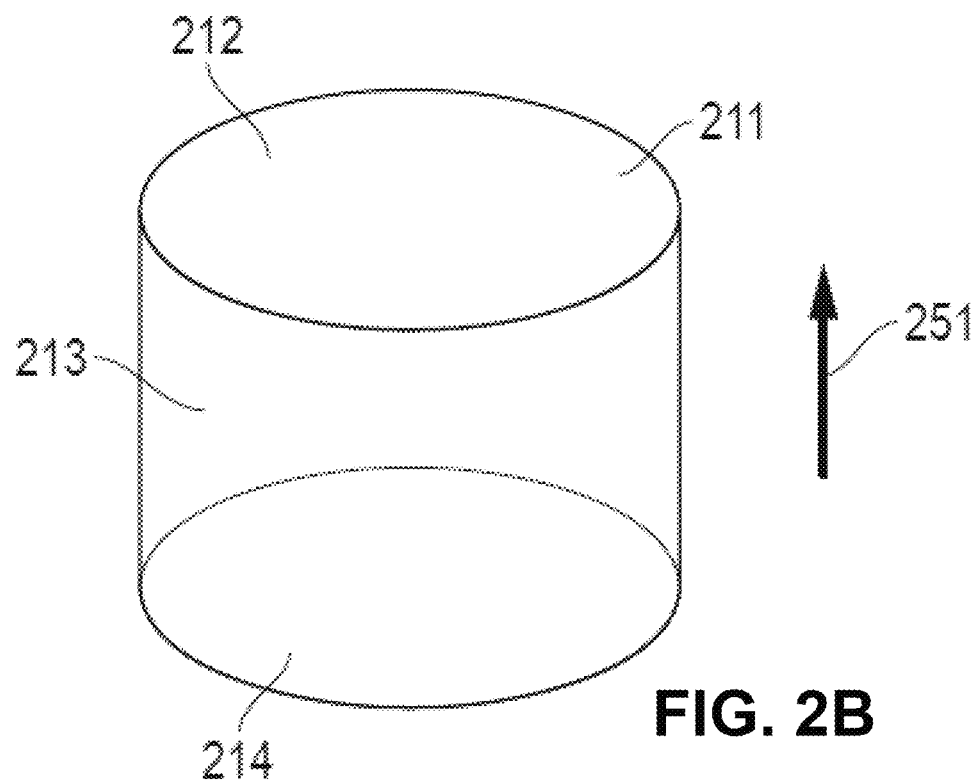

FIGS. 2A and 2B include perspective view illustrations of abrasive articles, which may be green bodies, finally-formed abrasive articles, a green body from a batch of green bodies, or an abrasive article body from a batch of abrasive article bodies according to embodiments herein. The bodies of FIGS. 2A and 2B can be formed by any of the methods of the embodiments herein and formed in a build direction 251. The body 201 can have surfaces 201, 203, 204, and 205 that are transverse relative to the build direction 251 and surfaces 202 and 207 that are not transverse to the build direction 251. The body 211 can be in the shape of a cylinder having a surface 213 transversely relative to the build direction and surfaces 212 and 214 that are not transverse to the build direction 251. It will be appreciated that the abrasive articles may be in any number of shapes and not limited to those explicitly shown herein. It will be appreciated that the bodies may be formed using a variety of build directions. In certain embodiments, the build direction may impact certain features of the abrasive articles, as green body abrasive articles and/or finally-formed abrasive articles. In certain instances, the transverse surfaces may have a different Sdr (developed interfacial area ratio) than the other surfaces. In an embodiment, the transverse surfaces may have a higher Sdr than surfaces having a different orientation to the transverse surfaces, and more specifically, surfaces having different orientations relative to the build direction 251. It will be appreciated that the build direction may be manipulated to control which surfaces have a relatively high or low Sdr. For example, an abrasive may be constructed such that the smallest surfaces are not transverse to the build direction, minimizing the amount of surface area with a low Sdr. Different Sdr values may be valuable for different applications. For example, a high Sdr surface may be useful as an abrasive working surface in low pressure grinding applications. A high or low Sdr surface may also more easily bind or adhere to a substrate or another surface using a binder, an adhesive, or other coupling means, depending on the composition of the coupling means. In an embodiment, a transverse surface can be an abrasive working surface of the body. In another embodiment, a surface that is not a transverse surface can be an abrasive working surface of the body. In embodiments, either a transverse surface or a surface that is not transverse can be coupled to another surface via a binder or adhesive. In an embodiment, the transverse surfaces may have visible layering or roughness that is not present on the other surfaces.

Figure 3:
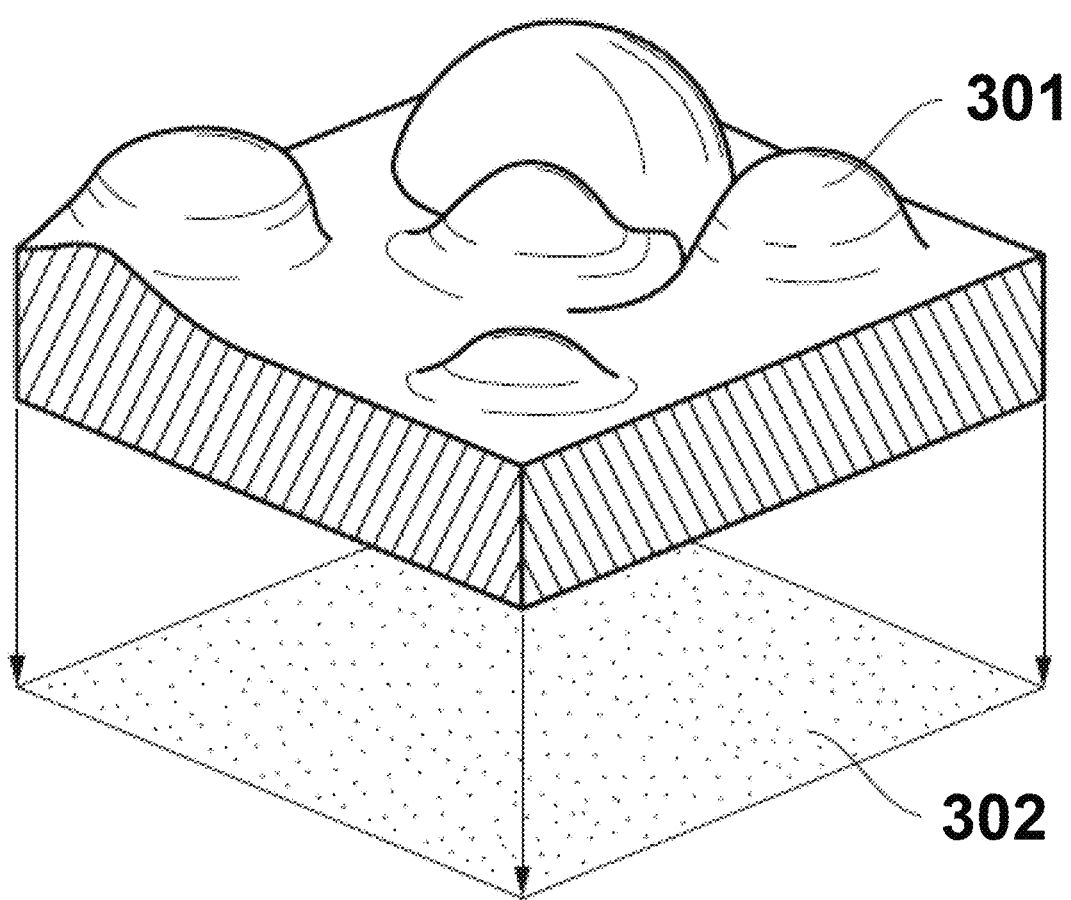
FIG. 3 includes an illustration of the measuring principle of the developed interfacial area ratio Sdr.

FIG. 3 includes an illustration of the measuring principle of the developed interfacial area ratio Sdr. The developed interfacial area ratio Sdr expresses the percent increase in surface area 301 (provided by the surface texture) in relation to a corresponding underlying projected area 302 (ideal flat plane), and was measured according to ISO standard method ISO25178-2:2012.

The developed interfacial area ratio Sdr expresses the percentage rate of an increase in a surface area $A_1$ 301 that is related to the surface texture in comparison to a projected area $A_0$ 702, wherein $A_0$ 302 corresponds to an ideal plane underneath the measured surface texture. An illustration of the relation of surface area $A_1$ 301 to projected area $A_0$ 302 is shown in FIG. 3. The Sdr measurements were conducted with an Olympus LEXT OLS5000 laser confocal microscope. The analyzed surface area was 257×257 μm, at a 50 times magnification, with a filter cylinder. Four measurements per sample were conducted at different locations and an average Sdr value was calculated according to the equation:

$$= \frac{1}{A}\left[\int\int_A\left(\sqrt{1+\left(\frac{\partial z(x,y)}{\partial x}\right)^2+\left(\frac{\delta z(x,y)}{\delta y}\right)^2}-1\right)dxdy\right].$$

The Sdr can be also expressed by the following formula: Sdr=[($A_1/A_0$)−1]×100(%).

In an embodiment, the additive manufacturing process can be performed with a specific printer head deposition resolution that may result in improved manufacturing or performance of the abrasive body. It will be appreciated that the printhead deposition resolution may be between any of the minimum and maximum values claimed herein. Without wishing to be tied to one theory, some data suggests that manipulating the resolution may alter the Sdr on the surfaces of the body. A small resolution may lead to a smaller Sdr on surfaces transverse to the build direction, as well as a smaller difference in Sdr between transverse surfaces and surfaces that are not transverse to the build direction. The same may be true for the thickness of the layers before and/or after compaction.

In one aspect, the additive manufacturing process can include using as starting material a powder material having a multi-modal particle distribution. The multimodal particle size distribution of the powder material may be related to different sizes of a single phase material or creation of a mixture from different powder components, including for example, but not limited to, a mixture including a first particulate material (e.g., abrasive particles having a first particle size distribution) and a second particulate material (e.g., particulate bond material or bond material precursor having a second particle size distribution that is different from the first particle size distribution).

In one particular aspect, the powder material for the additive manufacturing process can be bi-modal particle distribution, wherein a first plurality of particles can have an average particle size (D50) of at least 1 µm and not greater than 10 µm, and a second plurality of particles can have an average particle size (D50) of at least 20 µm and not greater than 50 µm.

In another aspect, a weight % ratio of the first plurality of particles to the second plurality of particles can be from 1:0.1 to 1:10. In certain aspects, the weight % ratio can be not greater than 1:0.3, such as not greater than 1:0.5 or not greater than 1:1 or not greater than 1:2 or not greater than 1:3 or not greater than 1:4 or not greater than 1:5 or not greater than 1:6 or not greater than 1:7 or not greater than 1:8 or not greater than 1:9 or not greater than 1:10.

In an embodiment, the finally-formed abrasive body resulting from further processing of the green abrasive article body may have the same amount (vol %) of abrasive particles as the embodiments describing the amount of abrasive particles in the green abrasive article body.

In an embodiment, the body can include a bond material or bond material precursor comprising an organic material or inorganic material or any combination thereof. In an embodiment, the bond material can comprise thermoplastics, thermosets, resins, or any combination thereof. In an embodiment, the bond material can comprise phenolic resin, polyimides, polyamides, polyesters, aramids, epoxies, or any combination thereof. In an embodiment, the bond material can comprise a transition metal element. In another embodiment, the bond material may include an amorphous phase, polycrystalline phase, or any combination thereof. In an embodiment, the bond material can comprise ceramic material, vitreous material, or any combination thereof, or wherein the ceramic material is polycrystalline, or wherein the vitreous material is amorphous. In an embodiment, the bond material can comprise an oxide. In an embodiment, the bond material can comprise an alumina-containing vitreous material. In an embodiment, the bond material can comprise silica-containing vitreous material. In an embodiment, the bond material can comprise at least one of alumina, silica, boron oxide, bismuth oxide, zinc oxide, barium oxide, magnesium oxide, calcium oxide, lithium oxide, sodium oxide, potassium oxide, cesium oxide, strontium oxide, zirconium oxide, manganese oxide, or any combinations thereof.

In an embodiment, an abrasive body can have a first surface having a first (Sdr1) and a second surface having a second developed interfacial area ratio (Sdr2). In an embodiment, Sdr1 can be greater than Sdr2. In another embodiment, Sdr1 can be less than Sdr2. In an embodiment, the first surface can be a transverse surface relative to the build direction of the abrasive article.

In an embodiment, a certain percentage of the surface area of the body can be a relatively high Sdr surface. It will be understood that a surface with a relatively high Sdr has an Sdr greater than the average Sdr of the entire body. In an embodiment at least 5% of the exterior surface area of the body can be a relatively high Sdr surface or at least 7% or at least 10% or at least 12% or at least 14% or at least 16% or at least 20% or at least 22% or at least 24% or at least 26% or at least 28% or at least 30% or at least 32% or at least 34% or at least 36% or at least 38% or at least 40% or at least 42% or at least 44% or at least 46% or at least 48% or at least 50% or at least 52% or at least 54% or at least 56% or at least 58% or at least 60% or at least 62% or at least 64% or at least 66% or at least 68% or at least 70% or at least 72% or at least 74% or at least 76% or at least 78% or at least 80% or at least 82% or at least 84% or at least 86% or at least 88% or at least 90% or at least 93% or at least 95%. In an embodiment not greater than 95% of the exterior surface area of the body can be a relatively high Sdr surface or not greater than 93% or not greater than 90% or not greater than 88% or not greater than 86% or not greater than 84% or not greater than 82% or not greater than 80% or not greater than 78% or not greater than 76% or not greater than 74% or not greater than 72% or not greater than 70% or not greater than 68% or not greater than 66% or not greater than 64% or not greater than 62% or not greater than 60% or not greater than 58% or not greater than 56% or not greater than 54% or not greater than 52% or not greater than 50% or not greater than 48% or not greater than 46% or not greater than 44% or not greater than 42% or not greater than 40% or not greater than 38% or not greater than 36% or not greater than 34% or not greater than 32% or not greater than 30% or not greater than 28% or not greater than 26% or not greater than 24% or not greater than 22% or not greater than 20% or not greater than 18% or not greater than 16% or not greater than 14% or not greater than 10% or not greater than 7% or not greater than 5%. It will be appreciated that the percent of surface area with a relatively high Sdr can be between any of the minimum and maximum values noted above.

In an embodiment, the first surface may have a particular Sdr1 that may facilitate improved performance and/or manufacturing of the abrasive article. In an embodiment, Sdr1 may be at least 40% or at least 42% or at least 44% or at least 46% or at least 48% or at least 50% or at least 52% or at least 54% or at least 56% or at least 58% or at least 60% or at least 62% or at least 64% or at least 66% or at least 68% or at least 70%. In another embodiment, Sdr1 is not greater than 140% or not greater than 135% or not greater than 130% or not greater than 125% or not greater than 120% or not greater than 115% or not greater than 110% or not greater than 105% or not greater than 100% or not greater than 95% or not greater than 90% or not greater than 85% or not greater than 80%. It will be appreciated that Sdr1 will be between any of the minimum and maximum values noted above.

In an embodiment, the abrasive body may have a second surface with a particular Sdr2 that may facilitate improved performance of the abrasive article. In an embodiment, Sdr2 may be not greater than 110% or not greater than 105% or not greater than 100% or not greater than 95% or not greater than 90% or not greater than 85% or not greater than 80% or not greater than 75%. In another embodiment, Sdr2 is at least 5%, at least 10%, at least 15%, at least 20%, at least 25%, at least 30% or at least 35% or at least 40% or at least 45%. It will be appreciated that Sdr2 will be between any of the minimum and maximum values noted above.

In an embodiment, a first surface can have an Sdr1 that is different than the Sdr2 of a second surface by a particular amount that may facilitate improved manufacturing or performance of the abrasives article. In one non-limiting embodiment, Sdr1 can have a value that is greater relative to Sdr2. In an embodiment, the first surface can have an Sdr1 that is at least 1% different than Sdr2 or at least 2% or at least 3% or at least 4% or at least 5% or at least 6% or at least 7% or at least 8% or at least 9% or at least 10%, different than the Sdr2 of the second surface. In another embodiment, the first surface can have an Sdr1 that is not greater than 25% different than Sdr2 or not greater than 24% or not greater than 23% or not greater than 22% or not greater than 21% or not greater than 20% or not greater than 19% or not greater than 18% or not greater than 17% or not greater than 16% or not greater than 15% different than Sdr2. It will be appreciated that the percent difference between Sdr1 and Sdr2 can be between any of the minimum and maximum values noted above. It will be appreciated that there may be more than two surfaces with different Sdr values, and the differences noted above in Sdr1 and Sdr2 can be equally applicable between two or more surfaces (e.g., exterior surfaces) of a body.

In an embodiment, the ratio of Sdr1:Sdr2 can be not greater than 1:2 or not greater than 1:1.9 or not greater than 1:1.8 or not greater than 1:1.7 or not greater than 1:1.6 or not greater than 1:1.5 or not greater than 1:1.4 or not greater than 1:1.3. In an embodiment the ratio of Sdr1:Sdr2 can be at least 1:1.01 or at least 1:1.03 or at least 1:1.05.

In an embodiment, the first surface, optionally a working surface may be oriented at a particular angle relative to the second surface. The angle can be at least 2°, at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90°. In another embodiment, the angle can be at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°. It will be appreciated that the angle between the first surface and the second surface may be between any of the minimum and maximum values noted above. In a non-limiting embodiment, the first surface and the second surface may be orthogonal to each other.

In an embodiment, the first surface may have a particular surface roughness (Sa1) that may facilitate improved performance and/or manufacturing of the abrasive body. In an embodiment, Sa1 may be at least 1 micron or at least 1.5 microns or at least 2 microns or at least 2.5 microns or at least 3 microns or at least 3.5 microns or at least 4 microns or at least 4.5 microns or at least 5 microns. In another embodiment, Sa1 may not be greater than 30 microns, such as not greater than 28 microns or not greater than 25 microns or not greater than 22 microns or not greater than 18 microns or not greater than 15 microns. It will be appreciated that Sa1 may be between any of the minimum and maximum values noted above.

In an embodiment, the second surface may have a particular surface roughness (Sa2) that may facilitate improved performance and/or manufacturing of the abrasive body. In an embodiment, Sa2 may be at least 1 micron, such as at least 2 microns or at least 3 microns or at least 4 microns or at least 5 microns. In another embodiment, Sa2 may not be greater than 25 microns, such as not greater than 23 microns or not greater than 21 microns or not greater than 19 microns or not greater than 17 microns or not greater than 15 microns or not greater than 14 microns or not greater than 13 microns. It will be appreciated that Sa2 may be between any of the minimum and maximum values noted above.

In an embodiment, a first surface can have a Sa1 that is different than the Sa2 of a second surface by a particular amount that may facilitate improved manufacturing or performance of the abrasive article. In an embodiment, the first surface can have a Sa1 that is at least 0.2 microns different than the Sdr2 of the second surface, such as at least 0.4 microns or at least 0.6 microns or at least 0.8 microns or at least 1 micron. In another embodiment, the first surface can have a Sa1 that is not greater than 6 microns different than Sa2 or not greater than 5.5 microns or not greater than 5 microns or not greater than 4.5 microns or not greater than 4 microns or not greater than 3.5 microns or not greater than 3 microns different than Sa2. It will be appreciated that the percent difference between Sa1 and Sa2 can be between any of the minimum and maximum values noted above.

Figure 4A:
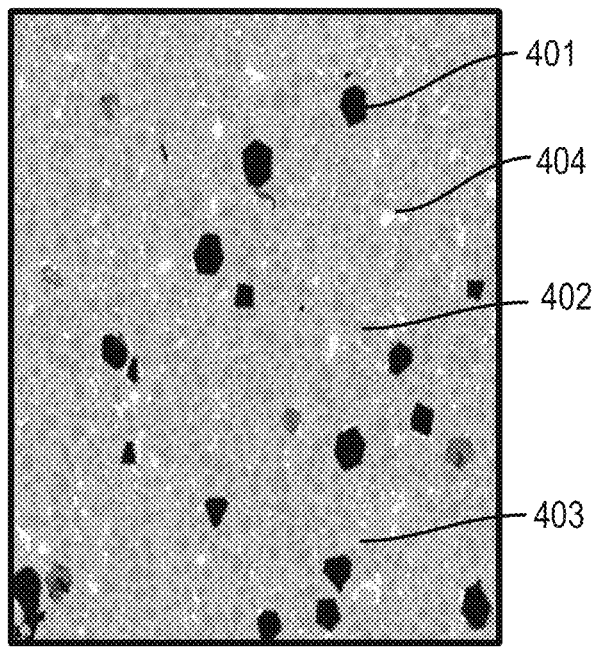
Figure 4B:
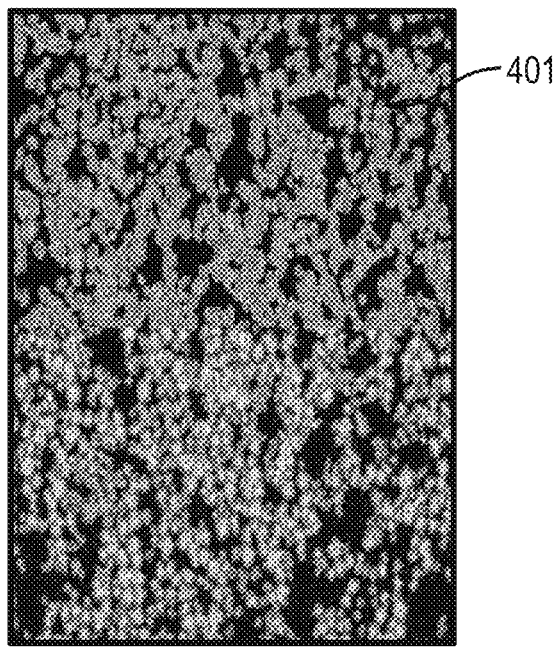
Figure 4C:
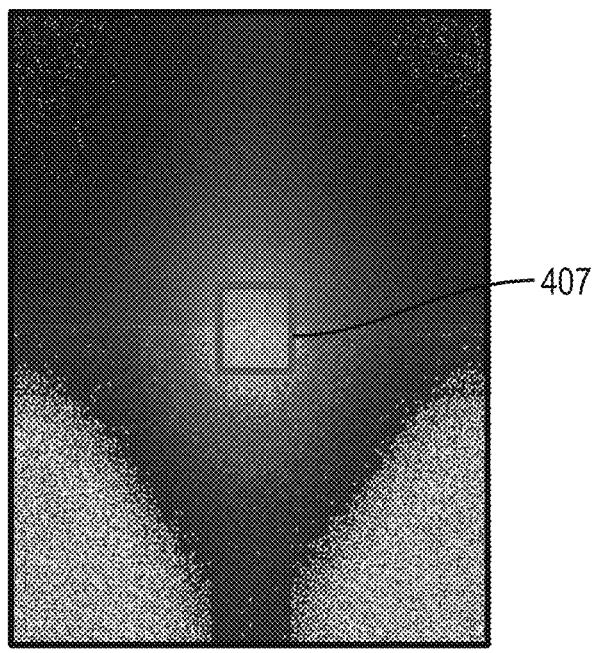
Figure 4D:
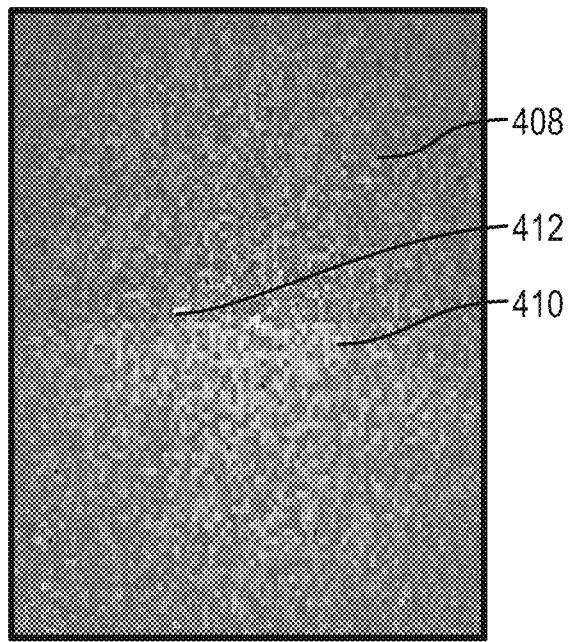

The frequency domain images are obtained by utilizing the Fourier Transform through Python to process the SEM images. Three SEM images of three cross sections of a bonded abrasive body are taken. FIGS. 4A to 4E include images of a cross section of a body of a finally-formed abrasive article formed in accordance with an additive manufacturing technique. FIG. 4A includes a scanning electron microscopic image of a cross section of a body. As illustrated, the abrasive body can include abrasive particles 401 joined by a bond matrix including a bond material 402 and an infiltrant material 403, and a filler material 404. FIG. 4A can be processed by adjusting the threshold such that only the bond material remains present in the image of FIG. 4B. FIG. 4C includes an image that has been further processed by focusing on the center, the brightest area, of FIG. 4B. FIG. 4D is an image of the magnified area within the box 407 in FIG. 4C. As illustrated in FIG. 4D, noise 408 is in greyscale, and frequency signals 410 and 412 have brightness above the noise. Removing the noise from FIG. 4D, a frequency domain image is generated and illustrated in FIG. 4E. The bright dot in the center is the zero frequency component indicating the average brightness of the image in FIG. 4B and the other two symmetrically distributed bright dots represent the frequency of the bond material 402. The Fast Fourier Transform value refers to the average number of dots other than the zero frequency components shown in frequency domain images of at least three cross-sectional images from the same body. For example, the Microstructure Feature value can be determined by dividing the sum of the number of dots that are not the center dot of each frequency domain image by the total number of the frequency domain images.

In an embodiment, the body of the abrasive article may include a Microstructure Feature value that may facilitate improved performance of the abrasive article. In an embodiment, the Microstructure Feature may be at least 1, such as at least 2 or at least 3 or at least 4 or at least 5 or at least 6 or at least 7. In still another embodiment, the Microstructure Feature may be not greater than 10 or not greater than 9 or not greater than 8 or not greater than 7 or not greater than 6 or not greater than 5 or not greater than 4 or not greater than 3. It will be appreciated the Microstructure Feature may be a value between and of the minimum and maximum values noted above, including, for example, within a range of at least 1 to not greater than 10 or within a range of at least 2 and not greater than 10.

In a further embodiment, the Microstructure Feature can include a Spacing Value. The abrasive body can include an average distance determined based on frequency domain images (i.e., image of FIG. 4E) of at least three cross-sectional images of the body of an abrasive article. As used herein, the Spacing Value can be determined using the average distance. The average distance is an averaged value of the distance between the zero frequency component (i.e., the center dot) and one other dot of frequency domain images of at least three cross-sections of the abrasive body. For example, the average distance can be calculated by dividing the total of the distance between the center dot and one other dot of each of the frequency domain images by the number of the distances that make up the total. The Spacing Value of an abrasive body can be a relative value that can be obtained by dividing the average distance of the abrasive body by the average distance of an abrasive body having layers having the printed thickness of 120 microns.

More particularly, the Spacing Value can be determined as follows. The bonded abrasive body includes layers having a printed thickness of 120 microns. All the SEM images are processed to obtain images illustrated in FIG. 4E. As illustrated in the frequency domain image of FIG. 4E, the distance from the center of the center dot to the center of one other dot is measured using Image J for each of the frequency domain images. The average of the 3 distances is calculated and referred to as Da1. The average distance is then divided by itself to have a Spacing Value of the body.

In still another embodiment, the body of the abrasive article may include a Microstructure Feature including a Spacing Value that may facilitate improved performance of the abrasive article. In an embodiment, the Spacing Value may be at least 0.01 or at least 0.03 or at least 0.04 or at least 0.06 or at least 0.08 or at least 0.1 or at least 0.2, at least 0.3 or at least 0.4 or at least 0.5 or at least 0.6 or at least 0.7 or at least 0.8 or at least 0.9 or at least 1, at least 1.1 or at least 1.3 or at least 1.4 or at least 1.5 or at least 1.6 or at least 1.8 or at least 1.9 or at least 2 or at least 2.1 or at least 2.3 or at least 2.5 or at least 2.6 or at least 2.8 or at least 3 or at least 3.1 or at least 3.3 or at least 3.5 or at least 3.6 or at least 3.8 or at least 4, at least 4.2 or at least 4.5 or at least 4.7, or at least 5 or at least 6 or at least 7 or at least 8 or at least 9 or at least 10 or at least 11 or at least 12 or at least 15 or at least 20 or at least 30 or at least or at least 80 or at least 100 or at least 200 or at least 300 or at least 400 or at least 500. In still another embodiment, the spacing value may be not greater than 2000 or not greater than 1000 or not greater than 500 or not greater than 400 or not greater than 300 or not greater than 200 or not greater than 100 or not greater than 80 or not greater than 50 or not greater than 40 or not greater than 30 or not greater than 20 or not greater than 10 or not greater than 9.8, not greater than 9.6, not greater than 9.5, not greater than 9.3 or not greater than 9 or not greater than 8.8, not greater than 8.6, not greater than 8.4, not greater than 8.2 or not greater than 8 or not greater than 7.8, not greater than 7.6, not greater than 7.4, not greater than 7.2 or not greater than 7 or not greater than 6.8, not greater than 6.6, not greater than 6.4, not greater than 6.2 or not greater than 6 or not greater than 5.8, not greater than 5.6, not greater than 5.5, not greater than 5.2 or not greater than 5 or not greater than 4.8, not greater than 4.6, not greater than 4.4, not greater than 4.2 or not greater than 4 or not greater than 3.8, not greater than 3.6, not greater than 3.4, not greater than 3.2 or not greater than 3 or not greater than 2.8, not greater than 2.6, not greater than 2.4, not greater than 2.2 or not greater than 2 or not greater than 1.8 or not greater than 1.6 or not greater than 1.5 or not greater than 1.4 or not greater than 1.3 or not greater than 1.2 or not greater than 1 or not greater than 0.8, not greater than 0.6, not greater than 0.4, not greater than 0.2 or not greater than 0.1. It will be appreciated the spacing value may be a value between and of the minimum and maximum values noted above, including, for example, within a range of at least 1 to not greater than 1000.

FIGS. 5A and 5B represent images from a bonded abrasive formed through conventional processing techniques of hot pressing. FIG. 5A is a cross-sectional SEM image processed in the same manner as noted above according to the Fast Fourier Transform to obtain the image of FIG. 5B. The Microstructure Feature value of the sample is 1.

Figure 6A:
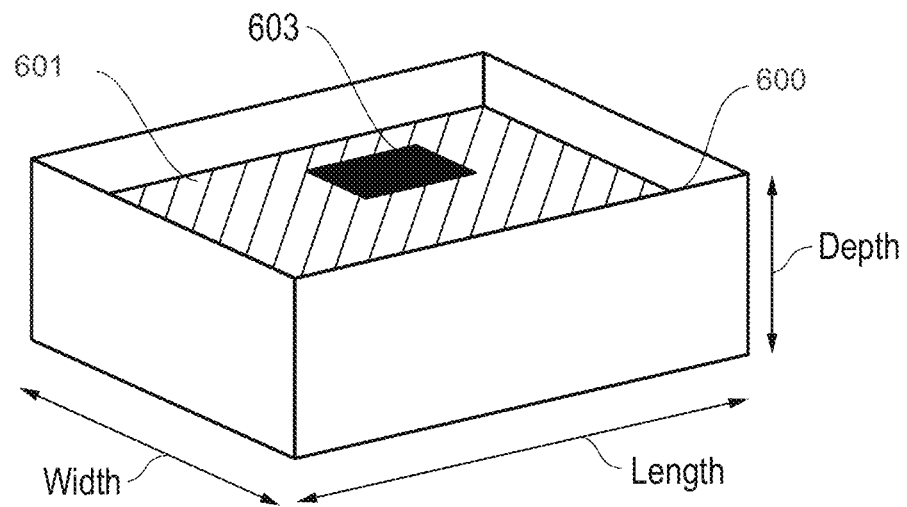
FIG. 6A includes an illustration of a build box including loose or unbound powder.

FIG. 6A includes an illustration of a build box for forming an abrasive article according to an embodiment. The build box 600 is configured to contain the powder material as it is deposited. As illustrated in FIG. 6A, the build box 600 can include a portion including loose or unbound powder 601. The build box 600 can further include a portion representing a region of bound powder defining a green body abrasive article 603 surrounded by the portion of loose or unbound powder 601.

Figure 6B:
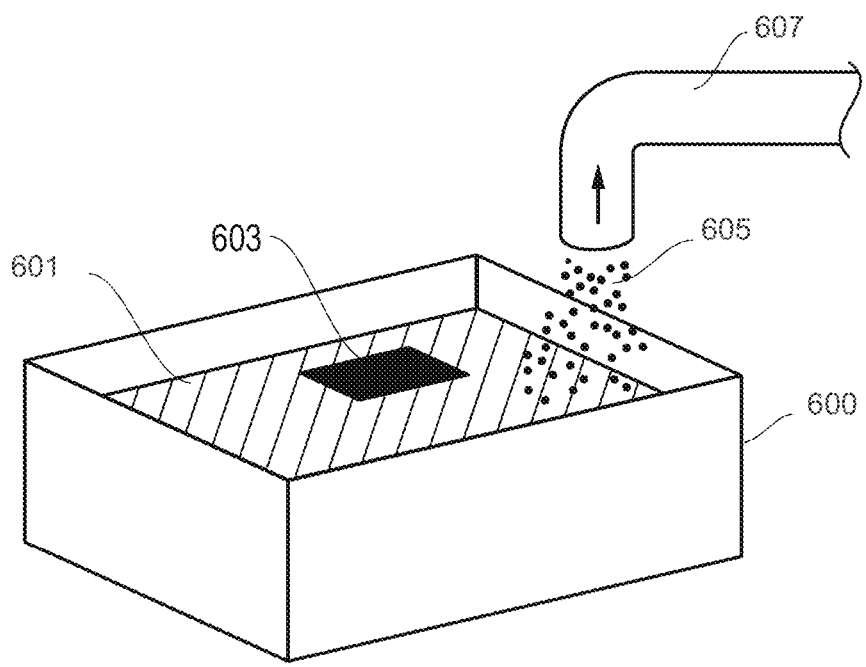
FIG. 6B includes an illustration of a process for capturing the loose powder after completing a forming operation.

FIG. 6B includes an illustration of a process for capturing the loose powder after completing a forming operation to form the green body abrasive article. The loose powder 605 can be captured via a capturing mechanism 607, which may include suction or any other suitable means to remove the loose powder 605 and separate the green body abrasive article 603 from the portion of loose or unbound powder 601. The captured loose powder 605 can be stored in a container. Additionally, or alternatively, the loose powder 605, which may include some content of organic materials from the forming process (e.g., binder material), may be treated to remove a certain content of organic materials. Accordingly, the loose powder 605 can be recycled powder material that is suitable for use in a subsequent forming operation to form one or more green body abrasive articles.

Figure 6C:
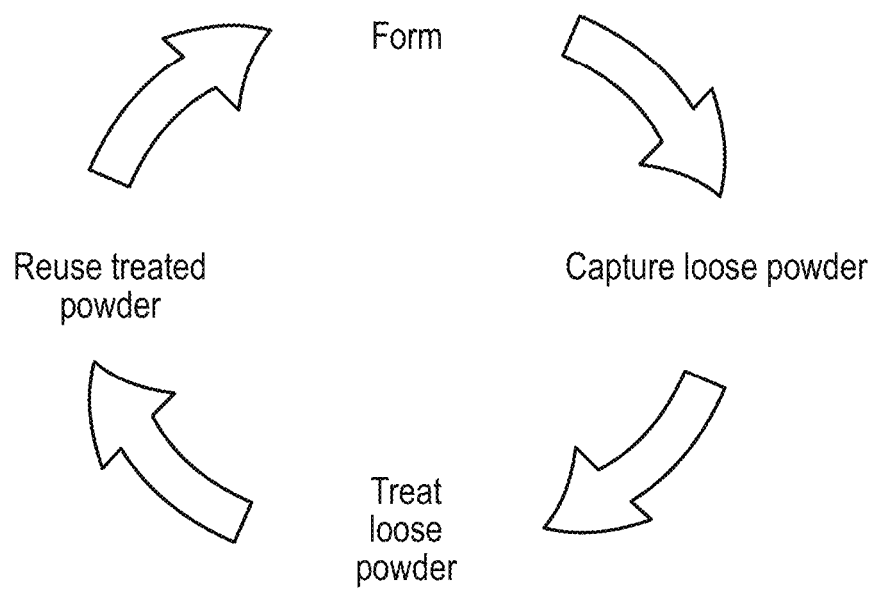
FIG. 6C is a graphic representation of the process for recycling the unused and loose powder material.

FIG. 6C is a graphic representation of the process for recycling the unused and loose powder material.

Figure 7A:
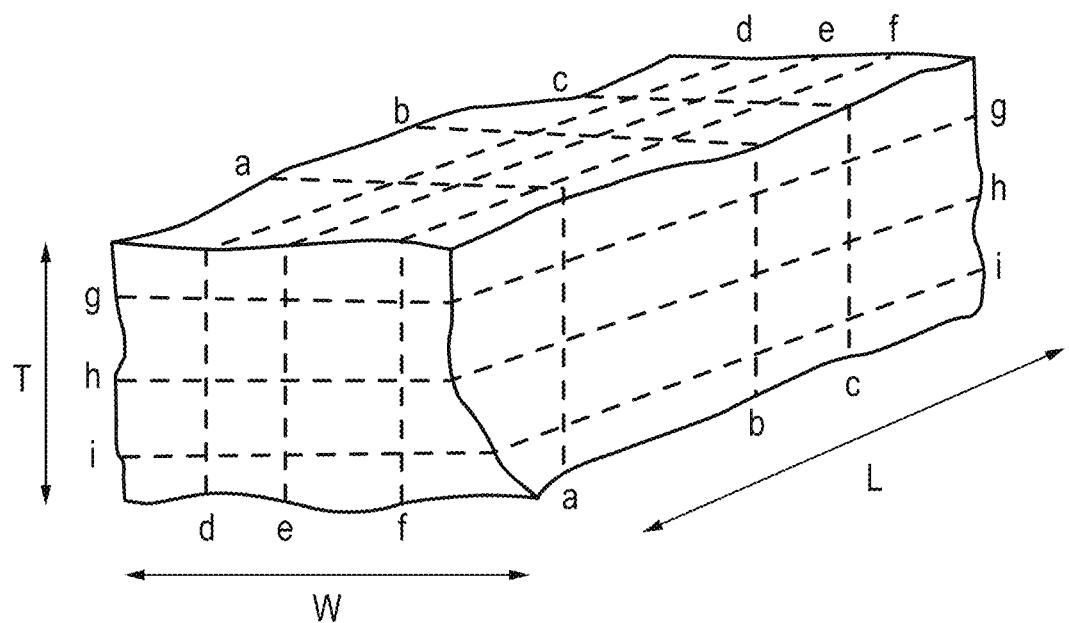
FIG. 7A is a perspective view illustration of a body of an abrasive article.

FIG. 7A is a perspective view illustration of a body of an abrasive article. As illustrated, the body has a length, width, and thickness and can be evaluated along any of these axes by destructive or non-destructive methods to evaluate one or more properties associated with the body or batch of bodies. Such properties can include, but are not limited to, density variation-L, density variation-W, density variation-T, dimensional variation-L, dimensional variation-W, dimensional variation-T, hardness variation-L, hardness variation-W, hardness variation-T, MOR variation-L, MOR variation-W, MOR variation-T, MOE variation-L, MOE variation-W, and MOE variation-T. FIG. 7B includes three cross-sectional images of cross-sections "a", "b," and "c" along a length of the body. Such cross-sections can be generated by cutting the samples for evaluation of one or more properties claimed herein. Alternatively, the cross-sections may be generated from 3D scans of the body to evaluate certain dimensional features and evaluate the quality and consistency of the geometric features of the body. FIG. 7C includes three cross-sectional images of cross-sections "d", "e," and "f" along the width of the body. FIG. 7D includes three cross-sectional images of cross-sections "g", "h," and "i" along the thickness of the body. In certain instances, the difference in cross-sectional area of each of the cross-sections may be used to quantify the geometric quality of the body.

In an embodiment, the body of the abrasive article may have density variation-L that may facilitate improved performance of the abrasive article. In an embodiment, the density variation-L may be not greater than 20% such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. The density variation-L is calculated by making multiple measurements of density spaced apart from each other along the length of the body. The density measurements may be evaluated by cross-sectional images taken in planes substantially perpendicular to the length of the body. Alternatively, ultrasonic or other non-destructive techniques may be used to create a map of the density variations in the body and used to measure density values and the change in density values of the body along the length of the body. The density variation-L can be the percent difference between an average density value of the body and a density value from a body having the greatest difference, plus or minus, in density from the average density value. The number of density values for a body or batch should be of a suitable statistically relevant sample size.

In an embodiment, the body of the abrasive article may have density variation-W that may facilitate improved performance of the abrasive article. In an embodiment, the density variation-W may be not greater than 20% such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. The density variation-W is calculated by making multiple measurements of density spaced apart from each other along the width of the body. The density measurements may be evaluated by cross-sectional images taken in planes substantially perpendicular to the width of the body at different positions spaced apart from each other along the dimension of width. Alternatively, ultrasonic or other non-destructive techniques may be used to create a map of the density variations in the body and used to measure density values and the change in density values of the body along the width of the body. The density variation-W can be the percent difference between an average density value of the body and a density value from a body having the greatest difference, plus or minus, in density from the average density value. The number of density values for a body or batch should be of a suitable statistically relevant sample size.

In an embodiment, the body of the abrasive article may have density variation-T that may facilitate improved performance of the abrasive article. In an embodiment, the density variation-T may be not greater than 20% such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. The density variation-T is calculated by making multiple measurements of density spaced apart from each other along the thickness of the body. The density measurements may be evaluated by cross-sectional images taken in planes substantially perpendicular to the thickness of the body at different positions spaced apart from each other along the dimension of thickness. Alternatively, ultrasonic or other non-destructive techniques may be used to create a map of the density variations in the body and used to measure density values and the change in density values of the body along the thickness of the body. The density variation-T can be the percent difference between an average density value of the body and a density value from a body having the greatest difference, plus or minus, in density from the average density value. The number of density values for a body or batch should be of a suitable statistically relevant sample size.

In an embodiment, the body of the abrasive article may have a hardness variation-L that may facilitate improved performance of the abrasive article. In an embodiment, the body of the abrasive article may have a hardness variation-L of not greater than 20% of an average hardness value of the body, wherein hardness variation-L is measured along a length of the body, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the hardness variation-L may be at least 0.00001% or at least 0.0001%. It will be appreciated that the hardness variation-L can be within a range including any of the minimum and maximum values noted above, including for example, but not limited to at least 0.0001%, and not greater than 20%, or within a range of at least 0.001%, and not greater than 10%.

In an embodiment, the body of the abrasive article may have a hardness variation-W that may facilitate improved performance of the abrasive article. In an embodiment, the body of the abrasive article may have a hardness variation-W of not greater than 20% of an average hardness value of the body, wherein hardness variation-W is measured along a width of the body, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the hardness variation-W may be at least 0.00001% or at least 0.0001%. It will be appreciated that the hardness variation-W can be within a range including any of the minimum and maximum values noted above, including for example, but not limited to at least 0.0001%, and not greater than 20%, or within a range of at least 0.001%, and not greater than 10%.

In an embodiment, the body of the abrasive article may have a hardness variation-T that may facilitate improved performance of the abrasive article. In an embodiment, the body of the abrasive article may have a hardness variation-T of not greater than 20% of an average hardness value of the body, wherein hardness variation-T is measured along a thickness of the body, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the hardness variation-T may be at least 0.00001% or at least 0.0001%. It will be appreciated that the hardness variation-T can be within a range including any of the minimum and maximum values noted above, including for example, but not limited to at least 0.0001%, and not greater than 20%, or within a range of at least 0.001%, and not greater than 10%.

In an embodiment, a batch of abrasive articles may have a batch hardness variation that may facilitate improved performance of the abrasive article. In an embodiment, the batch of abrasive articles may have a batch hardness variation of not greater than 20% of an average hardness value of the batch, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the batch hardness variation may be at least 0.00001% or at least 0.0001%. It will be appreciated that the batch hardness variation can be within a range including any of the minimum and maximum values noted above, including for example, but not limited to at least 0.0001%, and not greater than 20%, or within a range of at least 0.001%, and not greater than 10%. The batch hardness variation is calculated by measuring the hardness of each body of the plurality of bodies made via a single operation, wherein the batch hardness variation is a measure of the percent difference between an average hardness value of the batch and a hardness value from a body having the greatest difference, plus or minus, in hardness from the average hardness value of the batch. Note that multiple hardness values can be taken for each body of the plurality of bodies in the batch, and any of the hardness values taken from a body is relevant for comparison and calculation of the batch hardness variation. Each hardness value of the body may be averaged to create an average body hardness value for each discrete body in the batch. The average batch hardness value can be calculated by averaging the average hardness values for each body of the batch. The number of hardness values for a body or batch should be of a suitable statistically relevant sample size.

In an embodiment, the body of the abrasive article may have a dimensional variation-L that may facilitate improved performance of the abrasive article. In an embodiment, the dimensional variation-L may be not greater than 90% of an average dimensional value of the body, wherein dimensional variation-L is measured along a length of the body such as not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%. In still another embodiment, the dimensional variation-L is at least 0.0001% or at least 0.001% or at least 0.01% or at least 0.1%. It will be appreciated that the dimensional variation-L can be within a range including any of the minimum and maximum values noted above, including for example, but not limited to at least 0.0001%, and not greater than 90%, or within a range of at least 0.001%, and not greater than 80%.

It will be appreciated that a batch of abrasive articles may have a batch dimensional variation-L having a value of any of the values notes above including a range between any of the minimum and maximum values noted above with respect to the dimensional variation-L, wherein the batch dimensional variation-L is calculated by measuring the length of each body of the plurality of bodies made via a single operation, wherein the batch dimensional variation-L is the percent difference between an average length of same-shaped bodies of a batch and a length value of a body having the greatest difference, plus or minus, in length from the average length value of the batch. Note that multiple length values can be taken for each body of the plurality of bodies in the batch, and any of the length values taken from a body is relevant for comparison and calculation of the batch dimensional variation-L. More than one length measurement may be made on an individual body and averaged to create an average length value for each discrete body in the batch. An average length value of the batch can be calculated by averaging the average length values for each same-shaped body of the batch. The number of length values for a body or the batch should be of a suitable statistically relevant sample size.

In an embodiment, the body of the abrasive article may have a dimensional variation-W that may facilitate improved performance of the abrasive article. In an embodiment, the dimensional variation-W may be not greater than 90% of an average dimensional value of the body, wherein dimensional variation-W is measured along a width of the body such as not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%. In still another embodiment, the dimensional variation-W is at least 0.0001% or at least 0.001% or at least 0.01% or at least 0.1%. It will be appreciated that the dimensional variation-W can be within a range including any of the minimum and maximum values noted above, including for example, but not limited to at least 0.0001%, and not greater than 90%, or within a range of at least 0.001%, and not greater than 80%.

It will be appreciated that a batch of abrasive articles may have a batch dimensional variation-W having a value of any of the values notes above including a range between any of the minimum and maximum values noted above with respect to the dimensional variation-W, wherein the batch dimensional variation-W is calculated by measuring the width of each body of the plurality of bodies made via a single operation, wherein the batch dimensional variation-W is the percent difference between an average width of same-shaped bodies of a batch and a width value of a body having the greatest difference, plus or minus, in width from the average width value of the batch. Note that multiple width values can be taken for each body of the plurality of bodies in the batch, and any of the width values taken from a body is relevant for comparison and calculation of the batch dimensional variation-W. More than one width measurement may be made on an individual body and averaged to create an average width value for each discrete body in the batch. An average width value of the batch can be calculated by averaging the average width values for each same-shaped body of the batch. The number of width values for a body or the batch should be of a suitable statistically relevant sample size.

In an embodiment, the body of the abrasive article may have a dimensional variation-T that may facilitate improved performance of the abrasive article. In an embodiment, the dimensional variation-T may be not greater than 90% of an average dimensional value of the body, wherein dimensional variation-T is measured along a thickness of the body such as not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%. In still another embodiment, the dimensional variation-T is at least 0.0001% or at least 0.001% or at least 0.01% or at least 0.1%. It will be appreciated that the dimensional variation-T can be within a range including any of the minimum and maximum values noted above, including for example, but not limited to at least 0.0001%, and not greater than 90%, or within a range of at least 0.001%, and not greater than 80%.

It will be appreciated that a batch of abrasive articles may have a batch dimensional variation-T having a value of any of the values notes above including a range between any of the minimum and maximum values noted above with respect to the dimensional variation-T, wherein the batch dimensional variation-T is calculated by measuring the thickness of each body of the plurality of bodies made via a single operation, wherein the batch dimensional variation-T is the percent difference between an average thickness of same-shaped bodies of a batch and a thickness value of a body having the greatest difference, plus or minus, in thickness from the average thickness value of the batch. Note that multiple thickness values can be taken for each body of the plurality of bodies in the batch, and any of the thickness values taken from a body is relevant for comparison and calculation of the batch dimensional variation-T. More than one thickness measurement may be made on an individual body and averaged to create an average thickness value for each discrete body in the batch. An average thickness value of the batch can be calculated by averaging the average thickness values for each same-shaped body of the batch. The number of thickness values for a body or the batch should be of a suitable statistically relevant sample size.

In an embodiment, the body of the abrasive article may have a theoretical density that may facilitate improved performance of the abrasive article. In an embodiment, a theoretical density may be not greater than 99.9% or not greater than 99.5% or not greater than 99%. Still, in a non-limiting embodiment, the theoretical density may be at least 50% or at least 51% or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94% or at least 95% or at least 96% or at least 97% or at least 98% or at least 99%. It will be appreciated that the theoretical density can be within a range including any of the minimum and maximum values noted above, including for example, but not limited to within a range of at least 50% to not greater than 99.9% or within a range of at least 62% to not greater than 98%. It will be appreciated that each body of a plurality of bodies of a batch of abrasive article can have a theoretical density of any of the values noted above with respect to the theoretical density of the body.

In an embodiment, the body of the abrasive article may have a MOR variation-L that may facilitate improved performance of the abrasive article. In an embodiment, the MOR variation-L may be not greater than 20% of an average MOR value of the body, wherein MOR variation-L is measured along a length of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, the body of the abrasive article may have a MOR variation-W that may facilitate improved performance of the abrasive article. In an embodiment, the MOR variation-W may be not greater than 20% of an average MOR value of the body, wherein MOR variation-W is measured along a width of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, the body of the abrasive article may have a MOR variation-T that may facilitate improved performance of the abrasive article. In an embodiment, the MOR variation-T may be not greater than 20% of an average MOR value of the body, wherein MOR variation-T is measured along a thickness of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, a batch of abrasive articles may have a batch MOR variation that may facilitate improved performance of the abrasive article. In an embodiment, the batch MOR variation may be not greater than 20% of an average MOR value of the batch, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the batch MOR variation is at least 0.00001% or at least 0.0001%. It will be appreciated that the batch MOR variation can be within a range including any of the minimum and maximum values noted above, including for example, but not limited to at least 0.0001%, and not greater than 90%, or within a range of at least 0.001%, and not greater than 80%. The batch MOR variation is calculated by measuring the MOR of each body of the plurality of bodies made via a single operation, wherein the batch MOR variation is a measure of the percent difference between an average MOR value of the batch and a MOR value from a body having the greatest difference, plus or minus, in MOR from the average MOR value of the batch. The number of MOR values for a batch should be of a suitable statistically relevant sample size.

In an embodiment, the body of the abrasive article may have a MOE variation-L that may facilitate improved performance of the abrasive article. In an embodiment, the MOE variation-L may be not greater than 20% of an average MOE value of the body, wherein MOE variation-L is measured along a length of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, the body of the abrasive article may have a MOE variation-W that may facilitate improved performance of the abrasive article. In an embodiment, the MOE variation-W may be not greater than 20% of an average MOE value of the body, wherein MOE variation-W is measured along a width of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, the body of the abrasive article may have a MOE variation-T that may facilitate improved performance of the abrasive article. In an embodiment, the MOE variation-T may be not greater than 20% of an average MOE value of the body, wherein MOE variation-T is measured along a thickness of the body such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

In an embodiment, a batch of abrasive articles may have a batch MOE variation that may facilitate improved performance of the abrasive article. In an embodiment, the batch MOE variation may be not greater than 20% of an average MOE value of the batch, such as not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the batch MOE variation is at least 0.00001% or at least 0.0001%. It will be appreciated that the batch MOE variation can be within a range including any of the minimum and maximum values noted above, including for example, but not limited to at least 0.0001%, and not greater than 90%, or within a range of at least 0.001%, and not greater than 80%. The batch MOR variation is calculated by measuring the MOE of each body of the plurality of bodies made via a single operation, wherein the batch MOE variation is a measure of the percent difference between an average MOE value of the batch and a MOE value from a body having the greatest difference, plus or minus, in MOE from the average MOE value of the batch. The number of MOE values for a batch should be of a suitable statistically relevant sample size.

In an embodiment, the abrasive article may include a particular porosity that may facilitate improved manufacturing of the abrasive article. In an embodiment, the porosity of the abrasive article may be at least 1 vol % based on the total volume of the abrasive article or at least 2 vol % such as at least 3 vol % or at least 4 vol % or at least 5 vol % or at least 10 vol % or at least 15 vol % or at least 20 vol % or at least 25 vol % or at least 30 vol % or at least 35 vol %. In another embodiment, the porosity of the abrasive article may be not greater than 90 vol % such as not greater than 80 vol % or not greater than 70 vol % or not greater than 60 vol % or not greater than 50 vol % or not greater than 45 vol % or not greater than 40 vol % or not greater than 30 vol % or not greater than 20 vol % or not greater than 10 vol % not greater than 8 vol % or not greater than 7 vol % or not greater than 6 vol % or not greater than 5 vol % or not greater than 4 vol % or not greater than 3 vol % or not greater than 2 vol % or not greater than 1 vol %. The porosity of the abrasive article can be a value between any of the minimum and maximum values noted above, including for example, but not limited to, within a range of at least 1 vol % to not greater than 90 vol % based on the total volume of the abrasive article, such as within a range of at least 10 vol % to not greater than 60 vol % based on the total volume of the abrasive article body.

Additionally, as illustrated the body has four major planar surfaces and two end surfaces. Any of the four major planar surfaces extending between the two smaller end surfaces can be used to evaluate certain properties as claimed herein, including for example, but not limited to, nWarp, nFlatness, nBow. In the instance of the property nDimensional variation, multiple measurements at random locations between two opposing major planar surfaces can be made to evaluate the nDimensional variation. Such a measurement can be made in the dimension of thickness in a direction generally perpendicular to the plane defined by the length and width of the body. A multitude of randomly selected points on the first major surface are selected and the shortest distance to the second major surface through the body is recorded as a dimension. The dimensions are averaged to define the average Dimensional variation. The average is then normalized to the surface area of the first major surface. If one of the major surfaces is smaller than the other, the smaller surface is used. The nDimensional variation is the average value of the dimensional variation normalized (divided) by the area of the smaller of the major planar surfaces.

In an embodiment, a major planar surface of the body may have a nWarp that may facilitate improved performance of the abrasive article. In an embodiment, the major planar surface of the body may have a nWarp of not greater than 50 $\mu m/cm^2$, wherein nWarp is the warp of the major planar surface normalized for the surface area of the major planar surface such as not greater than 40 $\mu m/cm^2$ or not greater than 30 $\mu m/cm^2$ or not greater than 20 $\mu m/cm^2$ or not greater than 10 $\mu m/cm^2$ or not greater than or not greater than 9 $\mu m/cm^2$ or not greater than 8 $\mu m/cm^2$ or not greater than 7 $\mu m/cm^2$ or not greater than 6 $\mu m/cm^2$ or not greater than 5 $\mu m/cm^2$ or not greater than 4 $\mu m/cm^2$ or not greater than 3 $\mu m/cm^2$ or not greater than 2 $\mu m/cm^2$ or not greater than 1 $\mu m/cm^2$ or not greater than 0.9 $\mu m/cm^2$ or not greater than 0.8 $\mu m/cm^2$ or not greater than 0.7 $\mu m/cm^2$ or not greater than 0.6 $\mu m/cm^2$ or not greater than 0.5 $\mu m/cm^2$ or not greater than 0.4 µm/cm² or not greater than 0.3 µm/cm² or not greater than 0.2 µm/cm² or not greater than 0.1 µm/cm² or not greater than 0.09 µm/cm² or not greater than 0.08 µm/cm² or not greater than 0.07 µm/cm² or not greater than 0.06 µm/cm² or not greater than 0.05 µm/cm² or not greater than 0.04 µm/cm² or not greater than 0.03 µm/cm² or not greater than 0.02 µm/cm² or not greater than 0.01 µm/cm². In still another embodiment, the nWarp may be at least 0.0001 µm/cm² or at least 0.0005 µm/cm² or at least 0.001 µm/cm² or at least 0.005 µm/cm² or at least 0.01 µm/cm² or at least 0.1 µm/cm². It will be appreciated that the nWarp can be within a range including any of the minimum and maximum values noted above, including for example, but not limited to within a range of at least 0.0001 µm/cm² to not greater than 50 µm/cm² or within a range of at least 0.001 µm/cm² to not greater than 10 µm/cm².

In an embodiment, a batch of abrasive articles may have a batch nWarp standard deviation that may facilitate improved performance of the abrasive article wherein the batch nWarp variation is the standard deviation of nWarp for all bodies of the same shape in a batch. In an embodiment, the batch nWarp standard deviation may be not greater than 10, such as not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01. In still another embodiment, the batch nWarp standard deviation may be at least 0.0005 or at least 0.001 or at least 0.005 or at least 0.01 or at least 0.1. It will be appreciated that the batch nWarp standard deviation can be within a range including any of the minimum and maximum values noted above, including for example, but not limited to within a range of at least 0.01 to not greater than 10 or within a range of at least 0.1 to not greater than 5.

In an embodiment, a major planar surface of the body may have a nFlatness that may facilitate improved performance of the abrasive article. In an embodiment, the major planar surface of the body may have a nFlatness of not greater than 50 µm/cm², wherein nFlatness is the flatness of the major planar surface normalized for the surface area of the major planar surface, such as not greater than 40 µm/cm² or not greater than 30 µm/cm² or not greater than 20 µm/cm² or not greater than 10 µm/cm² or not greater than or not greater than 9 µm/cm² or not greater than 8 µm/cm² or not greater than 7 µm/cm² or not greater than 6 µm/cm² or not greater than 5 µm/cm² or not greater than 4 µm/cm² or not greater than 3 µm/cm² or not greater than 2 µm/cm² or not greater than 1 µm/cm² or not greater than 0.9 µm/cm² or not greater than 0.8 µm/cm² or not greater than 0.7 µm/cm² or not greater than 0.6 µm/cm² or not greater than 0.5 µm/cm² or not greater than 0.4 µm/cm² or not greater than 0.3 µm/cm² or not greater than 0.2 µm/cm² or not greater than 0.1 µm/cm² or not greater than 0.09 µm/cm² or not greater than 0.08 µm/cm² or not greater than 0.07 µm/cm² or not greater than 0.06 µm/cm² or not greater than 0.05 µm/cm² or not greater than 0.04 µm/cm² or not greater than 0.03 µm/cm² or not greater than 0.02 µm/cm² or not greater than 0.01 µm/cm². In still another embodiment, the nFlatness may be at least 0.0001 µm/cm² or at least 0.0005 µm/cm² or at least 0.001 µm/cm² or at least 0.005 µm/cm² or at least 0.01 µm/cm² or at least 0.1 µm/cm². It will be appreciated that the nFlatness can be within a range including any of the minimum and maximum values noted above, including for example, but not limited to within a range of at least 0.0001 µm/cm² to not greater than 50 µm/cm² or within a range of at least 0.001 µm/cm² to not greater than 10 µm/cm².

In an embodiment, a batch of abrasive articles may have a batch nFlatness standard deviation that may facilitate improved performance of the abrasive article wherein batch nFlatness variation is the standard deviation of nFlatness for all bodies of the same shape in a batch. In an embodiment, the batch nFlatness standard deviation may be not greater than 10, such as not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01. In still another embodiment, the batch nFlatness standard deviation may be at least 0.0005 or at least 0.001 or at least 0.005 or at least 0.01 or at least 0.1. It will be appreciated that the batch nFlatness standard deviation can be within a range including any of the minimum and maximum values noted above, including for example, but not limited to within a range of at least 0.01 to not greater than 10 or within a range of at least 0.1 to not greater than 5.

In an embodiment, a major planar surface of the body may have a nBow that may facilitate improved performance of the abrasive article. In an embodiment, the major planar surface of the body may have a nBow of not greater than 50 µm/cm², wherein nBow is the bow of the major planar surface normalized for the surface area of the major planar surface, such as not greater than 40 µm/cm² or not greater than 30 µm/cm² or not greater than 20 µm/cm² or not greater than 10 µm/cm² or not greater than or not greater than 9 µm/cm² or not greater than 8 µm/cm² or not greater than 7 µm/cm² or not greater than 6 µm/cm² or not greater than 5 µm/cm² or not greater than 4 µm/cm² or not greater than 3 µm/cm² or not greater than 2 µm/cm² or not greater than 1 µm/cm² or not greater than 0.9 µm/cm² or not greater than 0.8 µm/cm² or not greater than 0.7 µm/cm² or not greater than 0.6 µm/cm² or not greater than 0.5 µm/cm² or not greater than 0.4 µm/cm² or not greater than 0.3 µm/cm² or not greater than 0.2 µm/cm² or not greater than 0.1 µm/cm² or not greater than 0.09 µm/cm² or not greater than 0.08 µm/cm² or not greater than 0.07 µm/cm² or not greater than 0.06 µm/cm² or not greater than 0.05 µm/cm² or not greater than 0.04 µm/cm² or not greater than 0.03 µm/cm² or not greater than 0.02 µm/cm² or not greater than 0.01 µm/cm². In still another embodiment, the nBow may be at least 0.0001 µm/cm² or at least 0.0005 µm/cm² or at least 0.001 µm/cm² or at least 0.005 µm/cm² or at least 0.01 µm/cm² or at least 0.1 µm/cm². It will be appreciated that the nBow can be within a range including any of the minimum and maximum values noted above, including for example, but not limited to within a range of at least 0.0001 µm/cm² to not greater than 50 µm/cm² or within a range of at least 0.001 µm/cm² to not greater than 10 µm/cm².

In an embodiment, a batch of abrasive articles may have a batch nBow standard deviation that may facilitate improved performance of the abrasive article wherein batch nBow variation is the standard deviation of nBow for all bodies of the same shape in a batch. In an embodiment, the batch nBow standard deviation may be not greater than 10, such as not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01. In still another embodiment, the batch nBow standard deviation may be at least 0.0005 or at least 0.001 or at least 0.005 or at least 0.01 or at least 0.1. It will be appreciated that the batch nBow standard deviation can be within a range including any of the minimum and maximum values noted above, including for example, but not limited to within a range of at least 0.01 to not greater than 10 or within a range of at least 0.1 to not greater than 5.

In an embodiment, the distance between the first major planar surface and second major planar surface of the body may have a nDimensional Variation that may facilitate improved performance of the abrasive article. In an embodiment, the distance between the first major planar surface and second major planar surface may have a nDimension variation of not greater than 100 $\mu m/cm^2$, herein nDimension variation is the variation in the dimension between the first and second major planar surfaces normalized to the area of the first or second major planar surfaces, such as not greater than 90 $\mu m/cm^2$ or not greater than 80 $\mu m/cm^2$ or not greater than 70 $\mu m/cm^2$ or not greater than 60 $\mu m/cm^2$ or not greater than 50 $\mu m/cm^2$ or not greater than 40 $\mu m/cm^2$ or not greater than 30 $\mu m/cm^2$ or not greater than 20 $\mu m/cm^2$ or not greater than 10 $\mu m/cm^2$ or not greater than 9 $\mu m/cm^2$ or not greater than 8 $\mu m/cm^2$ or not greater than 7 $\mu m/cm^2$ or not greater than 6 $\mu m/cm^2$ or not greater than 5 $\mu m/cm^2$ or not greater than 4 $\mu m/cm^2$ or not greater than 3 $\mu m/cm^2$ or not greater than 2 $\mu m/cm^2$ or not greater than 1 $\mu m/cm^2$ or not greater than 0.9 $\mu m/cm^2$ or not greater than 0.8 $\mu m/cm^2$ or not greater than 0.7 $\mu m/cm^2$ or not greater than 0.6 $\mu m/cm^2$ or not greater than 0.5 $\mu m/cm^2$ or not greater than 0.4 $\mu m/cm^2$ or not greater than 0.3 $\mu m/cm^2$ or not greater than 0.2 $\mu m/cm^2$ or not greater than 0.1 $\mu m/cm^2$ or not greater than 0.09 $\mu m/cm^2$ or not greater than 0.08 $\mu m/cm^2$ or not greater than 0.07 $\mu m/cm^2$ or not greater than 0.06 $\mu m/cm^2$ or not greater than 0.05 $\mu m/cm^2$ or not greater than 0.04 $\mu m/cm^2$ or not greater than 0.03 $\mu m/cm^2$ or not greater than 0.02 $\mu m/cm^2$ or not greater than 0.01 $\mu m/cm^2$. In still another embodiment, the nDimensional Variation may be at least 0.0001 $\mu m/cm^2$ or at least 0.0005 $\mu m/cm^2$ or at least 0.001 $\mu m/cm^2$ or at least 0.005 $\mu m/cm^2$ or at least 0.01 $\mu m/cm^2$ or at least 0.1 $\mu m/cm^2$ or at least 1 $\mu m/cm^2$ or at least 5 $\mu m/cm^2$. It will be appreciated that the nDimensional Variation can be within a range including any of the minimum and maximum values noted above, including for example, but not limited to within a range of at least 0.0001 $\mu m/cm^2$ to not greater than 50 $\mu m/cm^2$ or within a range of at least 0.001 $\mu m/cm^2$ to not greater than 10 $\mu m/cm^2$.

In an embodiment, a batch of abrasive articles may have a batch nDimensional standard deviation that may facilitate improved performance of the abrasive article wherein batch nDimensional standard deviation is the standard deviation of nDimension variation for all bodies of the same shape in a batch. In an embodiment, the batch nDimensional standard deviation may be not greater than 10, such as not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01. In still another embodiment, the batch nDimensional standard deviation may be at least 0.0005 or at least 0.001 or at least 0.005 or at least 0.01 or at least 0.1. It will be appreciated that the batch nDimensional standard deviation can be within a range including any of the minimum and maximum values noted above, including for example, but not limited to within a range of at least 0.01 to not greater than 10 or within a range of at least 0.1 to not greater than 5.

In an embodiment, the volume of the plurality of bodies of the batch may include a batch volume that may facilitate improved performance of the abrasive article. In an embodiment, the batch volume may be at least 10 $cm^3$ or at least 11 $cm^3$ or at least 12 $cm^3$ or at least 13 $cm^3$ or at least 14 $cm^3$ or at least 15 $cm^3$ or at least 16 $cm^3$ or at least 17 $cm^3$ or at least 18 $cm^3$ or at least 19 $cm^3$ or at least 20 $cm^3$ or at least 21 $cm^3$ or at least 22 $cm^3$ or at least 23 $cm^3$ or at least 24 $cm^3$ or at least 25 $cm^3$ or at least 26 $cm^3$ or at least 27 $cm^3$ or at least 28 $cm^3$ or at least 29 $cm^3$ or at least 30 $cm^3$ or at least 31 $cm^3$ or at least 32 $cm^3$ or at least 33 $cm^3$ or at least 34 $cm^3$ or at least 35 $cm^3$ or at least 36 $cm^3$ or at least 37 $cm^3$ or at least 38 $cm^3$ or at least 39 $cm^3$ or at least 40 $cm^3$ or at least 42 $cm^3$ or at least 44 $cm^3$ or at least 46 $cm^3$ or at least 48 $cm^3$ or at least 50 $cm^3$. In still another embodiment, the batch volume may be not greater than 5000 $cm^3$ or not greater than 4000 $cm^3$ or not greater than 3000 $cm^3$ or not greater than 2000 $cm^3$ or not greater than 1000 $cm^3$ or not greater than 800 $cm^3$ or not greater than 600 $cm^3$ or not greater than 500 $cm^3$. It will be appreciated that the batch v can be within a range including any of the minimum and maximum values noted above, including for example, but not limited to within a range of at least 10 $cm^3$ to not greater than 100 $cm^3$ or within a range of at least 100 $cm^3$ to not greater than 5000 $cm^3$.

According to another embodiment, the body of an abrasive article, which may be in the form of a green body abrasive article or a finally-formed abrasive article may have a particular volumetric form factor that may be achieved through one or more forming processes of the embodiments herein and facilitate improved abrasive operations. In one embodiment, for a single abrasive article (green body or finally-formed body), the volumetric form factor can be a comparison between the shape of the body in three-dimensions as compared to an intended shape. In certain aspects, abrasive articles are intended to comply with strict dimensional tolerances, and deviations from the intended dimensional tolerances must be addressed by one or more methods, typically a post-forming subtractive process. In some instances, depending upon the severity of the deviation of the body from an intended shape, the body may be scrapped.

Figure 8A:
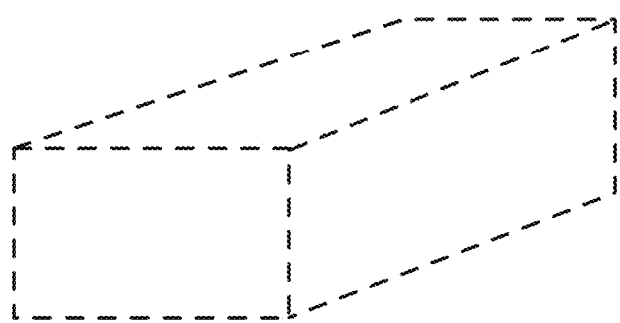
FIG. 8A includes a perspective view illustration of an intended shape of an abrasive article.
Figure 8B:
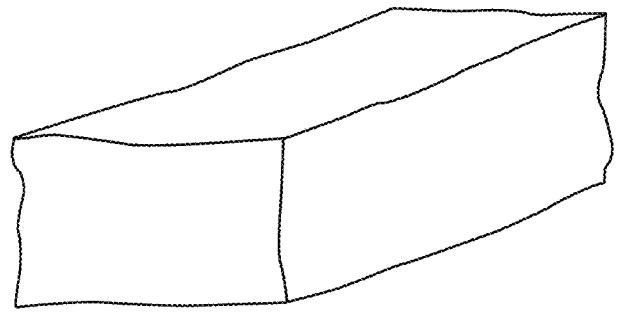
FIG. 8B includes a perspective view illustration of a formed abrasive article.
Figure 8C:
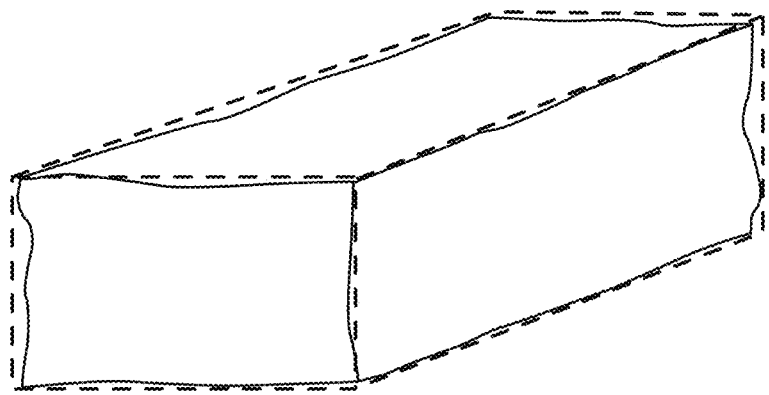
FIG. 8C includes a perspective view illustration of a comparison of a formed abrasive article and an intended shape.

FIG. 8A includes a perspective view illustration of an intended shape of an abrasive article. The intended shape may be a well-known standard that may be stored as electronic data, such as in the form of a three-dimensional model on a computer-readable medium. FIG. 8B includes a perspective view illustration of a formed abrasive article. The volumetric form factor for a single abrasive article can be a value of how well the formed abrasive article (e.g., FIG. 8B) matches to the intended shape (e.g., FIG. 8A). One such comparison is illustrated as FIG. 8C.

According to one aspect, a detailed three-dimensional scan can be conducted on the body via 3D tomography with X-ray radiation to create a representative three-dimensional model of the abrasive article. The model of the abrasive article can be compared to the model of the intended shape. The model of the abrasive article can be compared to the model of the intended shape using slices of the body and measuring the deviations in one or more select planes through the model of the abrasive article. Additionally, or alternatively, the deviations between the two models may be evaluated for the whole of the volume.

Figure 9A:
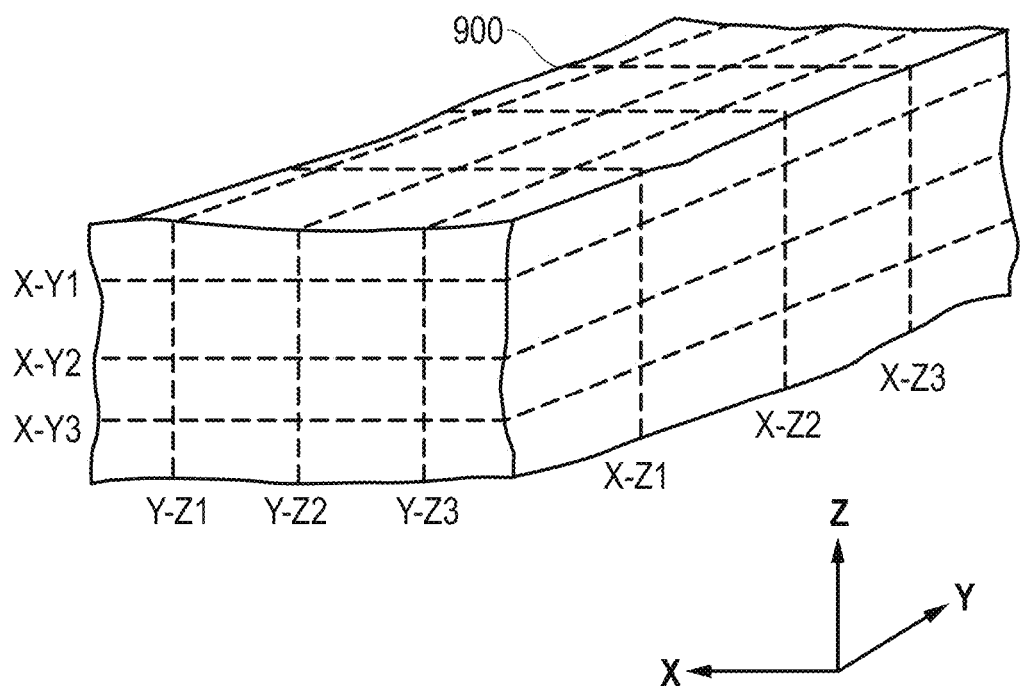
FIGS. 9A and 9B include illustrations of scans of abrasive articles.
Figure 9B:
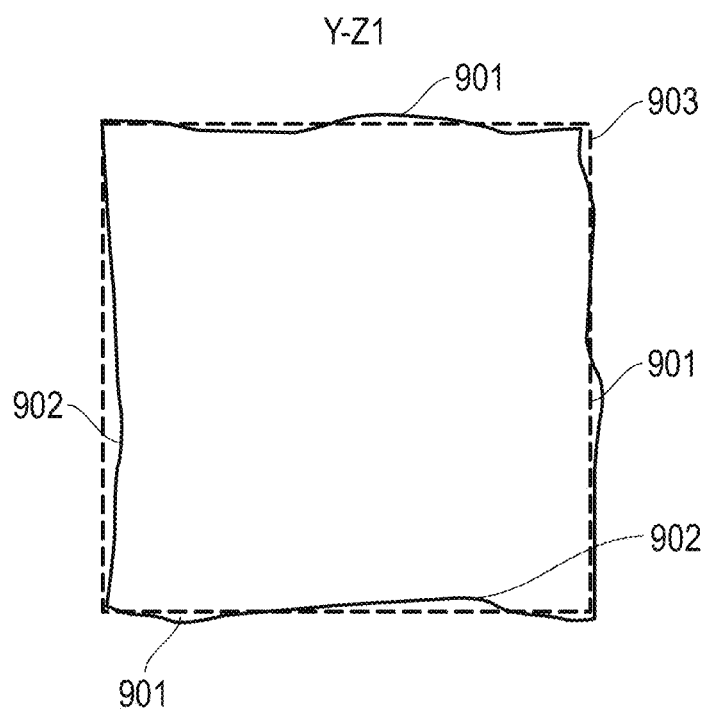

In one particular embodiment, at least three scans are completed in three different planes on the model of the abrasive article as shown in FIG. 9A. FIG. 9A illustrates nine total planes, spaced apart from each other, and cutting through the model of the abrasive article 900 for the planes X-Y, X-Z, and Y-Z. The scanned images can be extracted as 2D images of the body and can be compared to corresponding 2D data (e.g., 903) from the model of the intended shape. Image analysis software can compare the differences in the 2D images of the abrasive article and intended shape and evaluate the difference in area between the images for each of the nine planes. As shown in FIG. 9B, additional area 901 outside of an intended surface can be given a positive value. Negative area 902 on the model of the abrasive article relative to the model of the intended shape can be given a negative value. The total of positive and negative area is summed for each scan. The values for each of the nine scans are averaged and recorded as the average volumetric form value of the model of the abrasive article. The volumetric form factor is calculated as the absolute value of the ratio of the average volumetric form value divided by the volumetric form value of the model of the intended shape. That is, $Vff=|Vav/Vmi|$, wherein Vff represents the volumetric form factor, Vav represents the average volumetric form value and Vmi represents the volumetric form value of the model of the intended shape.

According to one embodiment, the Vff can be at least 0.1, such as at least 0.2 or at least 0.25 or at least 0.3 or at least 0.35 or at least 0.4 or at least 0.45 or at least 0.5 or at least 0.55 or at least 0.6 or at least 0.65 or at least 0.7 or at least 0.71 or at least 0.72 or at least 0.73 or at least 0.74 or at least 0.75 or at least 0.76 or at least 0.77 or at least 0.78 or at least 0.79 or at least 0.80 or at least 0.81 or at least 0.72 or at least 0.73 or at least 0.74 or at least 0.75 or at least 0.76 or at least 0.77 or at least 0.78 or at least 0.79 or at least 0.80 or at least 0.81 or at least 0.82 or at least 0.83 or at least 0.84 or at least 0.85 or at least 0.86 or at least 0.87 or at least 0.88 or at least 0.89 or at least 0.90 or at least 0.91 or at least 0.92 or at least 0.93 or at least 0.94 or at least 0.95 or at least 0.96 or at least 0.97 or at least 0.98 or at least 0.99 or at least 1.0 or at least 1.01 or at least 1.02 or at least 1.03 or at least 1.04 or at least 1.05 or at least 1.06 or at least 1.07 or at least 1.08 or at least 1.09 or at least 1.10 or at least 1.11 or at least 1.12 or at least 1.13 or at least 1.14 or at least 1.15 or at least 1.16 or at least 1.17 or at least 1.18 or at least 1.19 or at least 1.20 or at least 1.21 or at least 1.22 or at least 1.23 or at least 1.24 or at least 1.25 or at least 1.26 or at least 1.27 or at least 1.28 or at least 1.29 or at least 1.30 or at least 1.31 or at least 1.32 or at least 1.33 or at least 1.34 or at least 1.35 or at least 1.36 or at least 1.37 or at least 1.38 or at least 1.39 or at least 1.40 or at least 1.45 or at least 1.50 or at least 1.55 or at least 1.60 or at least 1.65 or at least 1.70 or at least 1.75 or at least 1.80 or at least 1.85 or at least 1.90 or at least 1.95 or at least 2.00. Still, in a non-limiting embodiment, the Vff can be not greater than 10, such as not greater than 9.5 or not greater than 9 or not greater than 8.5 or not greater than 8 or not greater than 7.5 or not greater than 7 or not greater than 6.5 or not greater than 6 or not greater than 5.5 or not greater than 5 or not greater than 4.5 or not greater than 4 or not greater than 3.5 or not greater than 3 or not greater than 2.5 or not greater than 2 or not greater than 1.5 or not greater than 1.45 or not greater than 1.40 or not greater than 1.39 or not greater than 1.38 or not greater than 1.37 or not greater than 1.36 or not greater than 1.35 or not greater than 1.34 or not greater than 1.33 or not greater than 1.32 or not greater than 1.31 or not greater than 1.30 or not greater than 1.29 or not greater than 1.28 or not greater than 1.27 or not greater than 1.26 or not greater than 1.25 or not greater than 1.24 or not greater than 1.23 or not greater than 1.22 or not greater than 1.21 or not greater than 1.20 or not greater than 1.19 or not greater than 1.18 or not greater than 1.17 or not greater than 1.16 or not greater than 1.15 or not greater than 1.14 or not greater than 1.13 or not greater than 1.12 or not greater than 1.11 or not greater than 1.10 or not greater than 1.09 or not greater than 1.08 or not greater than 1.07 or not greater than 1.06 or not greater than 1.05 or not greater than 1.04 or not greater than 1.03 or not greater than 1.02 or not greater than 1.01 or not greater than 1.00 or not greater than 0.99 or not greater than 0.98 or not greater than 0.97 or not greater than 0.96 or not greater than 0.95 or not greater than 0.94 or not greater than 0.93 or not greater than 0.92 or not greater than 0.91 or not greater than 0.90 or not greater than 0.89 or not greater than 0.88 or not greater than 0.87 or not greater than 0.86 or not greater than 0.85 or not greater than 0.84 or not greater than 0.83 or not greater than 0.82 or not greater than 0.81 or not greater than 0.80 or not greater than 0.79 or not greater than 0.78 or not greater than 0.77 or not greater than 0.76 or not greater than 0.75 or not greater than 0.74 or not greater than 0.73 or not greater than 0.72 or not greater than 0.71 or not greater than 0.70. It will be appreciated that the Vff can be within a range including any of the minimum and maximum values noted above, including for example, but not limited to at least 0.10, and not greater than 10, or within a range of at least 0.50, and not greater than 1.50, or within a range of at least 0.80, and not greater than 1.2, or within a range including at least 0.90, and not greater than 1.10, or even within a range including at least 0.95, and not greater than 1.05.

The method for forming a batch of abrasive articles according to the embodiments herein may be suitable for reducing dimensional variation in a batch of abrasive articles and therefore improving the batch volumetric form factor. Some data indicates that the batch volumetric form factor of the abrasive articles may be impacted by the position and/or orientation of the abrasive articles relative to one or more buttressing elements. According to one embodiment, a batch of abrasive articles, which may be green body abrasive articles or finally-formed abrasive articles may have a particular batch volumetric form factor variation. The batch volumetric form factor variation (batch Vff) can be the standard deviation of the volumetric form factor for a batch of abrasive articles. According to one embodiment, the batch Vff can be not greater than 0.30, such as not greater than 0.25 or not greater than 0.20 or not greater than 0.18 or not greater than 0.16 or not greater than 0.14 or not greater than 0.12 or not greater than 0.10 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01 or not greater than 0.009 or not greater than 0.008 or not greater than 0.007 or not greater than 0.006 or not greater than 0.005. Still, in one non-limiting embodiment, the batch Vff can be at least 0.00001 or at least 0.0001 or at least 0.0005 or at least 0.001 or at least 0.01 or at least 0.1 or at least 0.2 or at least 0.4 or at least 0.6. It will be appreciated that the batch Vff can be within a range including any of the minimum and maximum values noted above, including for example, but not limited to within a range of at least 0.00001, and not greater than 0.3, such as within a range of at least 0.00001 and not greater than 0.2 or within a range of at least 0.00001 and not greater than 0.05 or even within a range of at least 0.00001 and not greater than 0.01.

It will be appreciated that a single forming operation may form a plurality of discrete green body abrasive articles, which can be formed into a plurality of finally-formed abrasive articles. A plurality of abrasive articles may be referred to as a batch of abrasive articles and may be green bodies or finally-formed abrasive articles. In one embodiment, the abrasive articles of a batch can be formed in a single forming process within the same build box. The properties noted in the foregoing and claimed herein can be used to evaluate the abrasive articles on a batch basis. That is, evaluation of one or more geometric features and/or properties of each body within a batch can be compared to evaluate the quality of a batch as a whole. According to one embodiment, a batch may include a certain minimum size or volume of material, such as described in any of the embodiments herein. In another non-limiting embodiment, a batch may include a plurality of abrasive articles formed in a single additive manufacturing build cycle, which may include a plurality of abrasive articles (green or finally-formed) that are formed in the same build box during the same build cycle.

According to one embodiment, a method for forming an abrasive article may include using data to quantify a distortion of a green abrasive article body and/or finally-formed abrasive article and modifying the model used to control the formation of the green abrasive article body using the additive manufacturing process. According to one embodiment, one or more distortion characteristics can include any measure of distortion between a model and the actual body formed via additive manufacturing. For example, one distortion characteristics can include the Volumetric Form Factor. It will be appreciated that other methods for characterizing distortion of one or a batch of abrasive articles may be used. In one embodiment, the process for modifying the model can include changing the dimensions of the model based on a quantified and expected distortion that would likely occur from a particular additive manufacturing process. In one non-limiting embodiment, the process of modifying the model can include comparing one or more dimensions (e.g., length, width, thickness, diameter, etc.) of a model to the corresponding dimensions of a batch of green abrasive article bodies and/or a batch of finally-formed abrasive articles and changing one or more dimensions of the model to change to account for the measured distortion of the resulting batch of green abrasive article bodies and/or a batch of finally-formed abrasive articles.

Figure 10:
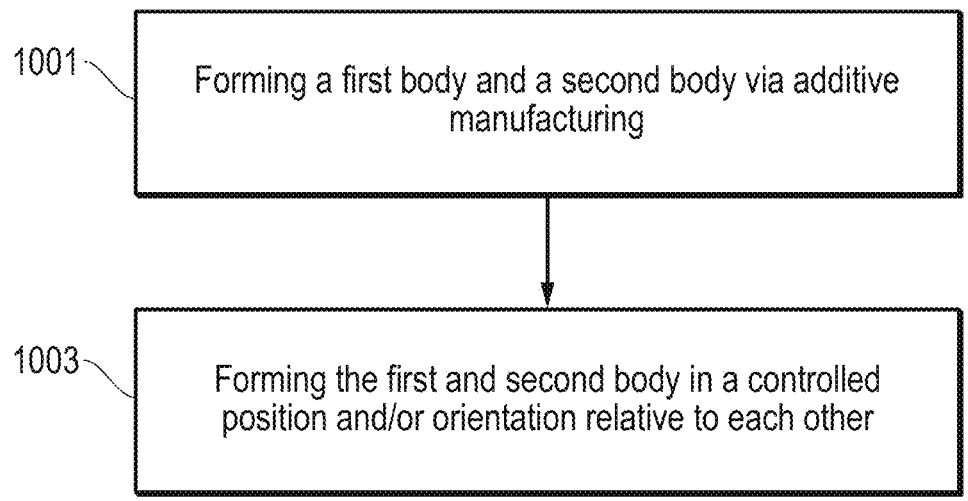
FIG. 10 includes a method for forming an abrasive article according to an embodiment.

FIG. 10 includes a method for forming an abrasive article according to an embodiment. In one aspect, the process may begin at step 1001, which includes forming a first body and a second body via additive manufacturing. The process can continue at step 1003, which includes forming the first and second body in a controlled position and/or orientation relative to each other. In one embodiment, the process for forming the first and second bodies can be completed using any of the processes of the embodiments herein, including for example, but not limited to, a binder jetting operation that may include deposition of a powder material and selective binding of the loose powder material to form one or more green abrasive articles in a bed of loose powder material. The embodiments herein are based on empirical studies. Significant challenges exist when using certain additive manufacturing processes, including, for example, binder jetting to form abrasive articles on a commercial scale. While prior disclosures have disclosed the formation of abrasive articles via additive manufacturing, such products are not widely available because of the notable difficulties in scaling the process. The embodiments here are specifically developed based on empirical studies to advance the technology of additive manufacturing into a commercially viable option.

According to one aspect, a plurality of abrasive articles (i.e., green body abrasive articles or finally-formed abrasive articles) can be formed via additive manufacturing wherein the position and/or orientation of at least a first body and a second body are controlled relative to each other to reduce the deformation of the first or second body during forming. The plurality may include a batch of abrasive articles having any of the features of the batches described in the embodiments herein. Certain studies conducted by the Applicant have indicated that in large build beds and/or when forming batches of large-sized abrasive articles unintended deformations can happen. While not wishing to be tied to any particular theory, some data may suggest that layer shifting can occur in large-sized build-beds, which may lead to part deformations and poor shape quality.

Figure 11:
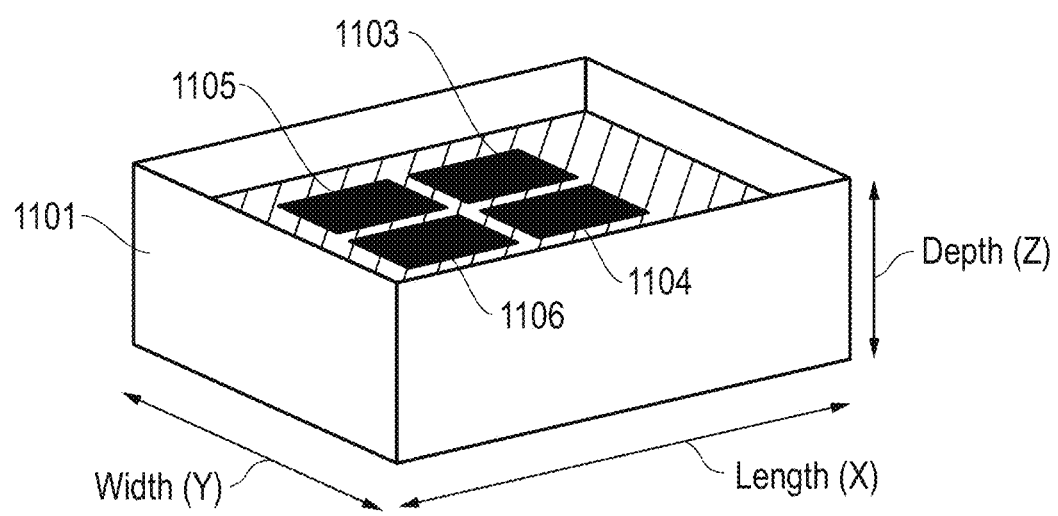
FIG. 11 includes a perspective view illustration of a first body, a second body, a third body, and a fourth body contained in a build box.

FIG. 11 includes a perspective view illustration of a first body 1103, a second body 1104, a third body 1105, and a fourth body 1106 (the bodies 1103-1106) contained in a build box 1101. As used herein, the bodies 1103-1106 can be abrasive articles or buttressing elements.

Figure 12A:
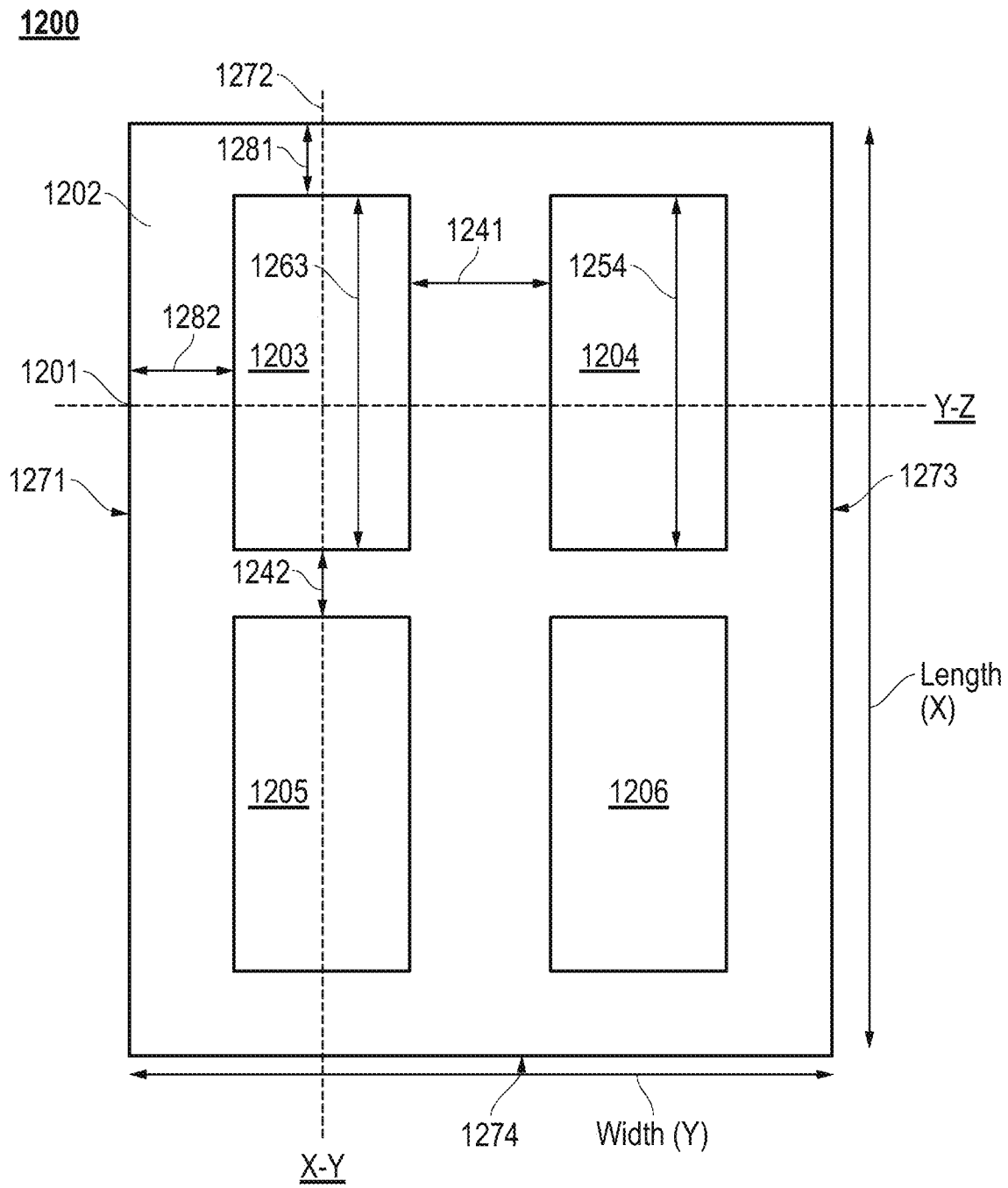
FIG. 12A includes a top-down view illustration of a build bed including a plurality of bodies according to an embodiment.
Figure 12B:
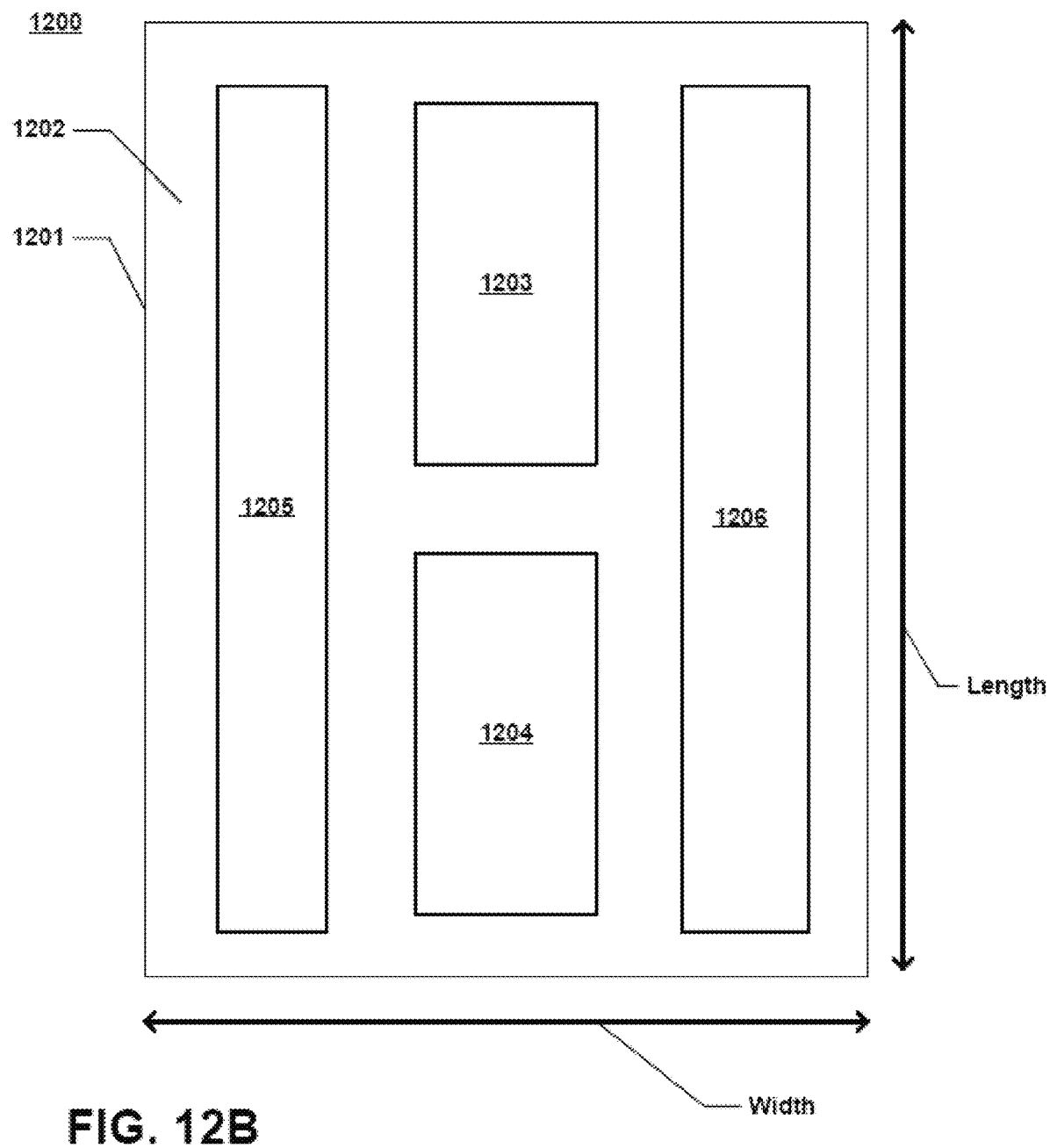
FIG. 12B includes a top-down view illustration of a build bed including a plurality of bodies according to an embodiment.
Figure 12C:
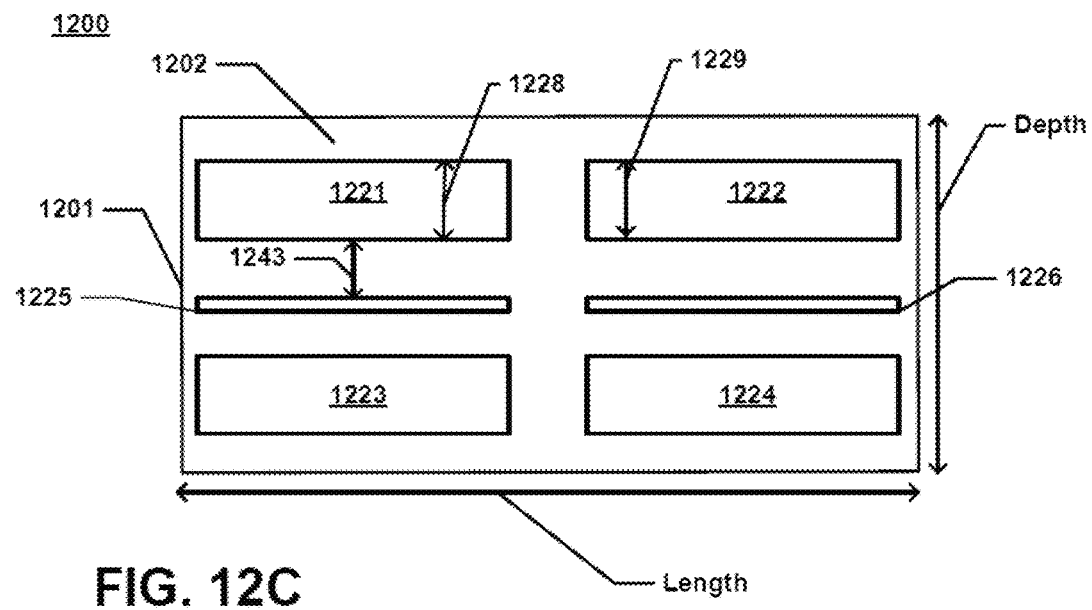
FIG. 12C includes a cross-sectional view illustration of a build bed including a plurality of bodies according to an embodiment.

FIG. 12A includes a top-down view illustration of a build bed including a plurality of bodies according to an embodiment. FIG. 12B includes a top-down view illustration of a build bed including a plurality of bodies according to an embodiment. FIG. 12C includes a cross-sectional view illustration of a build bed including a plurality of bodies according to an embodiment.

According to one aspect, the apparatus 1200 includes a build box 1201 including a bed of loose powder 1202 and bodies 1203, 1204, 1205, and 1206 (i.e., the bodies 1203-1206) contained in the bed of loose powder 1202. The bodies 1203-1206 may be portions of the bed of loose powder 1202 that have been bound via a binder that is selectively deposited in the regions of the bed of loose powder 1202 that define the bodies 1203-1206. The build box 1201, loose powder 1202, and bodies 1203-1206 can have any one or more features from any of the embodiments herein. In one embodiment, one or more of the bodies 1203-1206 can represent green abrasive article bodies. In another embodiment, one or more of the bodies 1203-1206 can be buttressing elements.

For another aspect, the batch of plurality of abrasive articles, such as green-body abrasive articles, can include a first body (e.g., body 1203) including an abrasive article and a second body (e.g., body 1205) in the form of a buttressing element. According to one embodiment, a buttressing element may be configured to limit substantial deformation of the abrasive article during additive manufacturing. In one non-limiting embodiment, the buttressing element may be configured to distribute force and/or pressure applied to the upper surface of a layer of material (e.g., loose powder 1202 and/or green abrasive article bodies) during additive manufacturing. In another embodiment, the buttressing element may be configured to distribute force and/or pressure applied to an upper surface of a green abrasive article (e.g., bodies 1203-1206) during additive manufacturing. In yet another non-limiting embodiment, the buttressing element may be a sacrificial element. A sacrificial element may be a product that is created with the abrasive articles but will not be used for anything other than the manufacturing process. In one embodiment, a sacrificial element may be configured to be removed and scrapped or recycled after completing the formation of the one or more green abrasive article bodies via additive manufacturing.

In one aspect, the one or more buttressing elements may have a particular relationship to one or more green abrasive article bodies that may facilitate improved manufacturing and/or properties of the resulting abrasive articles. For example, in one non-limiting embodiment, the buttressing element may be different from the abrasive article based on at least one of a two-dimensional shape in any plane (e.g., top-down view of the build box or cross-sectional view of the build box), a three-dimensional shape, a composition, binder content, raw material particle size (e.g., powder material of the abrasive article body versus the particle size of the powder material in the buttressing element), a position of a length, a width, and/or a thickness of the buttressing element body relative to a spread direction, a position of a length, a width, and/or a thickness of the buttressing element body relative to a compaction direction, or any combination of the foregoing.

In still another optional embodiment, a green abrasive article body may be formed at a controlled spacing distance and/or controlled orientation relative to a buttressing element to limit substantial deformation of the green abrasive article body during additive manufacturing. For example, in one non-limiting embodiment, the body 1203 can be laterally spaced apart from buttressing element 1204 by a particular lateral spacing distance 1241. The lateral spacing distance 1241 is the smallest distance between the first body 1203 and buttressing element 1204, which are immediately adjacent to each other in a lateral direction that is parallel to a width of the build box 1201. According to one embodiment, the lateral spacing distance 1241 can be at least 0.01% of the length of the first body 1203 or the length of the second body 1204, whichever is the greater value. In yet another non-limiting embodiment, the lateral spacing distance 1241 can be at least 0.1% of the length of the longer of the green abrasive article body 1203 or the buttressing element 1204, such as at least 1% or at least 5% or at least 10% or at least 15% or at least 20% or at least 25% or at least 30% or at least 35% or at least 40% or at least 45% or at least 50% or at least 60% or at least 65% or at least 70% or at least 75% or at least 80% or at least 85% or at least 90% or at least 95% or at least 100% or at least 125% or at least 150% or at least 175% or at least 200%. In another non-limiting embodiment, the lateral spacing distance 1241 can be not greater than 2000% of the length of the first body or second body or not greater than 1500% or not greater than 1000% or not greater than 800% or not greater than 500% or not greater than 200% or not greater than 100% or not greater than 90% or not greater than 80% or not greater than 70% or not greater than 60% or not greater than 50% or not greater than 40% or not greater than 30% or not greater than 20%. It will be appreciated that the lateral spacing distance 1241 can be within a range including any of the minimum and maximum values noted above. It will also be appreciated that the lateral spacing distance 1241 can apply to any two immediately adjacent bodies that intersect along a line parallel to the width of the build box.

In another aspect, the controlled spacing between two bodies can be expressed as a particular longitudinal spacing distance that may facilitate improved manufacturing and part quality. In one instance, the body 1203 can be longitudinally spaced apart from body (e.g., buttressing element) 1205 by a particular lateral spacing distance 1242. The longitudinal spacing distance 1242 is the smallest distance between two bodies 1203 and 1205, which are immediately adjacent to each other and both intersect along a longitudinal line drawn parallel to a length of the build box 1201. According to one embodiment, the longitudinal spacing distance 1242 can be at least 0.01% of the length of the first body 1203 or the length of the third body 1205, whichever is the greater value. In yet another non-limiting embodiment, the longitudinal spacing distance 1242 can be at least 0.1%, such as at least 1% or at least 5% or at least 10% or at least 15% or at least 20% or at least 25% or at least 30% or at least 35% or at least 40% or at least 45% or at least 50% or at least 60% or at least 65% or at least 70% or at least 75% or at least 80% or at least 85% or at least 90% or at least 95% or at least 100% or at least 125% or at least 150% or at least 175% or at least 200%. In another non-limiting embodiment, the longitudinal spacing distance 1242 can be not greater than 2000% of the length of the first body or second body or not greater than 1500% or not greater than 1000% or not greater than 800% or not greater than 500% or not greater than 200% or not greater than 100% or not greater than 90% or not greater than 80% or not greater than 70% or not greater than 60% or not greater than 50% or not greater than 40% or not greater than 30% or not greater than 20%. It will be appreciated that the longitudinal spacing distance 1242 can be within a range including any of the minimum and maximum values noted above.

In another aspect, the controlled spacing between two bodies (e.g., a green abrasive article body and a buttressing element) can be expressed as a particular vertical spacing distance that may facilitate improved manufacturing and/or part quality. In one instance, a body (e.g., body 1221 of FIG. 12C) can be vertically spaced apart from another body (e.g., buttressing element 1225) by a particular vertical spacing distance 1243. The vertical spacing distance 1243 is the smallest distance between two bodies (e.g., the body 1221 and the body 1225), which are immediately adjacent to each other and both intersect along a vertical line drawn parallel to a depth of the build box 1201. According to one embodiment, the vertical spacing distance 1243 can be at least 0.01% of the longer of the length of the body 1221 or the length of the body 1225. In yet another non-limiting embodiment, the vertical spacing distance 1243 can be at least 0.1% or at least 1% or at least 5% or at least 10% or at least 15% or at least 20% or at least 25% or at least 30% or at least 35% or at least 40% or at least 45% or at least 50% or at least 60% or at least 65% or at least 70% or at least 75% or at least 80% or at least 85% or at least 90% or at least 95% or at least 100% or at least 125% or at least 150% or at least 175% or at least 200% the longer of the length of the body 1221 or the length of the body 1225. In another non-limiting embodiment, the vertical spacing distance 1243 can be not greater than 2000% of the length of the first body or second body or not greater than 1500% or not greater than 1000% or not greater than 800% or not greater than 500% or not greater than 200% or not greater than 100% or not greater than 90% or not greater than 80% or not greater than 70% or not greater than 60% or not greater than 50% or not greater than 40% or not greater than 30% or not greater than 20%. It will be appreciated that the vertical spacing distance 1243 can be within a range including any of the minimum and maximum values noted above.

According to one non-limiting embodiment, the bodies 1221, 1222, 1223 and 1224 can represent green abrasive article bodies and bodies 1225 and 1226 can represent buttressing elements.

According to one embodiment, any spacing distance (e.g., longitudinal spacing distance, lateral spacing distance, and/or vertical spacing distance) may be at least 0.1 mm, such as at least 0.3 mm or at least 0.5 mm or at least 0.8 mm or at least 1 mm or at least 1.5 mm or at least 2 mm or at least 3 mm or at least 4 mm or at least 5 mm. Still, in another non-limiting embodiment, any spacing distance described in any of the embodiments herein may be not greater than 500 mm or not greater than 300 mm or not greater than 200 mm or not greater than 100 mm or not greater than 80 mm or not greater than 60 mm or not greater than 40 mm or not greater than 20 mm or not greater than 15 mm or not greater than 10 mm or not greater than 8 mm or not greater than 5 mm. It will be appreciated that any spacing distance of the embodiments herein may have a value within a range including any of the minimum and maximum values noted above.

Figure 12D:
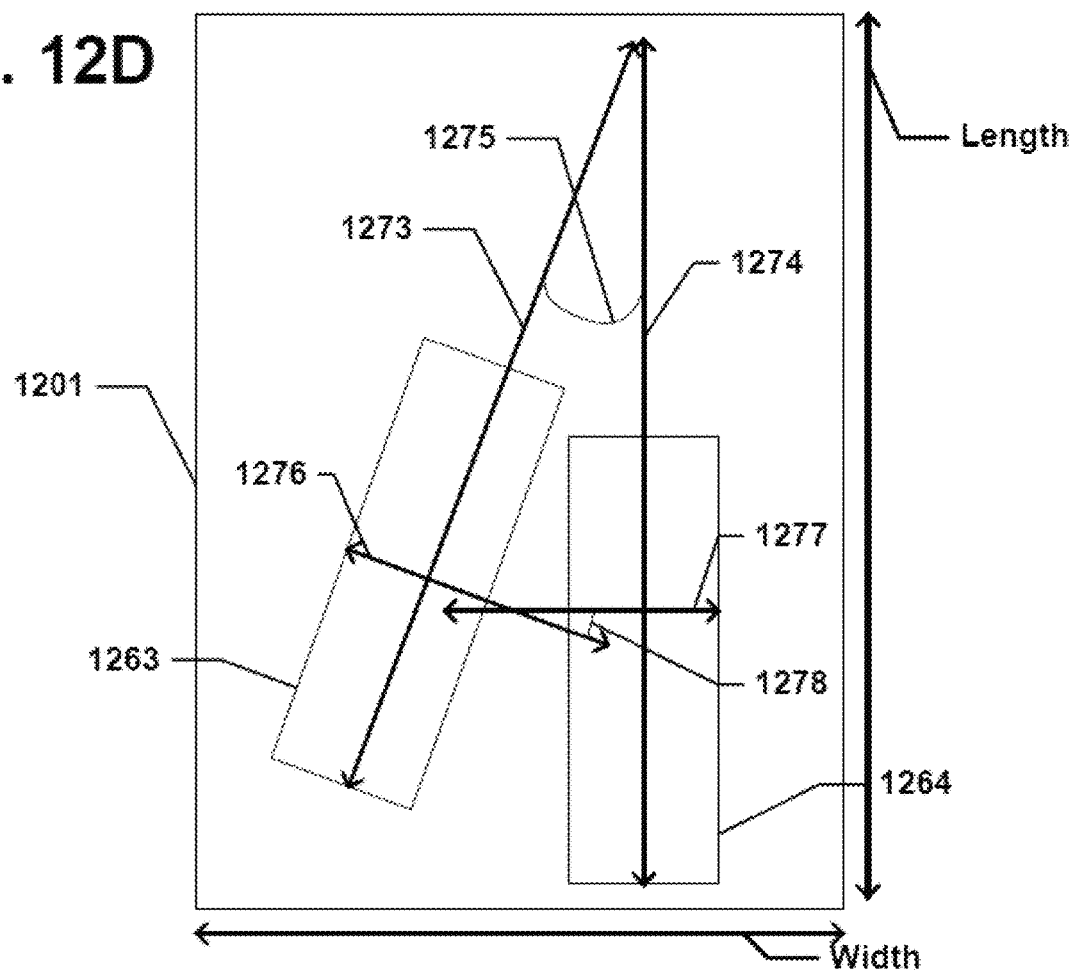
FIG. 12D includes a top-down view illustration of a build bed including a plurality of bodies according to an embodiment.
Figure 12E:
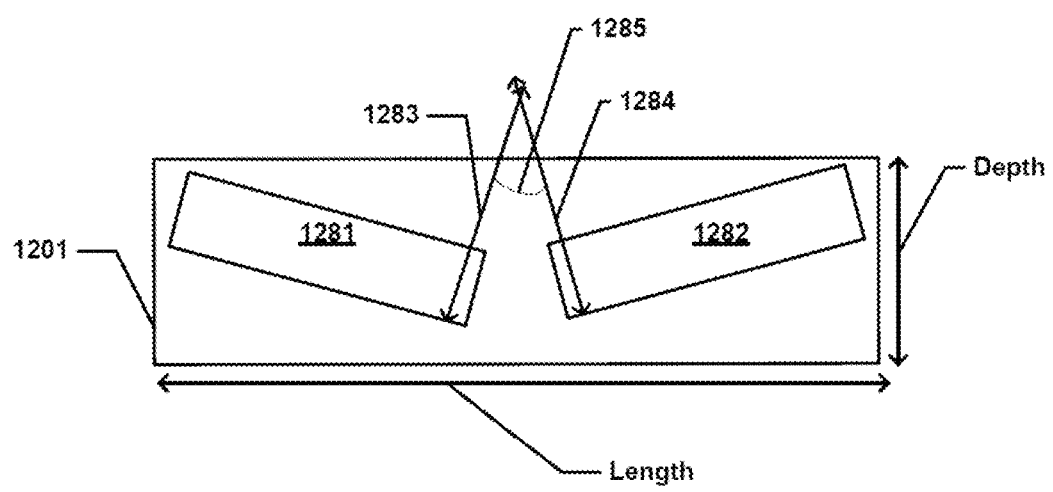
FIG. 12E includes a cross-sectional view illustration of a build bed including a plurality of bodies according to an embodiment.
Figure 12F:
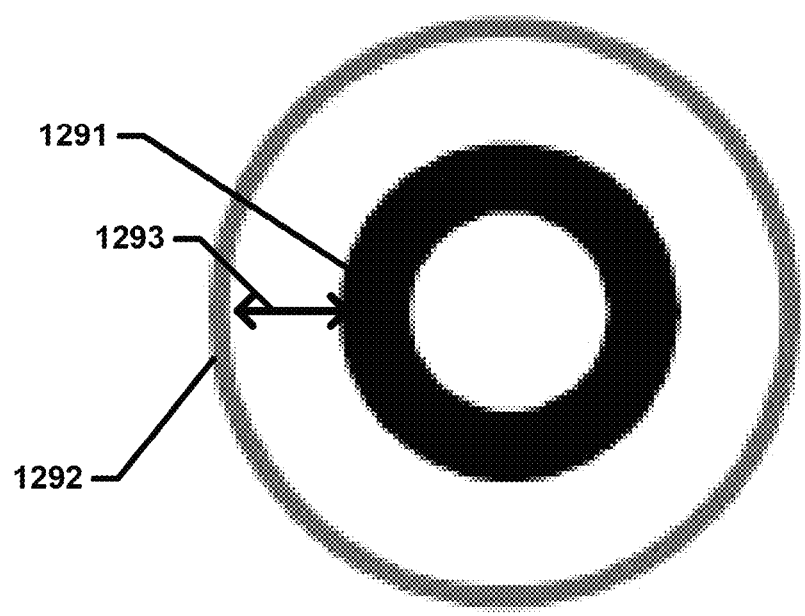
FIGS. 12F and 12G include top-down view illustrations of a green abrasive article body and a buttressing element according to an embodiment.
Figure 12G:
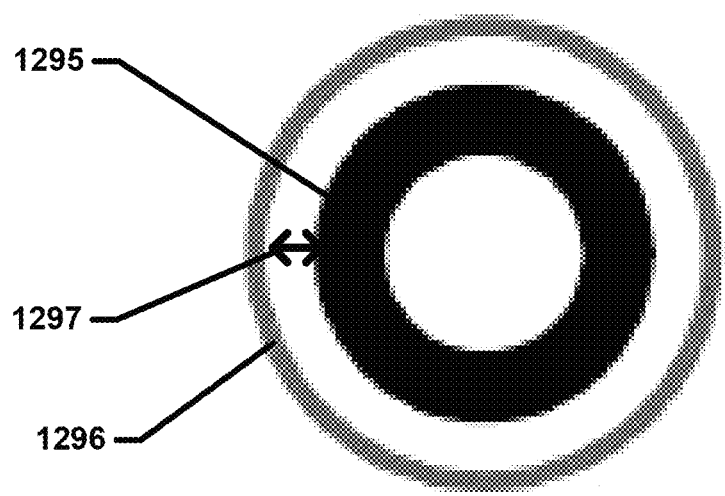

FIG. 12F includes a top-down illustration of a green abrasive article body 1291 and a buttressing element 1292 spaced apart from each other by a spacing distance 1293. FIG. 12G includes a top-down illustration of a green abrasive article body 1295 and a buttressing element 1296 spaced apart from each other by a spacing distance 1297.

In one embodiment, such as illustrated in FIG. 12A, each of the bodies 1203-1206 have substantially the same two-dimensional shape as viewed top-down. And in one non-limiting embodiment, each of the bodies 1203-1206 may have substantially the same dimensions of length, width, and/or thickness.

Still, in another optional aspect, the first body and second body may be different from each other in at least one dimension of length, width, and/or thickness. For example, as illustrated in FIG. 12B, the bodies 1203 and 1204 have different lengths and widths with respect to the bodies 1205 and 1206 as viewed top-down.

According to another non-limiting embodiment, it may be preferred to minimize the size of one or more buttressing elements relative to the size of the green abrasive article bodies. In those particular instances where the one or more buttressing elements are intended to assist with the manufacturing of green abrasive article bodies, it may be desirable to minimize the size (two-dimensional in any plane and/or three dimensional) of the buttressing elements to minimize the time and cost of the manufacturing operation and reduce waste. According to one non-limiting embodiment, a buttressing element may have a size that is not greater than a size of at least one green abrasive article body. Reference herein to size may include a two-dimensional area as viewed top-down in the plane of the length and width of the build box or a two-dimensional area as viewed in cross-section in the plane of the length and depth or width and depth of the build box. Size may also refer to the three-dimensional volume of the buttressing element as compared to one or more green abrasive article bodies. In one non-limiting embodiment, at least one buttressing element may have a size (area or volume) that is not greater than 95% of the size of at least one of the green abrasive article bodies, such as not greater than 90% or not greater than 80% or not greater than 70% or not greater than 60% or not greater than 50% or not greater than 40% or not greater than 30% or not greater than 20%. Still, in another non-limiting embodiment, at least one buttressing element may have a size (area or volume) that is at least 0.1% of the size of at least one of the green abrasive article bodies, such as at least 1% or at least 3% or at least 5% or at least 8% or at least 10% or at least 20% or at least 30% or at least 40% or at least 50%. The size of at least one buttressing element relative to the size of at least one green abrasive article body can be within a range including any of the minimum and maximum percentages noted above, including for example, but not limited to, within a range of at least 0.1% and not greater than 95% or within a range of at least 1% and not greater than 95% or within a range of at least 10% and not greater than 90%.

According to another aspect, the orientation of one or more buttressing elements relative to one or more green abrasive article bodies may assist in reducing unintended deformations to the bodies during manufacturing. For example, in one embodiment, at least two bodies (e.g., a green abrasive article body and a buttressing element) may each have longitudinal axes that are substantially parallel to each other. For example, referring to FIG. 12A, bodies 1203 and 1204 have longitudinal axes 1253 and 1254, respectively. And, moreover, the longitudinal axes 1253 and 1254 are substantially parallel to each other, wherein substantially parallel is not more than +−5 degrees. The longitudinal axis of a body is the longest dimension of the body extending along a major surface, if one exists, and extending perpendicular to at least one surface. The longest dimension may also extend perpendicular to a width dimension. As used herein, reference to relative relationships of axes between two bodies can be evaluate from a top-down plane of the build box defined by a length and width of the build box, a cross-sectional plane of the build box as defined by the length and depth of the build box, or a cross-sectional plane of the build box as defined by the width and depth of the build box.

In another non-limiting embodiment, at least two bodies (e.g., a green abrasive article body and a buttressing element) may each have longitudinal axes that are substantially perpendicular to each other, wherein substantially perpendicular is not more than +−5 degrees.

Still, in another alternative embodiment, two or more bodies (e.g., a green abrasive article body and a buttressing element) can be angled relative to each other based on their longitudinal axes. For example, as illustrated FIG. 12D, bodies 1263 and 1264 each have longitudinal axes 1273 and 1274, respectively. The smallest angle 1275 formed between the intersecting longitudinal axes 1273 and 1274 can be within a range of at least 6 degrees and not greater than 84 degrees.

In another embodiment, at least two bodies (e.g., a green abrasive article body and a buttressing element) may each have lateral axes that are substantially parallel to each other. For example, referring to FIG. 12A, bodies 1203 and 1204 have lateral axes 1255 and 1256, respectively. And, moreover, the lateral axes 1255 and 1256 are substantially parallel to each other, wherein substantially parallel is not more than +−5 degrees. The lateral axis of a body is the second longest dimension (i.e., width) of the body extending along a major surface, if one exists, and extending perpendicular to at least one surface. The second longest dimension may also extend perpendicular to the longitudinal axis.

In another non-limiting embodiment, at least two bodies (e.g., a green abrasive article body and a buttressing element) may each have lateral axes that are substantially perpendicular to each other, wherein substantially perpendicular is not more than +−5 degrees.

Still, in another alternative embodiment, two or more bodies (e.g., a green abrasive article body and a buttressing element) can be angled relative to each other based on their lateral axes. For example, as illustrated FIG. 12D, bodies 1263 and 1264 each have lateral axes 1276 and 1277, respectively. The smallest angle 1278 formed between the intersecting lateral axes 1276 and 1277 can be within a range of at least 6 degrees and not greater than 84 degrees.

In another embodiment, at least two bodies (e.g., a green abrasive article body and a buttressing element) may each have vertical axes that are substantially parallel to each other. For example, referring to FIG. 12C, bodies 1221 and 1222 have vertical axes 1228 and 1229, respectively. And, moreover, the vertical axes 1228 and 1229 may be substantially parallel to each other, wherein substantially parallel is not more than +−5 degrees. The vertical axis of a body is the longest dimension of the body extending perpendicularly and out of the plane defined by the longitudinal axis and lateral axis.

In another non-limiting embodiment, at least two bodies (e.g., a green abrasive article body and a buttressing element) may each have vertical axes that are substantially perpendicular to each other, wherein substantially perpendicular is not more than +−5 degrees.

Still, in another alternative embodiment, two or more bodies (e.g., a green abrasive article body and a buttressing element) can be angled relative to each other based on their vertical axes. For example, as illustrated FIG. 12E, bodies 1281 and 1282 each have vertical axes 1283 and 1284, respectively. The smallest angle 1285 formed between the intersecting vertical axes 1283 and 1284 can be within a range of at least 6 degrees and not greater than 84 degrees.

In one non-limiting embodiment, the process may include orienting a particular dimension of the one or more bodies (e.g., a green abrasive article body and a buttressing element) with respect to a direction of translation of a compaction object. It will be appreciated that for any of the embodiments herein a compaction object can be configured to traverse one or more layers of powder material and apply a force sufficient to compact the one or more layers and reduce the thickness of the one or more layers. As used herein, a direction of translation of the compaction object is generally in a direction that is parallel to the length of the build box or in a direction that is parallel to a width of the build box.

According to one embodiment, the process can include forming one or more bodies (e.g., a green abrasive article body and a buttressing element) each having a longitudinal axis that is substantially parallel to a direction of translation of a compaction object. For example, referring to FIG. 12A, the longitudinal axes 1253 and 1254 are substantially parallel to the direction of the length of the build box 1201, wherein the dimension of length may also define the direction of translation of a compaction object. Still, in an alternative embodiment, one or more bodies (e.g., a green abrasive article body and a buttressing element) may each have a longitudinal axis that is substantially perpendicular to a direction of translation of a compaction object. Substantially perpendicular is used to mean the same thing as described in other embodiments herein. For example, referring again to FIG. 12A, if the direction of translation of a compaction object is parallel to the width, the longitudinal axes 1253 and 1254 are substantially perpendicular to the direction of translation of the compaction object. In still another non-limiting embodiment, one or more bodies (e.g., a green abrasive article body and a buttressing element) can be formed such that their longitudinal axes are angled with respect to a direction of translation of a compaction object within a range of at least 6 degrees and not greater than 84 degrees.

According to one embodiment, the process can include forming one or more bodies (e.g., a green abrasive article body and a buttressing element) each having a lateral axis that is substantially parallel to a direction of translation of a compaction object. For example, referring to FIG. 12A, if the direction of the width of the build box 1201 is parallel to the direction of translation of a compaction object, the lateral axes 1255 and 1256 are substantially parallel to the direction of translation of a compaction object. Still, in an alternative embodiment, one or more bodies (e.g., a green abrasive article body and a buttressing element) may each have a lateral axis that is substantially perpendicular to a direction of translation of a compaction object. Substantially perpendicular is used to mean the same thing as described in other embodiments herein. For example, referring again to FIG. 12A, if the direction of translation is parallel to the length, the lateral axes 1255 and 1256 are substantially perpendicular to the direction of translation of the compaction object. In still another non-limiting embodiment, one or more bodies (e.g., a green abrasive article body and a buttressing element) can be formed such that their lateral axes are angled with respect to a direction of translation of a compaction object within a range of at least 6 degrees and not greater than 84 degrees.

According to one embodiment, the process can include forming one or more bodies (e.g., a green abrasive article body and a buttressing element) each having a vertical axis that is substantially parallel to a direction of translation of a compaction object. For example, referring to FIGS. 12C and 12E, if the direction of the length of the build box 1201 is parallel to the direction of translation of a compaction object, the vertical axes 1228 and 1229 are angled out of plane to a plane of translation (i.e., plane defined by the length and width of the build bed) of a compaction object. Still, in an alternative embodiment, one or more bodies (e.g., a green abrasive article body and a buttressing element) may each have a vertical axis that is substantially perpendicular to a direction of translation or plane of translation of a compaction object. Substantially perpendicular is used to mean the same thing as described in other embodiments herein. For example, referring again to FIG. 12C, if the direction of translation is parallel to the length, the vertical axes 1228 and 1229 are substantially perpendicular to the direction of translation of the compaction object. In still another non-limiting embodiment, one or more bodies (e.g., a green abrasive article body and a buttressing element) can be formed such that their vertical axes are angled out of plane with respect to a plane of translation of a compaction object, and wherein the angle can be within a range of at least 6 degrees and not greater than 84 degrees.

As described in embodiments herein, it will be appreciated that the method can include forming a green body abrasive article comprising the precursor bond material and abrasive particles, wherein forming is conducted by a) creating one or more layers of the powder material; b) selectively binding portions of the one or more layers with a binder material, and c) converting the binder material to at least partially solidify the binder material and bind portions of powder material from the one or more layers. In one particular embodiment, the process of selectively binding portions of one or more layers may include selectively binding a first portion of the powder layer defining a portion of the first green abrasive article body, selectively binding a second portion of the powder layer defining a portion of the second abrasive article body, and selectively binding a portion of the buttressing element.

According to one embodiment, the method may further include moving a compaction object over the one or more layers of powder material to apply a force sufficient to compact the layer to a compacted layer thickness that is less than the thickness of the layer prior to compaction. In another non-limiting aspect, the method may further include controlling at least one of the following: a) a force applied by a compaction object to the layer or a plurality of layers of powder; b) a traverse speed of a compaction object; c) average thickness of the layer prior to compaction; d) a particle size distribution of the powder; e) number of previously formed layers underlying the layer of powder; f) the number of compacted layers underlying the layer of powder; g) the density of any layers underlying the layer of powder; h) the amount of binder in any layers underlying the layer of powder; i) the relative dimensions of the layer relative to one or more layers underlying the layer; or any combination of a)-i). In a certain instance, the method may include selecting the placement, orientation, and/or size of a green abrasive article body and/or a buttressing element based on any one or more elements of a)-i) noted above. In another embodiment, the abrasive article is a green body abrasive article or finally-formed abrasive article that includes any one or a combination of features from the claims or embodiments herein.

Empirical studies by the Applicant have shown that certain unintended deformations of the green abrasive article bodies may be caused by certain compacting operations. In some instances, it may not be desirable to change the parameters of the compacting operations, such as during formation of large scale and/or high-density abrasive products. The use of buttressing elements may provide a solution facilitating the formation of green abrasive article bodies that may not be feasible otherwise.

According to another embodiment, the process for moving the compaction object over the one or more layers of powder material may be adjusted based on one or more aspects of the green abrasive article bodies and the buttressing elements. In one embodiment, moving the compaction object over the one or more layers of powder material may be adjusted based on a relative spacing between one of the green abrasive article bodies and a buttressing element. For example, the translation speed of the compacting object, downward force applied by the compacting object, or any other parameter of the compacting process may be adjusted based on the relative spacing between one of the green abrasive article bodies and a buttressing element. Alternatively, in one non-limiting embodiment, the relative spacing between one of the green abrasive article bodies and a buttressing element may be determined based upon one or more parameters of the compacting process, including for example, but not limited to the translation speed of the compacting object, downward force applied by the compacting object, or any other parameter of the compacting process.

In another non-limiting aspect, the process of moving the compaction object over the one or more layers of powder material may be adjusted based on a two-dimensional shape of at least one of the green abrasive article bodies as viewed in a top-down view of the build box or the two dimensional shape of the green abrasive article body as viewed in a cross-section of the build box. For example, the translation speed of the compacting object, downward force applied by the compacting object, or any other parameter of the compacting process may be adjusted based on the two-dimensional shape of at least one green abrasive article body. Alternatively, in one non-limiting embodiment, the two-dimensional shape of at least one green abrasive article body may be determined based upon one or more parameters of the compacting process, including for example, but not limited to the translation speed of the compacting object, downward force applied by the compacting object, or any other parameter of the compacting process.

In yet another non-limiting embodiment, the process of moving the compaction object over the one or more layers of powder material may be adjusted based on a three-dimensional shape of at least one green abrasive article body. For example, the translation speed of the compacting object, downward force applied by the compacting object, or any other parameter of the compacting process may be adjusted based on the three-dimensional shape of at least one green abrasive article body. Alternatively, in one non-limiting embodiment, the three-dimensional shape of at least one green abrasive article body may be determined based upon one or more parameters of the compacting process, including for example, but not limited to the translation speed of the compacting object, downward force applied by the compacting object, or any other parameter of the compacting process.

In another non-limiting aspect, the process of moving the compaction object over the one or more layers of powder material may be adjusted based on a two-dimensional shape of at least one of the buttressing elements as viewed in a top-down view of the build box or the two dimensional shape of at least one of the buttressing elements as viewed in a cross-section of the build box. For example, the translation speed of the compacting object, downward force applied by the compacting object, or any other parameter of the compacting process may be adjusted based on the two-dimensional shape of at least one buttressing element. Alternatively, in one non-limiting embodiment, the two-dimensional shape of at least one buttressing element may be determined based upon one or more parameters of the compacting process, including for example, but not limited to the translation speed of the compacting object, downward force applied by the compacting object, or any other parameter of the compacting process.

In yet another non-limiting embodiment, the process of moving the compaction object over the one or more layers of powder material may be adjusted based on a three-dimensional shape of at least one buttressing element. For example, the translation speed of the compacting object, downward force applied by the compacting object, or any other parameter of the compacting process may be adjusted based on the three-dimensional shape of at least one buttressing element. Alternatively, in one non-limiting embodiment, the three-dimensional shape of at least one buttressing element may be determined based upon one or more parameters of the compacting process, including for example, but not limited to the translation speed of the compacting object, downward force applied by the compacting object, or any other parameter of the compacting process.

According to one non-limiting embodiment, the process of moving the compaction object over the one or more layers of powder material may be adjusted based on at least one of the following: i) a relative spacing between one of the green abrasive article bodies and a buttressing element; ii) a two-dimensional shape of one of the green abrasive article bodies as viewed top-down or in cross-section in the build box; iii) a three-dimensional shape of at least one green abrasive article body; iv) a two-dimensional shape of the buttressing element as viewed top-down or in cross-section in the build box; v) a three-dimensional shape of the buttressing element; vi) or any combination of i)-v). Alternatively, in one non-limiting embodiment, any one or more of the parameters of i)-v) above may be determined based upon one or more parameters of the compacting process, including for example, but not limited to the translation speed of the compacting object, downward force applied by the compacting object, or any other parameter of the compacting process.

In an embodiment, the thickness of the green body may facilitate improved manufacturing and/or performance of the abrasive article. In an embodiment, the thickness of the green body may be at least 0.1 microns such as at least 0.5 microns or at least 1 micron or at least 2 microns or at least 5 microns or at least 10 microns or at least 20 microns or at least 30 microns or at least 40 microns or at least 50 microns or at least 100 microns or at least 200 microns or at least 300 microns or at least 500 microns or at least 1000 microns or at least 3000 microns or at least 5000 microns or at least 1 cm or at least 5 cm or at least 10 cm or at least 15 cm or at least 25 cm or at least 30 cm or at least 40 cm or at least 50 cm. In still other embodiment, the length of the green body may be not greater than 100 cm or not greater than 90 cm or not greater than 80 cm or not greater than 70 cm. It will be appreciated the green body may have a thickness between any of the minimum and maximum values noted above, including for example, but not limited to, within a range of at least 0.1 microns to not greater than 100 cm or within a range of at least 0.5 microns to not greater than 70 cm. It will be appreciated that each body of a plurality of abrasive bodies in a batch of abrasive articles may have a thickness of any of the values noted above with respect to the thickness of the green body.

In an embodiment, the length of the green body may facilitate improved manufacturing and/or performance of the abrasive article. In an embodiment, the length of the green body may be at least 1 cm or at least 3 cm or at least 4 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm. In still other embodiment, the length of the green body may be not greater than 100 cm such as not greater than 90 cm or not greater than 80 cm or not greater than 70 cm or not greater than 60 cm or not greater than 50 cm or not greater than 40 cm or not greater than 30 cm or not greater than 25 cm. It will be appreciated the green body may have a length between any of the minimum and maximum values noted above, including for example, but not limited to, within a range of at least 1 cm to not greater than 100 cm or within a range of at least 8 cm to not greater than 50 cm. It will be appreciated that each body of a plurality of abrasive bodies in a batch of abrasive articles may have a length of any of the values noted above with respect to the length of the green body.

In an embodiment, the width of the green body may facilitate improved manufacturing and/or performance of the abrasive article. In an embodiment, the width of the green body may be at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm. In still other embodiment, the length of the green body may be not greater than 500 cm such as not greater than 450 cm or not greater than 400 cm or not greater than 350 cm or not greater than 300 cm or not greater than 250 cm or not greater than 200 cm or not greater than 150 cm or not greater than 100 cm. It will be appreciated the green body may have a width between any of the minimum and maximum values noted above, including for example, but not limited to, within a range of at least 1 cm to not greater than 100 cm or within a range of at least 8 cm to not greater than 50 cm. It will be appreciated that each body of a plurality of abrasive bodies in a batch of abrasive articles may have a width of any of the values noted above with respect to the width of the green body.

In an embodiment, the green body may have a primary aspect ratio (length:width) that may facilitate improved manufacturing and/or performance of the abrasive article. In an embodiment, the green body may have a primary aspect ratio (length:width) of at least 1:1 such as at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1. In still other embodiment, the green body may have a primary aspect ratio (length:width) of not greater than 10000:1 or not greater than 5000:1 or not greater than 1000:1 or not greater than 500:1 or not greater than 200:1 or not greater than 100:1 or not greater than 50:1. It will be appreciated the green body may have a primary aspect ratio (length:width) between any of the minimum and maximum values noted above, including for example, but not limited to, within a range of at least 1:1 to not greater than 10000:1 cm or within a range of at least 6:1 to not greater than 200:1. It will be appreciated that each body of a plurality of abrasive bodies in a batch of abrasive articles may have a primary aspect ratio (length:width) of any of the values noted above with respect to the primary aspect ratio (length:width) of the green body.

In an embodiment, the green body may have a secondary aspect ratio (length:thickness) that may facilitate improved manufacturing and/or performance of the abrasive article. In an embodiment, the green body may have a secondary aspect ratio (length:thickness) of at least 1:1 such as at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1. In still other embodiment, the green body may have a secondary aspect ratio (length:thickness) of not greater than 10000:1 or not greater than 5000:1 or not greater than 1000:1 or not greater than 500:1 or not greater than 200:1 or not greater than 100:1 or not greater than 50:1. It will be appreciated the green body may have a secondary aspect ratio (length:thickness) between any of the minimum and maximum values noted above, including for example, but not limited to, within a range of at least 1:1 to not greater than 10000:1 cm or within a range of at least 6:1 to not greater than 200:1. It will be appreciated that each body of a plurality of abrasive bodies in a batch of abrasive articles may have a secondary aspect ratio (length:thickness) of any of the values noted above with respect to the secondary aspect ratio (length:thickness) of the green body.

In an embodiment, the green body may have a tertiary aspect ratio (width:thickness) that may facilitate improved manufacturing and/or performance of the abrasive article. In an embodiment, the green body may have a tertiary aspect ratio (width:thickness) of at least 1:1 such as at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1. In still other embodiment, the green body may have a tertiary aspect ratio (width:thickness) of not greater than 10000:1 or not greater than 5000:1 or not greater than 1000:1 or not greater than 500:1 or not greater than 200:1 or not greater than 100:1 or not greater than 50:1. It will be appreciated the green body may have a tertiary aspect ratio (width:thickness) between any of the minimum and maximum values noted above, including for example, but not limited to, within a range of at least 1:1 to not greater than 10000:1 or within a range of at least 6:1 to not greater than 200:1. It will be appreciated that each body of a plurality of abrasive bodies in a batch of abrasive articles may have a tertiary aspect ratio (width:thickness) of any of the values noted above with respect to the tertiary aspect ratio (width:thickness) of the green body.

In still another embodiment, the green body has a length, a width, and a thickness, and wherein length≥width≥thickness. In still another embodiment, each body of the plurality of bodies has a length, a width, and a thickness, and wherein length≥width≥thickness.

In an embodiment, the green body may have a solid volume that may facilitate improved manufacturing and/or performance of the abrasive article. In an embodiment, the green body may have a solid volume of at least 9 $cm^3$ such as at least 10 $cm^3$ or at least 11 $cm^3$ or at least 12 $cm^3$ or at least 13 $cm^3$ or at least 14 $cm^3$ or at least 15 $cm^3$ or at least 16 $cm^3$ or at least 17 $cm^3$ or at least 18 $cm^3$ or at least 19 $cm^3$ or at least 20 $cm^3$ or at least 21 $cm^3$ or at least 22 $cm^3$ or at least 23 $cm^3$ or at least 24 $cm^3$ or at least 25 $cm^3$ or at least 26 $cm^3$ or at least 27 $cm^3$ or at least 28 $cm^3$ or at least 29 $cm^3$ or at least 30 $cm^3$ or at least 31 $cm^3$ or at least 32 $cm^3$ or at least 33 $cm^3$ or at least 34 $cm^3$ or at least 35 $cm^3$ or at least 36 $cm^3$ or at least 37 $cm^3$ or at least 38 $cm^3$ or at least 39 $cm^3$ or at least 40 $cm^3$ or at least 42 $cm^3$ or at least 44 $cm^3$ or at least 46 $cm^3$ or at least 48 $cm^3$ or at least 50 $cm^3$. In still other embodiment, the green body may have a solid volume of not greater than 5000 $cm^3$ or not greater than 4000 $cm^3$ or not greater than 3000 $cm^3$ or not greater than 2000 $cm^3$ or not greater than 1000 $cm^3$ or not greater than 800 $cm^3$ or not greater than 600 $cm^3$ or not greater than 500 $cm^3$. It will be appreciated the green body may have a solid volume between any of the minimum and maximum values noted above, including for example, but not limited to, within a range of at least 9 $cm^3$ to not greater than 5000 $cm^3$ or within a range of at least 25 $cm^3$ to not greater than 1000 $cm^3$.

In an embodiment, the length of the build box may facilitate improved manufacturing and/or performance of the abrasive article. In an embodiment, the length of the build box may be at least 160 mm such as at least 170 mm or at least 180 mm or at least 190 mm or at least 200 mm or at least 210 mm or at least 220 mm or at least 230 mm or at least 240 mm or at least 250 mm or at least 260 mm or at least 270 mm or at least 280 mm or at least 290 mm or at least 300 mm or at least 310 mm or at least 320 mm or at least 330 mm or at least 340 mm or at least 350 mm or at least 360 mm or at least 370 mm or at least 380 mm or at least 390 mm or at least 400 mm. In still other embodiment, the length of the build box may be not greater than 3000 mm such as or not greater than 2000 mm or not greater than 1000 mm. It will be appreciated the build box may have a length between any of the minimum and maximum values noted above, including for example, but not limited to, within a range of at least 160 mm to not greater than 3000 mm or within a range of at least 200 mm to not greater than 1000 mm.

In an embodiment, the width of the build box may facilitate improved manufacturing and/or performance of the abrasive article. In an embodiment, the width of the build box may be at least 65 mm or at least 70 mm or at least 80 mm or at least 90 mm or at least 100 mm or at least 110 mm or at least 120 mm or at least 130 mm or at least 140 mm or at least 150 mm or at least 160 mm or at least 170 mm or at least 180 mm or at least 190 mm or at least 200 mm or at least 210 mm or at least 220 mm or at least 230 mm or at least 240 mm or at least 250 mm. In still other embodiment, the length of the build box may be not greater than 2000 mm such as or not greater than 1500 mm or not greater than 1000 mm. It will be appreciated the build box may have a width between any of the minimum and maximum values noted above, including for example, but not limited to, within a range of at least 65 mm to not greater than 2000 mm or within a range of at least 200 mm to not greater than 1000 mm.

In an embodiment, the depth of the build box may facilitate improved manufacturing and/or performance of the abrasive article. In an embodiment, the depth of the build box may be at least 65 mm or at least 70 mm or at least 80 mm or at least 90 mm or at least 100 mm or at least 110 mm or at least 120 mm or at least 130 mm or at least 140 mm or at least 150 mm or at least 160 mm or at least 170 mm or at least 180 mm or at least 190 mm or at least 200 mm or at least 210 mm or at least 220 mm or at least 230 mm or at least 240 mm or at least 250 mm. In still other embodiment, the length of the build box may be not greater than 2000 mm such as or not greater than 1500 mm or not greater than 1000 mm. It will be appreciated the build box may have a depth between any of the minimum and maximum values noted above, including for example, but not limited to, within a range of at least 65 mm to not greater than 2000 mm or within a range of at least 200 mm to not greater than 1000 mm. In an embodiment, the depth of the build box may facilitate improved manufacturing and/or performance of the abrasive article. In an embodiment, the depth of the build box may be at least 65 mm or at least 70 mm or at least 80 mm or at least 90 mm or at least 100 mm or at least 110 mm or at least 120 mm or at least 130 mm or at least 140 mm or at least 150 mm or at least 160 mm or at least 170 mm or at least 180 mm or at least 190 mm or at least 200 mm or at least 210 mm or at least 220 mm or at least 230 mm or at least 240 mm or at least 250 mm. In still other embodiment, the length of the build box may be not greater than 2000 mm such as or not greater than 1500 mm or not greater than 1000 mm. It will be appreciated the build box may have a depth between any of the minimum and maximum values noted above, including for example, but not limited to, within a range of at least 65 mm to not greater than 2000 mm or within a range of at least 200 mm to not greater than 1000 mm.

In an embodiment, the green body or plurality of green bodies defining a batch may have a volume that is at least 1% of the volume of the build box such as at least 2% or at least 3% or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% of the volume of the build box. In still other embodiment, the green body or plurality of green bodies defining a batch may have a volume that is not greater than 99% of the volume of the build box such as not greater than 90% or not greater than 85% or not greater than 80% or not greater than 75% or not greater than 70% or not greater than 65% or not greater than 60% of the volume of the build box. In an embodiment, the green body or plurality of green bodies defining a batch may have a volume that is within a range of at least 1% of the volume of the build box to not greater than 99% of the volume of the build box or within a range at least 10% to not greater than 60% of the volume of the build box.

The processes of the embodiments herein are developed by empirical studies that have identified certain elements leading to improved abrasive articles. One non-limiting example of a property of the abrasive articles (green or finally-formed) that may be improved includes batch density variation. According to one embodiment, the process may facilitate formation of a batch of abrasive articles having a batch density variation of not greater than 20% of an average density value of the batch or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%. In still another embodiment, the batch density variation mat be at least 0.00001% or at least 0.0001%. It will be appreciated the batch density variation may be between any of the minimum and maximum values noted above, including for example, but not limited to, within a range of at least 0.00001% to not greater than 20% of an average density value of the batch or within a range of at least 0.0001% to not greater than 10% of an average density value of the batch The batch density variation is calculated by measuring the density of each body of the plurality of bodies made via a single operation, wherein the batch density variation is a measure of the percent difference between an average density value of the batch and a density value from a body having the greatest difference, plus or minus, in density from the average density value of the batch. Note that multiple density values can be taken for each body of the plurality of bodies in the batch, and any of the density values taken from a body is relevant for comparison and calculation of the batch density variation. Each density value of the body may be averaged to create an average body density value for each discrete body in the batch. The average batch density value can be calculated by averaging the average density values for each body of the batch. The number of density values for a body or batch should be of a suitable statistically relevant sample size.

The methods of the embodiments herein facilitate improved formation of abrasive articles. Notably, the empirical studies conducted by the Applicant facilitate methods that have a superior forming ratio (Add/Sub), which can define the ratio of the material added to form the body versus the material subtracted in any post-forming finishing techniques. The methods of the embodiments herein facilitate a forming ratio that is advantageous compared to conventional forming techniques and/or less sophisticated additive manufacturing techniques.

In a particular embodiment, the body or method for forming the body defines a forming ratio (Add/Sub) of at least 10, wherein "Add" defines the volume of solid material (cm3) formed via additive processes used to form the body and "Sub" defines the volume (cm3) of solid material formed via a subtractive process to finish the finally-formed body, such as at least 20 or at least 50 or at least 80 or at least 100 or at least 200 or at least 300 or at least 400 or at least 500 or at least 600 or at least 700 or at least 800 or at least 1000 or at least 5000 or at least 10000.

In an embodiment, the finally-formed abrasive articles of a batch may have a residual stress in an exterior surface from post-forming operations that is at least 1% less than residual stress in conventionally-formed abrasive articles, such as at least 2% less or at least 3% less or at least 4% less or at least 5% less or at least 6% less or at least 7% less or at least 8% less or at least 9% less or at least 10% less or at least 11% less or at least 12% less or at least 13% less or at least 14% less or at least 15% less or at least 16% less or at least 17% less or at least 18% less or at least 19% less or at least 20% less or at least 25% less or at least 30% less or at least 35% less or at least 40% less or at least 45% less or at least 50% less or at least 55% less or at least 60% less or at least 65% less or at least 70% less or at least 75% less or at least 80% less or at least 85% less or at least 90% less or at least 95% less or at least 100% less. In still another embodiment, the finally-formed abrasive articles of a batch may have a residual stress in an exterior surface from post-forming operations that is not greater than 500% less than residual stress in conventionally-formed abrasive articles, such as not greater than 400% less or not greater than 300% less or not greater than 200% less or not greater than 100% less or not greater than 90% less.

In an embodiment, the finally-formed abrasive articles of a batch may have subsurface damage or residual stress that extends for at least 0.01% and not greater than 200% of an average particle size (D50) of the abrasive particles, such as at least 0.05% of the D50 of the abrasive particles or at least 0.08% or at least 0.1% or at least 0.5% or at least 1% or at least 2% or at least 3% or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% or at least 100% or at least 102% or at least 105% or at least 108% or at least 110% or at least 115% or at least 120% or at least 125% or at least 130% or at least 140% or at least 150% or at least 160% or at least 170% or at least 180% of the D50 of the abrasive particles. In still another embodiment, the subsurface damage or residual stress extends for a distance below an exterior surface of the body for not greater than 190% of the D50 of the abrasive particles or not greater than 180% or not greater than 170% or not greater than 160% or not greater than 150% or not greater than 140% or not greater than 130% or not greater than 120% or not greater than 110% or not greater than 100% or not greater than 90% or not greater than 80% or not greater than 70% or not greater than 60% or not greater than 50% or not greater than 40% or not greater than 30% or not greater than 20% or not greater than 10% of the D50 of the abrasive particles.

In an embodiment, an abrasive article made herein may include a fixed abrasive such as a bonded abrasive article having abrasive particles contained in a three-dimensional volume of bond material, where the bond material substantially surrounds a majority of the abrasive particles. In still another embodiment, an abrasive article made herein may include a fixed abrasive such as a single-layered abrasive article wherein a substantially single layer of abrasive particles is contained in a layer of bond material.

In another non-limiting embodiment, empirical studies conducted by the Applicants suggest that in some instances the deposition technique for dispensing the powder material into the build box may need to be adapted from standard procedures. In some procedures, a significant portion, a majority, or even in some instances all of the powder material may be deposited in a non-uniform manner across the surface, such as by depositing a greater content at a starting position relative to an ending position of the deposition system. In some instances, the process may include a smoothing or leveling step, wherein a roller or blade is drawn across the surface of the deposited powder in an attempt to level the surface. However, it has been noted that in some instances, such a deposition process may still provide unsatisfactory products having notable variation in product characteristics and quality within the same batch.

In another non-limiting embodiment, the distribution of any one or more features of the abrasive articles can be evaluated. The shape of the distribution for such measured features, particularly dimensional features, may be evaluated via kurtosis.

The improvement in forming ratio is also evident in the limited residual stress and/or subsurface damage on one or more exterior surfaces of the finally-formed abrasive articles. Given the enhancements in the forming process, much less effort, if any, is needed to finish the abrasive articles to suitable shapes and/or tolerances for their intended applications. Accordingly, the amount of residual stress and/or subsurface damage in the finally-formed abrasive articles is less as compared to conventional products or other less sophisticated additive manufacturing techniques.

The foregoing properties of the abrasive articles of the embodiments herein provide various methods to define the quality and size of the abrasive articles capable of being formed using the methods of the embodiments herein.

EMBODIMENTS

Embodiment 1. A method for forming an additive manufactured body in a powder bed, the process comprising:
  forming at least a portion of a first green abrasive article body;
  forming at least a portion of a second green abrasive article body; and
  forming a buttressing element between the portion of the first green abrasive article body and the portion of the second green abrasive article body, wherein the buttressing element has a predetermined position between the first green abrasive article body and the portion of the second green abrasive article body.

Embodiment 2. The method of Embodiment 1, wherein the buttressing element is configured to limit substantial deformation of the first green abrasive article body during additive manufacturing.

Embodiment 3. The method of Embodiment 1, wherein the buttressing element is configured to distribute forces applied to an upper surface of the first green abrasive article body and an upper surface of a second green abrasive article body during additive manufacturing.

Embodiment 4. The method of Embodiment 1, wherein the buttressing element is configured to reduce the pressure applied to an upper surface of the first green abrasive article body and an upper surface of the second green abrasive article body during additive manufacturing.

Embodiment 5. The method of Embodiment 1, wherein the buttressing element is a sacrificial element intended to be scrapped after completing the formation of the first green abrasive article body and the second green abrasive article body.

Embodiment 6. The method of Embodiment 1, wherein the buttressing element is a sacrificial element intended to be recycled after completing the formation of the first green abrasive article body and the second green abrasive article body.

Embodiment 7. The method of Embodiment 1, wherein the buttressing element is different from the portion of the first green abrasive article body or the portion of the second green abrasive article body based on at least one of:
  i) two-dimensional shape in any plane;
  ii) three-dimensional shape;
  iii) composition;
  iv) binder content;
  v) raw material particle size;
  vi) position of a length, a width, and/or a thickness of the buttressing element body relative to the spread direction;
  vii) position of a length, a width, and/or a thickness of the buttressing element body relative to the compaction direction;
  viii) or any combination of i)-vii).

Embodiment 8. The method of Embodiment 1, wherein the buttressing element is displaced from the portion of the first green abrasive article body or the portion of the second green abrasive article body by a controlled spacing distance configured to reduce substantial deformation of the first green abrasive article body or the second green abrasive article body during additive manufacturing.

Embodiment 9. The method of Embodiment 1, wherein the buttressing element is displaced from the portion of the first green abrasive article body or the portion of the second green abrasive article body by a lateral spacing distance, wherein the lateral spacing distance is the smallest distance between the first and second body in a lateral direction that is parallel to a width of the build box, and wherein the lateral spacing distance is at least 0.01% of the length of the longer of the first green abrasive article body or the second green abrasive article body, and further wherein the lateral spacing distance is at least 0.1% or at least 1% or at least 5% or at least 10% or at least 15% or at least 20% or at least 25% or at least 30% or at least 35% or at least 40% or at least 45% or at least 50% or at least 60% or at least 65% or at least 70% or at least 75% or at least 80% or at least 85% or at least 90% or at least 95% or at least 100% or at least 125% or at least 150% or at least 175% or at least 200%.

Embodiment 10. The method of Embodiment 9, wherein the lateral spacing distance is not greater than 2000% of the length of the first green abrasive article body or second green abrasive article body or not greater than 1500% or not greater than 1000% or not greater than 800% or not greater than 500% or not greater than 200% or not greater than 100% or not greater than 90% or not greater than 80% or not greater than 70% or not greater than 60% or not greater than 50% or not greater than 40% or not greater than 30% or not greater than 20%.

Embodiment 11. The method of Embodiment 1, wherein the buttressing element is displaced from the portion of the first green abrasive article body or the portion of the second green abrasive article body by a longitudinal spacing distance, wherein the longitudinal spacing distance is the smallest distance between the buttressing element and the first green abrasive article body or second green abrasive article body in a longitudinal direction that is parallel to a length of the build box, and wherein the longitudinal spacing distance is at least 0.01% of the longer of the length of the first green abrasive article body or second green abrasive article body at least 0.1% or at least 1% or at least 5% or at least 10% or at least 15% or at least 20% or at least 25% or at least 30% or at least 35% or at least 40% or at least 45% or at least 50% or at least 60% or at least 65% or at least 70% or at least 75% or at least 80% or at least 85% or at least 90% or at least 95% or at least 100% or at least 125% or at least 150% or at least 175% or at least 200%.

Embodiment 12. The method of Embodiment 11, wherein the longitudinal spacing distance is not greater than 2000% of the length of the first body or second body or not greater than 1500% or not greater than 1000% or not greater than 800% or not greater than 500% or not greater than 200% or not greater than 100% or not greater than 90% or not greater than 80% or not greater than 70% or not greater than 60% or not greater than 50% or not greater than 40% or not greater than 30% or not greater than 20%.

Embodiment 13. The method of Embodiment 1, wherein the buttressing element is displaced from the portion of the first green abrasive article body or the portion of the second green abrasive article body by a vertical spacing distance, wherein the vertical spacing distance is the smallest distance between the buttressing element and the first green abrasive article body or second green abrasive article body in a vertical direction that is parallel to a depth of the build box, and wherein the vertical spacing distance is at least 0.01% of the longer of the length of the first green abrasive article body or second green abrasive article body at least 0.1% or at least 1% or at least 5% or at least 10% or at least 15% or at least 20% or at least 25% or at least 30% or at least 35% or at least 40% or at least 45% or at least 50% or at least 60% or at least 65% or at least 70% or at least 75% or at least 80% or at least 85% or at least 90% or at least 95% or at least 100% or at least 125% or at least 150% or at least 175% or at least 200%.

Embodiment 14. The method of Embodiment 13, wherein the vertical spacing distance is not greater than 2000% of the length of the first body or second body or not greater than 1500% or not greater than 1000% or not greater than 800% or not greater than 500% or not greater than 200% or not greater than 100% or not greater than 90% or not greater than 80% or not greater than 70% or not greater than 60% or not greater than 50% or not greater than 40% or not greater than 30% or not greater than 20%.

Embodiment 15. The method of Embodiment 1, wherein the first green abrasive article body and second green abrasive article body are different from each other in at least one dimension of length, width, and/or thickness.

Embodiment 16. The method of Embodiment 1, wherein the first green abrasive body and second green abrasive body have substantially the same dimensions of length, width, and thickness.

Embodiment 17. The method of Embodiment 1, wherein the first green abrasive article body comprises a first longitudinal axis and the buttressing element comprises a longitudinal axis and wherein the first longitudinal axis and the longitudinal axis of the buttressing element are substantially parallel to each other.

Embodiment 18. The method of Embodiment 1, wherein the first green abrasive article body comprises a first longitudinal axis and the buttressing element comprises a longitudinal axis and wherein the first longitudinal axis and the longitudinal axis of the buttressing element are substantially perpendicular to each other.

Embodiment 19. The method of Embodiment 1, wherein the first green abrasive article body comprises a first longitudinal axis and the buttressing element comprises a longitudinal axis and wherein the first longitudinal axis and the longitudinal axis of the buttressing element are angled with respect to each other within a range of at least 6 degrees and not greater than 84 degrees.

Embodiment 20. The method of Embodiment 1, wherein the first green abrasive article body comprises a first lateral axis and the buttressing element comprises a lateral axis and wherein the first lateral axis and the lateral axis of the buttressing element are substantially parallel to each other.

Embodiment 21. The method of Embodiment 1, wherein the first green abrasive article body comprises a first lateral axis and the buttressing element comprises a lateral axis and wherein the first lateral axis and the lateral axis of the buttressing element are substantially perpendicular to each other.

Embodiment 22. The method of Embodiment 1, wherein the first green abrasive article body comprises a first lateral axis and the buttressing element comprises a lateral axis and wherein the first lateral axis and the lateral axis of the buttressing element are angled with respect to each other within a range of at least 6 degrees and not greater than 84 degrees.

Embodiment 23. The method of Embodiment 1, wherein the first green abrasive article body comprises a first vertical axis and the buttressing element comprises a vertical axis and wherein the first vertical axis and the vertical axis of the buttressing element are substantially parallel to each other.

Embodiment 24. The method of Embodiment 1, wherein the first green abrasive article body comprises a first vertical axis and the buttressing element comprises a vertical axis and wherein the first vertical axis and the vertical axis of the buttressing element are substantially perpendicular to each other.

Embodiment 25. The method of Embodiment 1, wherein the first green abrasive article body comprises a first vertical axis and the buttressing element comprises a vertical axis and wherein the first vertical axis and the vertical axis of the buttressing element are angled with respect to each other within a range of at least 6 degrees and not greater than 84 degrees.

Embodiment 26. The method of Embodiment 1, wherein the first green abrasive article body comprises at least one of:
  a first longitudinal axis that is substantially parallel to a direction of translation of a compaction object;
  a first longitudinal axis that is substantially perpendicular to a direction of translation of a compaction object; or
  a first longitudinal axis that is angled with respect to a direction of translation of a compaction object within a range of at least 6 degrees and not greater than 84 degrees.

Embodiment 27. The method of Embodiment 1, wherein the buttressing element comprises at least one of:
  a longitudinal axis that is substantially parallel to a direction of translation of a compaction object;
  a longitudinal axis that is substantially perpendicular to a direction of translation of a compaction object; or
  a longitudinal axis that is angled with respect to a direction of translation of a compaction object within a range of at least 6 degrees and not greater than 84 degrees.

Embodiment 28. The method of Embodiment 1, wherein the first green abrasive article body comprises at least one of:
- a first lateral axis that is substantially parallel to a direction of translation of a compaction object;
- a first lateral axis that is substantially perpendicular to a direction of translation of a compaction object; or
- a first lateral axis that is angled with respect to a direction of translation of a compaction object within a range of at least 6 degrees and not greater than 84 degrees.

Embodiment 29. The method of Embodiment 1, wherein the buttressing element comprises at least one of:
- a lateral axis that is substantially parallel to a direction of translation of a compaction object;
- a lateral axis that is substantially perpendicular to a direction of translation of a compaction object; or
- a lateral axis that is angled with respect to a direction of translation of a compaction object within a range of at least 6 degrees and not greater than 84 degrees.

Embodiment 30. The method of Embodiment 1, wherein the first green abrasive article body comprises at least one:
- a first vertical axis that is angled out of plane to a plane of translation of a compaction object;
- a first vertical axis that is substantially perpendicular to a direction of translation or a plane of translation of a compaction object; or
- a first vertical axis that is angled out of plane with respect to a plane of translation of a compaction object within a range of at least 6 degrees and not greater than 84 degrees.

Embodiment 31. The method of Embodiment 1, wherein the buttressing element comprises at least one of:
- a vertical axis that is angled out of plane to a plane of translation of a compaction object;
- a vertical axis that is substantially perpendicular to a direction of translation or a plane of translation of a compaction object; or
- a vertical axis that is angled out of plane with respect to a plane of translation of a compaction object within a range of at least 6 degrees and not greater than 84 degrees.

Embodiment 32. The method of Embodiment 1, wherein forming a green body abrasive article comprising the precursor bond material and abrasive particles, wherein forming is conducted by:
a) creating one or more layers of the powder material;
b) selectively binding portions of the one or more layers with a binder material; and
c) converting the binder material to at least partially solidify the binder material and bind portions of powder material from the one or more layers.

Embodiment 33. The method of Embodiment 32, wherein selectively binding portions of one or more layers includes selectively binding a first portion of the powder layer defining a portion of the first green abrasive article body, selectively binding a second portion of the powder layer defining a portion of the second abrasive article body, and selectively binding a portion of the buttressing element.

Embodiment 34. The method of Embodiment 32, further comprising moving a compaction object over the one or more layers of powder material to apply a force sufficient to compact the layer to a compacted layer thickness that is less than the thickness of the layer prior to compaction.

Embodiment 35. The method of Embodiment 34, wherein moving the compaction object over the one or more layers of powder material is adjusted based on at least one of the following:
i) a relative spacing between one of the green abrasive article bodies and a buttressing element;
ii) a two-dimensional shape of one of the green abrasive article bodies as viewed top-down or in cross-section in the build box;
iii) a three-dimensional shape of at least one green abrasive article body;
iv) a two-dimensional shape of the buttressing element as viewed top-down or in cross-section in the build box;
v) a three-dimensional shape of the buttressing element;
vi) or any combination of i)-v).

Embodiment 36. The method of Embodiment 34, further comprising controlling at least one of:
a) a force applied by a compaction object to the layer or a plurality of layers of powder;
b) a traverse speed of a compaction object;
c) average thickness of the layer prior to compaction;
d) a particle size distribution of the powder;
e) number of previously formed layers underlying the layer of powder;
f) the number of compacted layers underlying the layer of powder;
g) the density of any layers underlying the layer of powder;
h) the amount of binder in any layers underlying the layer of powder;
i) the relative dimensions of the layer relative to one or more layers underlying the layer; and
j) any combination of a)-i).

Embodiment 37. The method of Embodiment 36, further comprising selecting a placement, an orientation, and/or size of the first green abrasive article and/or buttressing element based on any one or more elements of a)-i).

Embodiment 38. The method of Embodiment 1, wherein the buttressing element has at least one surface that is complementary to at least one surface of the first green abrasive article body or at least one surface of the second green abrasive article body.

Embodiment 39. The method of Embodiment 38, wherein the first green abrasive article body comprises a first curved surface and the buttressing element includes a buttressed curved surface substantially corresponding to a curvature of the first curved surface.

Embodiment 40. The method of Embodiment 32, wherein the buttressing surface substantially surrounds the first green abrasive article body as viewed top-down and/or in cross-section in the build box Embodiment 41. A method for forming an abrasive article comprising:
- quantifying a distortion of a green abrasive article body or finally-formed abrasive article as compared to a model used to form the green abrasive article body or the finally-formed abrasive article; and
- modifying a model used to control the formation of the green abrasive article body or finally-formed abrasive article.

Embodiment 42. The method of Embodiment 41, further comprising using any one or more methods of the embodiments herein and further wherein the green abrasive article body can have any one or more features of the embodiments herein.

EXAMPLES

The following non-limiting examples illustrate the present invention.

Example 1

A mixture is prepared by combining two individual dry powder materials: a precursor bond material and abrasive particles. The precursor bond material is an oxide-containing material that forms a vitreous phase material upon further processing.

The additive manufacturing process is conducted according to embodiments described herein. The additive manufacturing process may be characterized as a binder jetting operation, wherein layers of the powder material are deposited into a build box, the layers are smoothed, compacted, and selectively bound with a binder material to form a batch of green body abrasive articles contained a bed of unbound or loose powder. Each of the green body abrasive articles has any one or more of the features claimed in the embodiments herein. The batch of green body abrasive articles has any one or more of the features claimed in the embodiments herein. The green body abrasive article is converted to finally-formed abrasive article via heating as provided below. Example 1 was formed using an ExOne (now Desktop Metal) Innovent+. The printing conditions are summarized in Table 1.

TABLE 1

| Parameter | Sample S1 |
| --- | --- |
| Saturation (%) | 10-200% |
| Layer Thickness [μm] | 1-1000 |
| Foundation Layer Count | 0-200 |
| Oscillator on Delay (sec)Dispenser Delay | 0-20 |
| Dispense coverage parameter (% of bed length for dispensing powder material) | 0-100% |
| Binder Set Time (sec) | 0-30 |
| Recoater Dry Speed (mm/s) | 1-120 |
| Target Bed Temperature (° C.) | 20-100 |
| Recoat Speed (mm/s) | 1-200 |
| Smoothing Roller Rotation Rate(rpm) | 1-1000 |
| Smoothing Roller Speed (mm/s) | 1-200 |
| Binder Droplet Volume (pL)- | 10-80 |
| Binder Droplet Frequency (Hz)- | 955-10,000 |
| Compaction Roller Speed (mm/s) | 1-150 |
| Compaction thickness Δ (μm) | 5-300 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm$^3$. The green body abrasive article has a thickness of at least 1 mm.

After forming, the green body is heated at a rate of 5° C./min up to temperature of 375° C. under air, and held for one hour at 375° C. to remove the binder. Thereafter, the air is replaced with argon and the body is heated at a ramp rate of 5° C./min up to a maximum temperature of 1000° C. The temperature is held for four hours at 1000° C., and cooling is conducted at a rate of 5° C./minute.

Example 2

A mixture is prepared by combining two individual dry powder materials: a precursor bond material and abrasive particles. The precursor bond material is a metal-containing material.

The process for forming the green body abrasive article of Example 2 is conducted using an ExOne25 Pro (now Desktop Metal). Printing conditions are provided in Table 2 below.

TABLE 2

| Parameter | Sample S2 |
| --- | --- |
| Saturation (%) | 10-200% |
| Layer Thickness [μm] | 1-1000 |
| Foundation Layer Count | 0-200 |
| Oscillator on Delay (sec)Dispenser Delay | 0-20 |
| Dispense coverage parameter (% of bed length for dispensing powder material) | 0-100% |
| Binder Set Time (sec) | 0-30 |
| Recoater Dry Speed (mm/s) | 1-120 |
| Target Bed Temperature (° C.) | 20-100 |
| Recoat Speed (mm/s) | 1-200 |
| Smoothing Roller Rotation Rate(rpm) | 1-1000 |
| Smoothing Roller Speed (mm/s) | 1-200 |
| Binder Droplet Volume (pL) | 10-80 |
| Binder Droplet Frequency (Hz) | 955-10,000 |
| Compaction Roller Speed (mm/s) | 1-150 |
| Compaction thickness Δ (μm) | 5-300 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm$^3$. The green body abrasive article has a thickness of at least 1 mm.

Comparative Example 1

Figure 15:
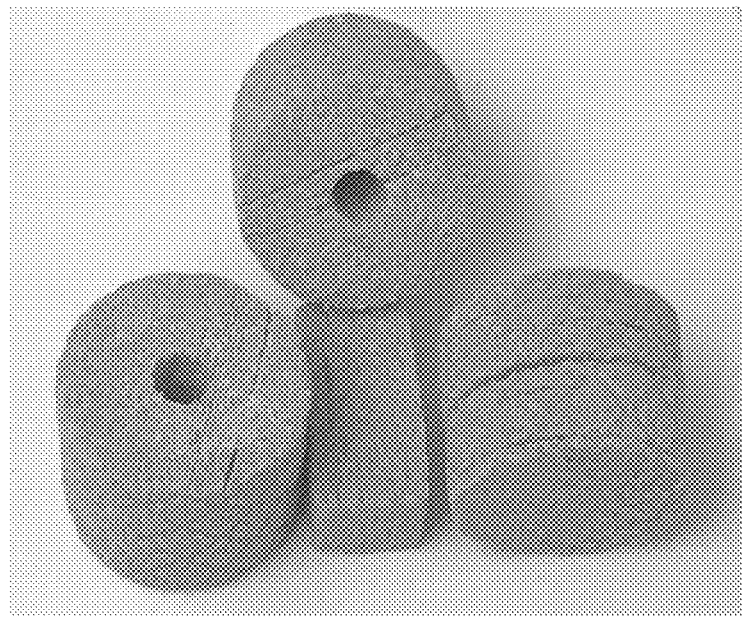
FIG. 15 includes an image of abrasive articles from a comparative sample.

A sample was prepared using a binder jetting operation as generally described in Example 1. However, the powder material was 20 wt % of SP1086 glass powder from Specialty Glass Inc., in Oldsmar, Florida and 80 wt % of 200/230 Mesh, D76 diamond powder from Pinnacle Abrasives (Santa Rosa, CA). The binder used was PM-B-SR1-04 from ExOne. The forming conditions are detailed below in Table 3 and were formed using an Innovent ExOne (now Desktop Metal) Printer. FIG. 15 includes images of CS1 samples.

TABLE 3

| Parameter | Sample CS1 |
| --- | --- |
| Saturation (%) | 70 |
| Layer Thickness [μm] | 100 |
| Foundation Layer Count | 5 |
| Oscillator on Delay (sec) | 2 |
| Binder Set (sec) | 1 |
| Dry Time (sec) | 45 |
| Target Temperature (° C.) | 60 |
| Recoat Speed (rpm) | 10 |
| Oscillator Speed (rpm) | 2800 |
| Roller Speed (rpm) | 60 |
| Roller Speed (mm/s) | 1 |

The body was then cured in an ambient atmosphere oven for 2 hours at 195° C. After curing and cooling to 23° C. the cured bodies are placed into a furnace and burned out at 400° C. for 2 hours, followed by sintering at 700° C. for 4 hours, to produce comparative sample CS1.

Sdr and Surface Roughness

The Sdr and surface roughness (Sa) of transverse surfaces and other surfaces of representative samples ("Sample S1") and Sample CS1 were measured and detailed below in Table 4.

TABLE 4

| Sample | Sdr[%] Transverse | Sdr[%] Top | Sdr[%] Difference | Sa[microns] Transverse | Sa[microns] Top |
|---|---|---|---|---|---|
| Sample S1 | 76.5 | 64.7 | 11.8 | 11 | 9.112 |
| CS1 | 130 | 100 | 30 | | |

Notably, Sample S1 had a much smaller transverse Sdr and Sdr difference than CS1.

Example 3

A mixture is prepared by combining two individual dry powder materials: a precursor bond material and abrasive particles. The precursor bond material is an oxide-containing material that forms a vitreous phase material upon further processing.

The additive manufacturing process is conducted according to embodiments described herein. The additive manufacturing process may be characterized as a binder jetting operation, wherein layers of the powder material are deposited into a build box, the layers are smoothed, compacted, and selectively bound with a binder material to form a batch of green body abrasive articles contained a bed of unbound or loose powder. Each of the green body abrasive articles has any one or more of the features claimed in the embodiments herein. The batch of green body abrasive articles has any one or more of the features claimed in the embodiments herein. The green body abrasive article is converted to finally-formed abrasive article via heating as provided below. Example 3 was formed using an ExOne (now Desktop Metal) Innovent+. The printing conditions are summarized in Table 5.

TABLE 5

| Parameter | Sample S3 |
|---|---|
| Saturation (%) | 10-200% |
| Layer Thickness [µm] | 200 |
| Foundation Layer Count | 1-200 |
| Oscillator on Delay (sec) | 0-5 |
| Dispense coverage parameter (% of bed length for dispensing powder material) | 0-100% |
| Binder Set Time (sec) | 0-600 |
| Recoater Dry Speed (mm/s) | 1-120 |
| Target Bed Temperature (° C.) | 20-100 |
| Recoat Speed (mm/s) | 1-500 |
| Smoothing Roller Speed (rpm) | 1-1000 |
| Smoothing Roller Speed (mm/s) | 1-150 |
| Binder Droplet Volume (pL) | 10-80 |
| Binder Droplet Frequency (Hz) | 955-10,000 |
| Compaction Roller Speed (mm/s) | 0-150 |
| Compaction thickness Δ (µm) | 150 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm³. The green body abrasive article has a thickness of at least 1 mm.

After forming, the green body is heated at a rate of 5° C./min up to temperature of 375° C. under air and held for one hour at 375° C. to remove the binder. Thereafter, the air is replaced with argon and the body is heated at a ramp rate of 5° C./min up to a maximum temperature of 1000° C. The temperature is held for four hours at 1000° C., and cooling is conducted at a rate of 5° C./minute.

Figure 14A:
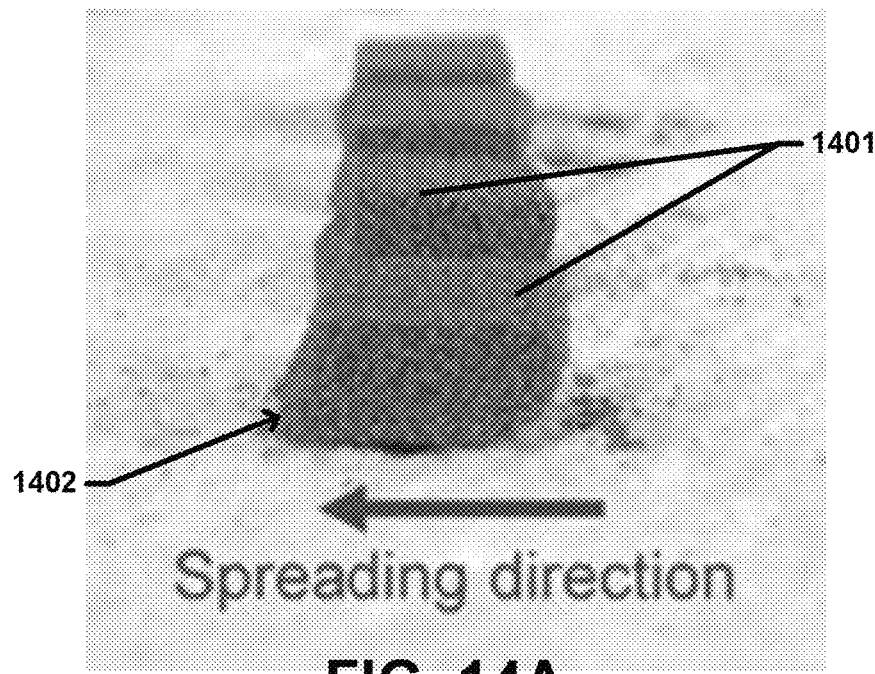
FIGS. 14A and 14B include images of abrasive articles having layer shifting.
Figure 14B:
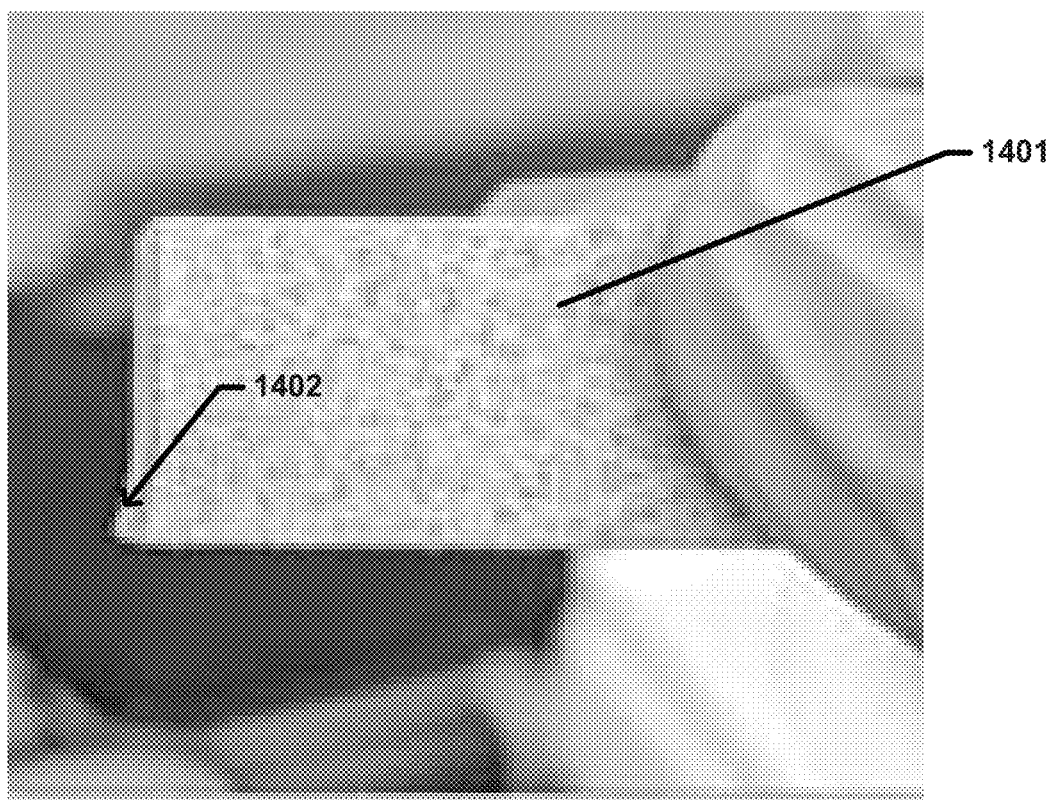

FIGS. 14A and 14B include images of abrasive articles wherein the ends of the bodies 1401 of the abrasive article demonstrate layer shifting 1402, which results in an undesired shape defect and greater variation in the shape fidelity of the green abrasive article bodies of the batch. The direction of spreading is also indicated and the relationship between the spreading direction and the layer shifting is observed.

Example 4

Figure 13A:
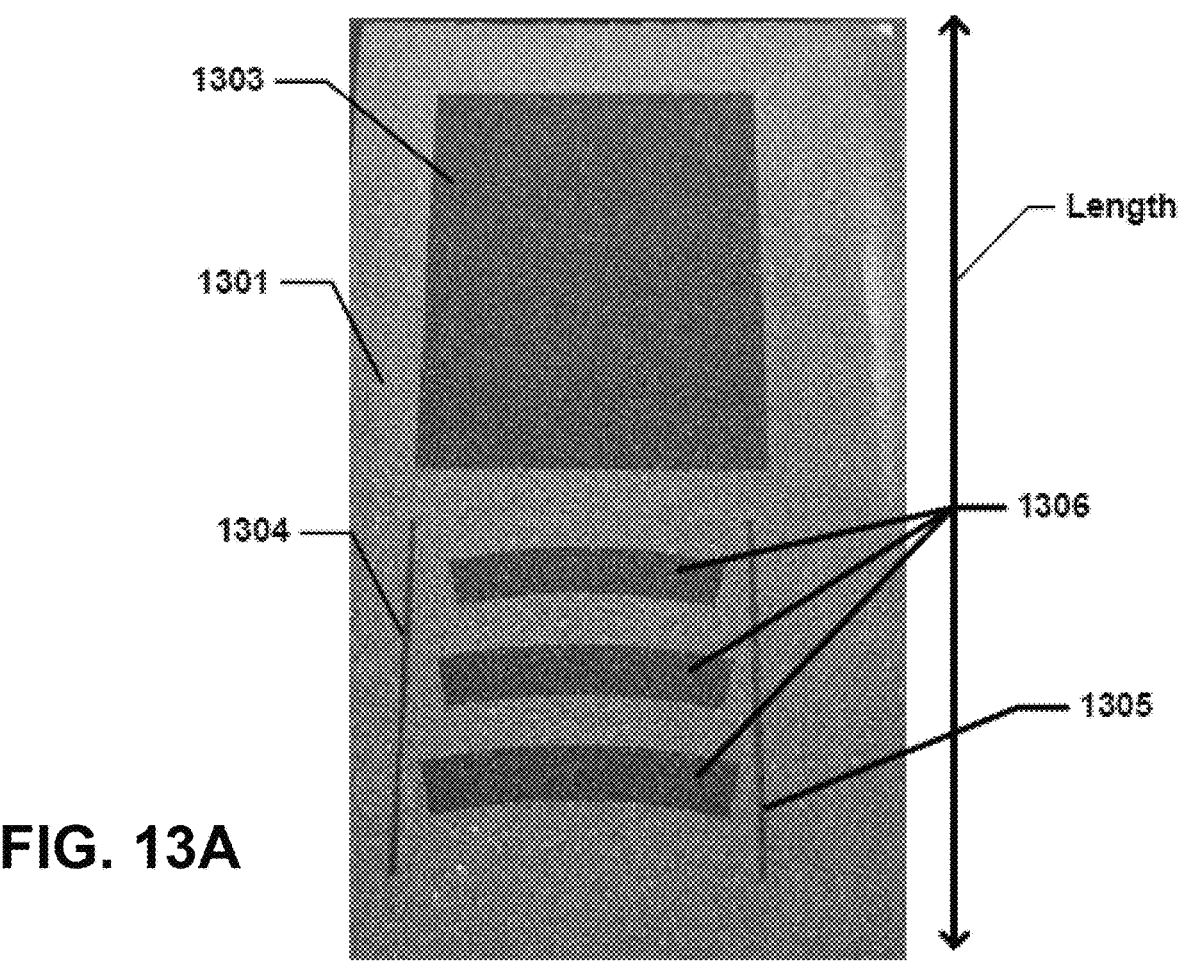
FIG. 13A includes a top-down image of a build bed including a plurality of bodies according to an embodiment.
Figure 13B:
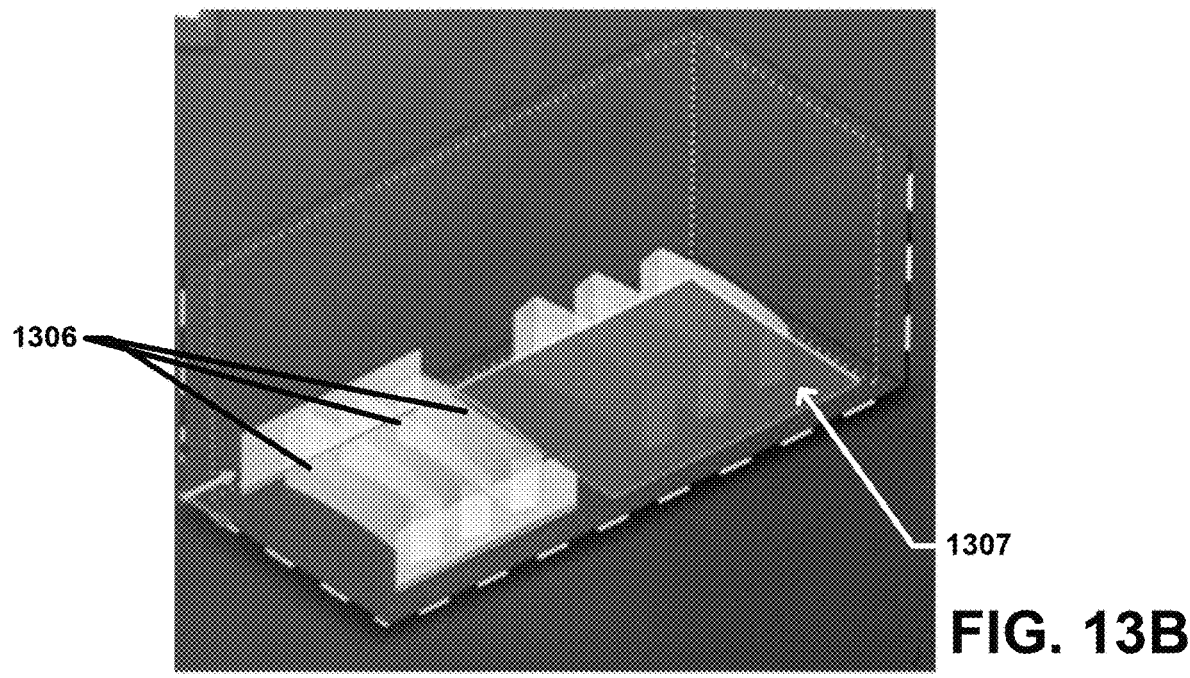
FIG. 13B includes a perspective view illustration of bodies within a build bed according to an embodiment.

A batch of abrasive articles were prepared according to the process of Example 3 except that buttressing elements are added as depicted in FIGS. 13A and 13B in the build box. Example 4 was formed using an ExOne (now Desktop Metal) Innovent+. The printing conditions are summarized in Table 6.

TABLE 6

| Parameter | Sample S4 |
|---|---|
| Saturation (%) | 10-200% |
| Layer Thickness [µm] | 200 |
| Foundation Layer Count | 1-200 |
| Oscillator on Delay (sec) | 0-5 |
| Dispense coverage parameter (% of bed length for dispensing powder material) | 0-100% |
| Binder Set Time (sec) | 0-600 |
| Dry Time (sec) | 1-120 |
| Target Bed Temperature (° C.) | 20-100 |
| Recoat Speed (mm/s) | 1-500 |
| Smoothing Roller Speed (rpm) | 1-1000 |
| Smoothing Roller Speed (mm/s) | 1-150 |
| Binder Droplet Volume (pL) | 10-80 |
| Binder Droplet Frequency (Hz) | 955-10,000 |
| Compaction Roller Speed (mm/s) | 0-150 |
| Compaction thickness Δ (µm) | 50 |

FIG. 13A includes a top-down view image of bodies 1303, 1304, 1305, and 1306 in a bed of powder material 1301. FIG. 13B includes a perspective view image of a model used to create the bodies including a view of body 1307 that is not visible in FIG. 13A. According to one embodiment, the bodies 1303, 1304, 1305 and 1307 are buttressing elements and the bodies 1306 are green abrasive article bodies. All of the bodies 1303-1307 include a combination of powder material including abrasive particles, precursor bond material and a content of binder configured to bind the regions of the bodies 1303-1307 to form suitable green abrasive articles. As is evident, the buttressing elements 1303, 1304, 1305, and 1307 have a different shape as compared to the abrasive articles 1306 and are formed in such a manner as to reduce or eliminate unintended defects, such as layer shifting.

Example 5

A first batch of abrasive articles (Sample S5) was prepared from a powder mixture of 70 wt % iron powder and 30 wt % diamond for a total weight of the mixture. The iron powder had a D50 of approximately 38 microns. The diamond had a D50 of approximately 250 microns. The density of the powder was approximately 3.00 g/cc. The forming parameters are as listed in Table 7.

Figure 16A:
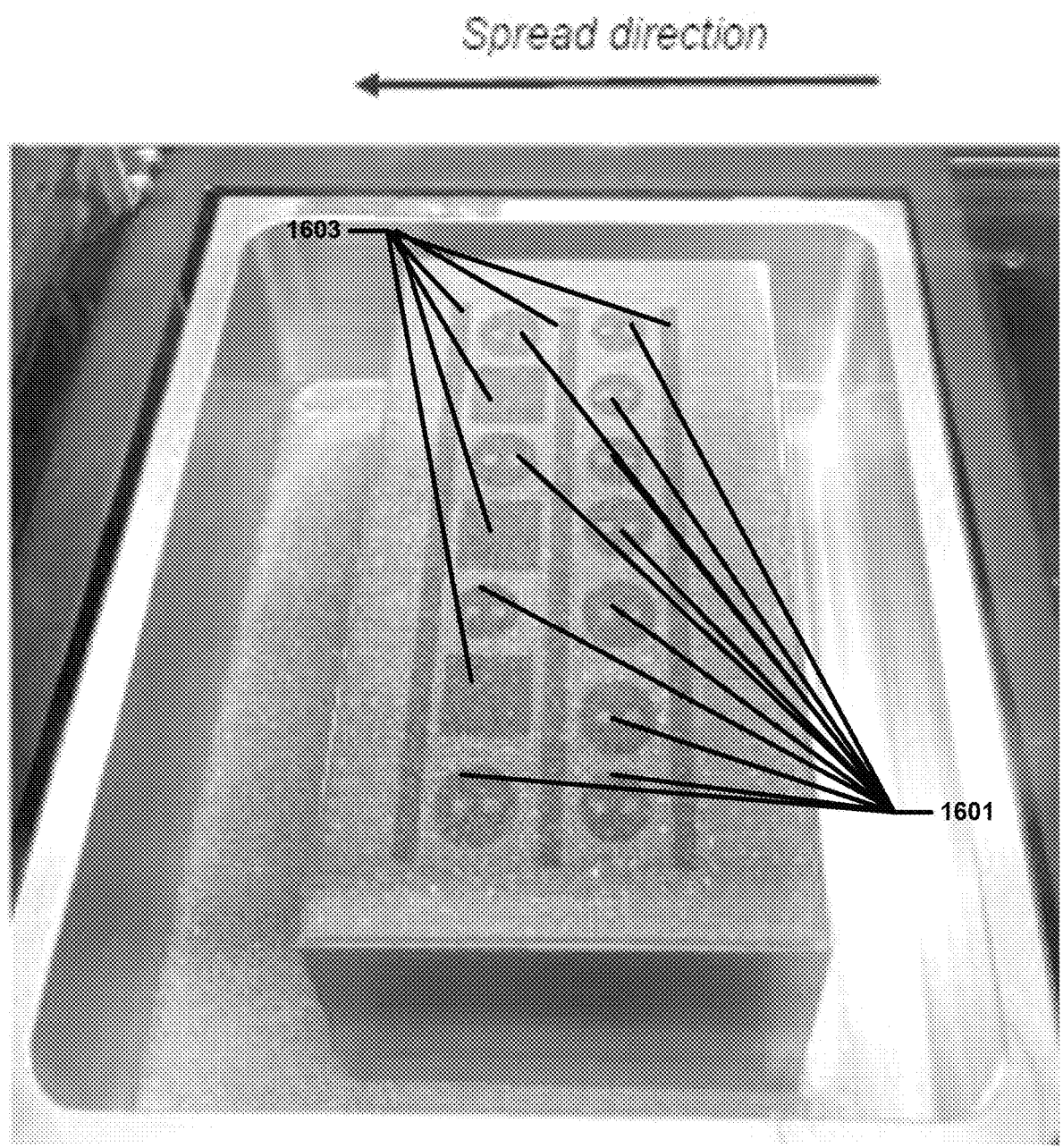
FIG. 16A includes a top-down image of a build box including green abrasive article bodies and buttressing elements.

FIG. 16A includes a top-down image of the build box including a plurality of green abrasive article bodies 1601, a plurality of buttressing elements 1603, and reference for the spread direction, which is also the direction of movement for the compacting object during a compaction process. The print direction is in the same plane but perpendicular to the spread direction. The plurality of green abrasive article bodies 1601 have a circular two-dimensional shape as viewed top-down in the plane of the length and width of the build box, and cylindrical three-dimensional shape.

A second batch of abrasive articles (Sample CS2) was prepared like those of Sample S5 without using the buttressing elements. The Samples CS2 and S5 were formed using an ExOne (now Desktop Metal) Innovent+. The printing conditions for both samples (S5 and CS2) are summarized in Table 7.

TABLE 7

| Parameter | Sample S5 |
| --- | --- |
| Saturation (%) | 10-200% |
| Layer Thickness [μm] | 400 |
| Foundation Layer Count | 1-200 |
| Oscillator on Delay (sec) | 0-5 |
| Dispense coverage parameter (% of bed length for dispensing powder material) | 0-100% |
| Binder Set Time (sec) | 0-600 |
| Dry Time (sec) | 1-120 |
| Target Bed Temperature (° C.) | 20-100 |
| Recoat Speed (mm/s) | 1-500 |
| Smoothing Roller Speed (rpm) | 1-1000 |
| Smoothing Roller Speed (mm/s) | 1-150 |
| Binder Droplet Volume (pL) | 10-80 |
| Binder Droplet Frequency (Hz) | 955-10,000 |
| Compaction Roller Speed (mm/s) | 0-150 |
| Compaction thickness Δ (μm) | 100 |

Figure 16B:
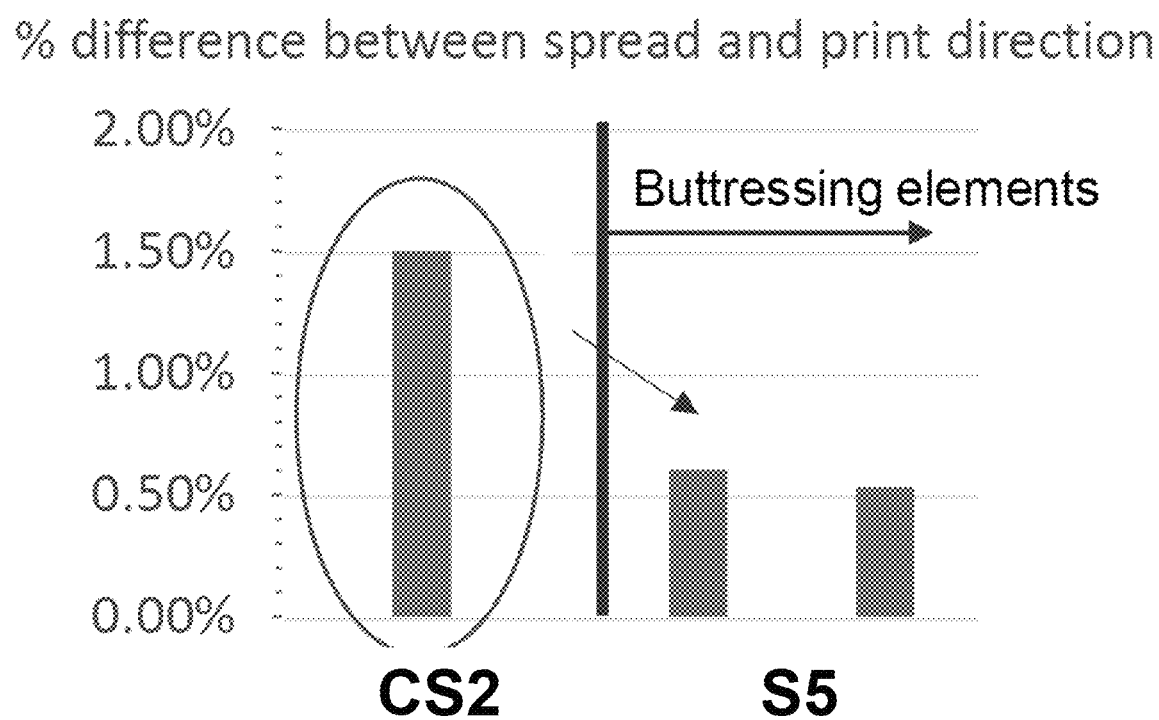
FIG. 16B includes a plot of percent difference spread and print direction for Samples CS2 and S5.

FIG. 16B includes a plot of the percent difference in the diameter (equivalent to width) of the green abrasive article bodies as measured in the spread direction as compared to a diameter measured in a direction perpendicular to spread direction and in the same plane as the spread direction diameter. The difference is calculated according to the formula: Difference1=Ds−Dp, wherein "Ds" is the diameter of part in spread direction and "Dp" is diameter of part in the print direction, which is perpendicular to the spread direction. The percent difference is calculated according to the formula: Percent Difference=(Difference1/Dp)×100%.

Certain dimensional characteristics of the Samples S1-S5 and Comparative Samples CS1 and CS2 are being measured. Such dimensional characteristics include, but are not limited to Volumetric Form Factor, Batch Volumetric Form Factor, and the like. The data is forthcoming and is expected to demonstrate that the samples formed according to the embodiments herein have one or more dimensional characteristics that are superior to the dimensional characteristics of the samples formed using conventional knowledge.

According to the embodiments herein, abrasive articles may be created that have a controlled difference in surface features (e.g., Sdr, etc.) between two surfaces, notably two different exterior surfaces of the abrasive articles. Research into the process variables that may be used to control difference in such surface features are complex and not predictable. Certain surface features, such as the difference in Sdr are understood to be related to build direction and orientation of the body during the forming process. Accordingly, the empirical data generated demonstrates that it is possible to engineer abrasive articles having selective surface features on various surfaces by controlling the build direction and build parameters. Such surface features are thought to be technically beneficial with respect to improved abrasive performance and/or anchoring of the abrasive articles with a bond system or other component for formation of a fixed abrasive article.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method for forming an additive manufactured body in a build box, the process comprising:
  forming at least a portion of a first green abrasive article body;
  forming at least a portion of a second green abrasive article body; and
  forming a buttressing element between the portion of the first green abrasive article body and the portion of the second green abrasive article body, wherein the buttressing element has a predetermined position between the first green abrasive article body and the portion of the second green abrasive article body wherein the buttressing element is displaced from the portion of the first green abrasive article body or the portion of the second green abrasive article body by a controlled spacing distance configured to reduce substantial deformation of the first green abrasive article body or the second green abrasive article body during additive manufacturing.

2. The method of claim 1, wherein the buttressing element is configured to limit substantial deformation of the first green abrasive article body during additive manufacturing.

3. The method of claim 1, wherein the buttressing element is configured to distribute forces and/or pressure applied to an upper surface of the first green abrasive article body during additive manufacturing.

4. The method of claim 1, wherein the buttressing element is a sacrificial element intended to be scrapped or recycled after completing the formation of the first green abrasive article body and the second green abrasive article body.

5. The method of claim 1, wherein the buttressing element is different from the portion of the first green abrasive article body or the portion of the second green abrasive article body based on at least one of:
  i) two-dimensional shape in any plane;
  ii) three-dimensional shape;
  iii) composition;
  iv) binder content;
  v) raw material particle size;
  vi) position of a length, a width, and/or a thickness of the buttressing element body relative to a spread direction;
  vii) position of a length, a width, and/or a thickness of the buttressing element body relative to a compaction direction;
  viii) or any combination of i)-vii).

6. The method of claim 1, wherein the buttressing element is configured to reduce the during pressure applied to an upper surface of the first green abrasive article body and an upper surface of the second green abrasive article body during additive manufacturing.

7. The method of claim 1, wherein the buttressing element is displaced from the portion of the first green abrasive article body or the portion of the second green abrasive article body by a lateral spacing distance, wherein the lateral spacing distance is the smallest distance between the first and second body in a lateral direction that is parallel to a width of the build box, and wherein the lateral spacing distance is at least 0.01% and not greater than 2000% of a length of the longer of the first green abrasive article body or the second green abrasive article body.

8. The method of claim 1, wherein the buttressing element is displaced from the portion of the first green abrasive article body or the portion of the second green abrasive article body by a longitudinal spacing distance, wherein the longitudinal spacing distance is the smallest distance between the buttressing element and the first green abrasive article body or second green abrasive article body in a longitudinal direction that is parallel to a length of the build box, and wherein the longitudinal spacing distance is at least 0.01% and not greater than 2000% of the longer of the length of the first green abrasive article body or second green abrasive article body.

9. The method of claim 1, wherein the buttressing element is displaced from the portion of the first green abrasive article body or the portion of the second green abrasive article body by a vertical spacing distance, wherein the vertical spacing distance is the smallest distance between the buttressing element and the first green abrasive article body or second green abrasive article body in a vertical direction that is parallel to a depth of the build box, and wherein the vertical spacing distance is at least 0.01% and not greater than 2000% of the longer of a length of the first green abrasive article body or second green abrasive article body.

10. The method of claim 1, wherein the first green abrasive article body comprises at least one of:
  a first longitudinal axis that is substantially parallel to a direction of translation of a compaction object;
  a first longitudinal axis that is substantially perpendicular to the direction of translation of the compaction object; or
  a first longitudinal axis that is angled with respect to the direction of translation of the compaction object within a range of at least 6 degrees and not greater than 84 degrees.

11. The method of claim 1, wherein the buttressing element comprises at least one of:
  a longitudinal axis that is substantially parallel to a direction of translation of a compaction object;
  a longitudinal axis that is substantially perpendicular to the direction of translation of the compaction object; or
  a longitudinal axis that is angled with respect to the direction of translation of the compaction object within a range of at least 6 degrees and not greater than 84 degrees.

12. The method of claim 1, wherein the first green abrasive article body comprises at least one of:
  a first lateral axis that is substantially parallel to a direction of translation of a compaction object;
  a first lateral axis that is substantially perpendicular to the direction of translation of the compaction object; or
  a first lateral axis that is angled with respect to the direction of translation of the compaction object within a range of at least 6 degrees and not greater than 84 degrees.

13. The method of claim 1, wherein the buttressing element comprises at least one of:
  a lateral axis that is substantially parallel to a direction of translation of a compaction object;
  a lateral axis that is substantially perpendicular to the direction of translation of the compaction object; or
  a lateral axis that is angled with respect to the direction of translation of the compaction object within a range of at least 6 degrees and not greater than 84 degrees.

14. The method of claim 1, wherein the first green abrasive article body comprises at least one:
  a first vertical axis that is angled out of plane to a plane of translation of a compaction object;
  a first vertical axis that is substantially perpendicular to a direction of translation or the plane of translation of the compaction object; or
  a first vertical axis that is angled out of plane with respect to the plane of translation of a compaction object within a range of at least 6 degrees and not greater than 84 degrees.

15. The method of claim 1, wherein the buttressing element comprises at least one of:
  a vertical axis that is angled out of plane to a plane of translation of a compaction object;
  a vertical axis that is substantially perpendicular to a direction of translation or the plane of translation of the compaction object; or
  a vertical axis that is angled out of plane with respect to the plane of translation of the compaction object within a range of at least 6 degrees and not greater than 84 degrees.

16. The method of claim 1, wherein the first green abrasive article body and the second green abrasive article body comprise a precursor bond material and abrasive particles, wherein forming the first green abrasive article body and the second green abrasive article body comprises:

a) creating one or more layers of a powder material;
b) selectively binding portions of the one or more layers of the powder material with a binder material; and
c) converting the binder material to at least partially solidify the binder material and bind portions of the powder material from the one or more layers.

17. The method of claim 16, wherein selectively binding portions of the one or more layers comprises selectively binding a first portion of the one or more layers of the powder material defining a portion of the first green abrasive article body, selectively binding a second portion of the one or more layers of the powder material defining a portion of the second abrasive article body, and selectively binding a portion of the buttressing element.

18. The method of claim 16, further comprising moving a compaction object over the one or more layers of powder material to apply a force sufficient to compact the one or more layers of powder material to a compacted layer thickness that is less than a thickness of the one or more layers or powder material prior to compaction.

19. The method of claim 18, wherein moving the compaction object over the one or more layers of powder material is adjusted based on at least one of the following:
　i) a relative spacing between one of the green abrasive article bodies and the buttressing element;
　ii) a two-dimensional shape of one of the green abrasive article bodies as viewed top-down or in cross-section in the build box;
　iii) a three-dimensional shape of at least one green abrasive article body;
　iv) a two-dimensional shape of the buttressing element as viewed top-down or in cross-section in the build box;
　v) a three-dimensional shape of the buttressing element;
　vi) or any combination of i)-v).

20. The method of claim 18, further comprising controlling at least one of:
　a) a force applied by the compaction object to the one or more layers of powder material;
　b) a traverse speed of the compaction object;
　c) average thickness of the one or more layers or powder material prior to compaction;
　d) a particle size distribution of the powder material;
　e) number of previously formed layers underlying the one or more layers of powder material;
　f) the number of compacted layers underlying the one or more layers of powder material;
　g) the density of any layers underlying the one or more layers of powder material;
　h) the amount of binder in any layers underlying the one or more layers of powder material;
　i) the relative dimensions of the compacted layer relative to the one or more layers of powder material underlying the compacted layer; and
　j) any combination of a)-i).

* * * * *